US010847810B2

(12) United States Patent
Joo et al.

(10) Patent No.: US 10,847,810 B2
(45) Date of Patent: Nov. 24, 2020

(54) NANOSTRUCTURES FOR LITHIUM AIR BATTERIES

(71) Applicant: CORNELL UNIVERSITY, Ithaca, NY (US)

(72) Inventors: Yong Lak Joo, Ithaca, NY (US); Jun Yin, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 424 days.

(21) Appl. No.: 15/031,370

(22) PCT Filed: Oct. 22, 2014

(86) PCT No.: PCT/US2014/061672
§ 371 (c)(1),
(2) Date: Apr. 22, 2016

(87) PCT Pub. No.: WO2015/061383
PCT Pub. Date: Apr. 30, 2015

(65) Prior Publication Data
US 2016/0248100 A1 Aug. 25, 2016

Related U.S. Application Data

(60) Provisional application No. 61/899,556, filed on Nov. 4, 2013, provisional application No. 61/894,068, filed on Oct. 22, 2013.

(51) Int. Cl.
H01M 4/86 (2006.01)
H01M 4/90 (2006.01)
(Continued)

(52) U.S. Cl.
CPC ........ H01M 4/9016 (2013.01); D01D 5/0007 (2013.01); H01M 4/134 (2013.01);
(Continued)

(58) Field of Classification Search
CPC ... D01D 5/00; D01D 5/0007; H01M 10/0565; H01M 12/08; H01M 4/134; H01M 4/38;
(Continued)

(56) References Cited

U.S. PATENT DOCUMENTS 7,326,043 B2   2/2008  Joo et al.
7,901,610 B2   3/2011  Joo et al.
(Continued)

FOREIGN PATENT DOCUMENTS

WO       2011100743         8/2011
WO   WO 2011/100743    *   8/2011
(Continued)

OTHER PUBLICATIONS

J. Zhu et al., Applied Catalysis B Environmental 76 (2007) 82-91) (Year: 2007).*
(Continued)

Primary Examiner — Alexander Usyatinsky
(74) Attorney, Agent, or Firm — Bond, Schoeneck & King, PLLC; Blaine Bettinger

(57) ABSTRACT

Provided herein are lithium-air battery cells comprising nanostructured (e.g., nanofiber) anode, cathode, and/or separator/electrolyte components.

13 Claims, 18 Drawing Sheets

(51) Int. Cl.
| | |
|---|---|
| *H01M 4/134* | (2010.01) |
| *H01M 4/38* | (2006.01) |
| *H01M 4/40* | (2006.01) |
| *H01M 4/88* | (2006.01) |
| *H01M 4/92* | (2006.01) |
| *H01M 8/1018* | (2016.01) |
| *H01M 10/0565* | (2010.01) |
| *H01M 12/08* | (2006.01) |
| *D01D 5/00* | (2006.01) |
| *H01M 4/02* | (2006.01) |

(52) U.S. Cl.
CPC ........... *H01M 4/382* (2013.01); *H01M 4/405* (2013.01); *H01M 4/86* (2013.01); *H01M 4/8626* (2013.01); *H01M 4/8647* (2013.01); *H01M 4/88* (2013.01); *H01M 4/8807* (2013.01); *H01M 4/8828* (2013.01); *H01M 4/8853* (2013.01); *H01M 4/8882* (2013.01); *H01M 4/92* (2013.01); *H01M 8/1018* (2013.01); *H01M 10/0565* (2013.01); *H01M 12/08* (2013.01); *H01M 2004/027* (2013.01); *H01M 2004/8689* (2013.01); *H01M 2300/0071* (2013.01); *H01M 2300/0082* (2013.01); *H01M 2300/0091* (2013.01); *Y02E 60/10* (2013.01)

(58) Field of Classification Search
CPC ........ H01M 4/86; H01M 4/88; H01M 8/1018; H01M 4/90; H01M 4/405; H01M 8/8647; H01M 4/8853; H01M 4/8882; H01M 4/9016; H01M 4/92; H01M 4/8828; H01M 4/8807; H01M 4/8626; H01M 4/382; H01M 2300/0071; H01M 2300/0082; H01M 2300/0091; H01M 2004/8689; H01M 2004/027; Y02E 60/128

See application file for complete search history.

(56) References Cited

U.S. PATENT DOCUMENTS

| | | | | |
|---|---|---|---|---|
| 9,243,347 | B2* | 1/2016 | Joo | .................. D01D 5/0069 |
| 2007/0235331 | A1* | 10/2007 | Simpson | ............ A61B 5/14532 |
| | | | | 204/403.01 |
| 2007/0269655 | A1 | 11/2007 | Joo et al. | |
| 2010/0273066 | A1 | 10/2010 | Flanagan et al. | |
| 2011/0226697 | A1* | 9/2011 | McLellan | ............... B01D 53/62 |
| | | | | 210/651 |
| 2011/0236769 | A1* | 9/2011 | Xie | ......................... B82Y 30/00 |
| | | | | 429/401 |
| 2012/0070728 | A1* | 3/2012 | Wertz | ....................... C08K 7/14 |
| | | | | 429/188 |
| 2012/0082884 | A1* | 4/2012 | Orilall | ................. H01M 2/1646 |
| | | | | 429/145 |
| 2013/0071742 | A1* | 3/2013 | Halalay | ................... C08F 12/22 |
| | | | | 429/213 |
| 2013/0149513 | A1* | 6/2013 | Nagayama | .............. B32B 9/048 |
| | | | | 428/212 |
| 2013/0222873 | A1 | 8/2013 | Kwon et al. | |
| 2013/0260283 | A1* | 10/2013 | Valle | ................. C04B 35/62231 |
| | | | | 429/492 |
| 2015/0056471 | A1* | 2/2015 | Joo | ..................... C04B 35/6224 |
| | | | | 428/687 |
| 2015/0132642 | A1* | 5/2015 | Joo | ....................... H01M 4/587 |
| | | | | 429/217 |

FOREIGN PATENT DOCUMENTS

| | | | |
|---|---|---|---|
| WO | WO 2011124622 | * | 10/2011 |
| WO | 2013071292 | | 5/2013 |
| WO | 2013123137 | | 8/2013 |
| WO | 2013130723 | | 9/2013 |

OTHER PUBLICATIONS

International Search Report and Written Opinion Form PCT/ISA/220, International Application No. PCT/US2014/061672, pp. 1-16, International Filing Date Oct. 22, 2014, dated Apr. 13, 2015.

Won-Hee Ryu et al., "Bifunctional Composite Catalysts Using Co 3 0 4 Nanofibers Immobilized on Nonoxidized Graphene Nanoflakes for High-Capacity and Long-Cycle Li-0 2 Batteries", Nano Letters, vol. 13, No. 9, Sep. 11, 2013, pp. 4190-4197.

Beerbower, Alan, et al., The HSAB Principle and Extended Solubility Theory, Inorganica Chimica Acta, 75 (1983) pp. 193-197.

Parr, Robert G., et al., Absolute hardness: companion parameter to absolute electronegativity, Journal of American Chemical Society, 1983, 105, pp. 7512-7516.

* cited by examiner

NANOSTRUCTURES FOR LITHIUM AIR BATTERIES

CROSS-REFERENCE

This application claims the benefit of U.S. Provisional Application No. 61/894,068, filed on Oct. 22, 2013 and entitled "Nanostructures for Lithium Air Batteries," and 61/899,556, filed Nov. 4, 2013, also entitled "Nanostructures for Lithium Air Batteries," both of which are all incorporated herein by reference in their entireties.

BACKGROUND OF THE INVENTION

Lithium-air batteries use oxidation of lithium at the anode and reduction of oxygen at the cathode to store energy. Lithium-air battery technology is of interest to researchers because of its extremely high theoretical specific energy (over 11,000 Wh/kg).

SUMMARY OF THE INVENTION

Provided in certain embodiments herein are batteries, or battery components comprising one or more nanostructure component. In specific embodiments, the batteries are lithium air batteries and/or the battery components are suitable for use in lithium air batteries. In other embodiments, provided herein is any nanostructured described herein.

In certain embodiments, provided herein is a lithium air battery comprising:
 a. a cathode;
 b. an electrolyte or separator component (which component may function as both an electrolyte and a separator); and
 c. an anode.

In specific embodiments, the cathode, the electrolyte and/or separator component, and/or the anode comprises a nanostructured (e.g., nanofiber) component. In certain embodiments, the cathode comprises at least one cathode nanostructure (e.g., nanofiber) comprising a cathodic material (e.g., a metal catalyst, such as metal and/or metal oxide). In some embodiments, the cathode comprises at least one cathode nanofiber, the at least one cathode nanofiber comprising a cathodic material (e.g., metal and/or metal oxide). In further or alternative embodiments, the anode comprises at least one anode nanofiber, the at least one anode nanofiber comprising lithium metal. In further or alternative embodiments, the electrolyte component comprises at least one electrolyte component nanofiber, the at least one electrolyte component nanofiber comprising (a) a block copolymer material; or (b) a ceramic material (with an optional polymer material).

In some embodiments, provided herein are processes for preparing ceramic-containing nanostructures (e.g., nanofibers), such as useful in lithium-air batteries, e.g., as an electrolyte and/or separator component described herein—or in other uses, such as in lithium-ion batteries, or the like. In certain embodiments, provided herein are processes for preparing carbon and metal containing nanostructures (e.g., nanofibers), such as useful in lithium-air batteries, e.g., as a cathode component described herein—or in other uses.

Other embodiments are as set forth herein and in the claims.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
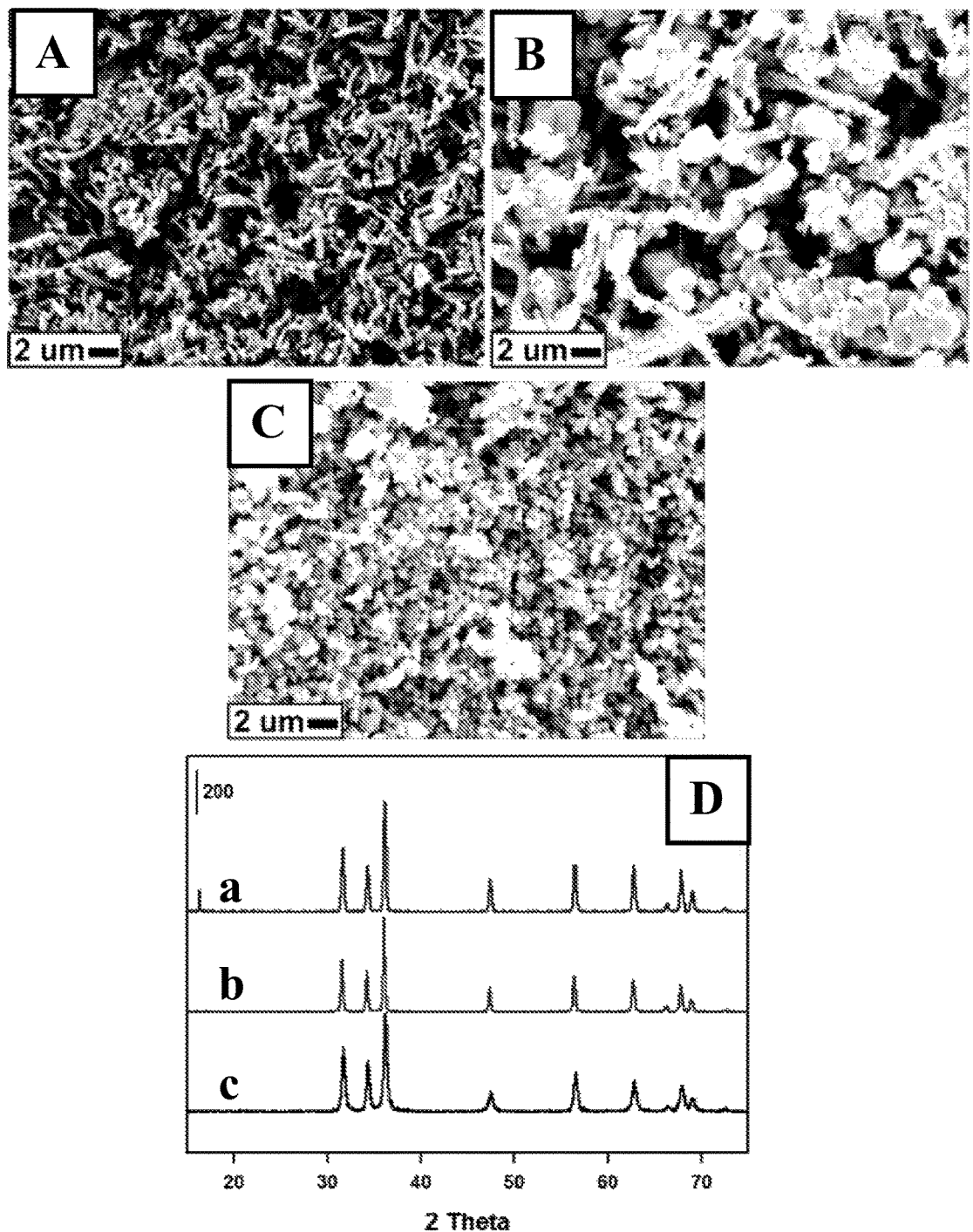
FIG. 1 illustrates SEM images (A-C) and XRD patterns (D) for various metal catalyst (zinc oxide) nanofibers described herein.

Provided in certain embodiments herein are batteries, or battery components comprising one or more nanostructure component. In specific embodiments, the batteries are lithium air batteries and/or the battery components are suitable for use in lithium air batteries. In other embodiments, provided herein is any nanostructured described herein.

In certain embodiments, provided herein is a lithium air battery comprising:
 a. a cathode;
 b. an electrolyte or separator component (which component may function as both an electrolyte and a separator); and
 c. an anode.

In specific embodiments, the cathode, the electrolyte and/or separator component, and/or the anode comprises a nanofiber component. In some embodiments, the cathode comprises at least one cathode nanofiber, the at least one cathode nanofiber comprising a cathodic material (e.g., metal and/or metal oxide). In further or alternative embodiments, the anode comprises at least one anode nanofiber, the at least one anode nanofiber comprising lithium metal. In further or alternative embodiments, the electrolyte component comprises at least one electrolyte component nanofiber, the at least one electrolyte component nanofiber comprising (a) a block copolymer material; or (b) a ceramic material (with an optional polymer material).

In some embodiments, provided herein is a lithium air battery comprising a cathode comprising a carbon substrate and at least one cathode nanofiber. In specific embodiments, the at least one cathode nanofiber comprises metal and/or metal oxide.

In further or alternative embodiments, provided herein is a lithium air battery comprising an electrolyte and/or separator component comprising at least one electrolyte and/or separator component nanofiber. In specific embodiments, the at least one electrolyte component nanofiber comprises a block copolymer material. In other specific embodiments, the at least one electrolyte component nanofiber comprises a combination of polymers (e.g., a blend of homopolymers). In still other specific embodiments, the at least one electrolyte component nanofiber comprises a ceramic material. In further embodiments, the at least one electrolyte component nanofiber comprises a ceramic material and a polymer material (e.g., comprising the ceramic material as a continuous core matrix material with a polymer sheath (e.g., at least partially) surrounding the core matrix material).

In certain specific embodiments, provided herein is a lithium air battery comprising an anode, a cathode, and an electrolyte component, wherein:
 a. the cathode comprises a carbon substrate and at least one cathode nanofiber, the at least one cathode nanofiber comprising metal and/or metal oxide;
 b. the electrolyte (and/or separator) component comprises at least one electrolyte (and/or separator) component nanofiber, the at least one electrolyte component nanofiber comprising:
  i. a block copolymer material (or a polymer blend material, e.g., a blend of homopolymers), and/or
  ii. a ceramic material and an optional polymer material;
 c. the anode comprises at least one anode nanofiber, the at least one anode nanofiber comprising lithium metal; or
 d. a combination thereof.

In certain embodiments, the battery comprises (a). In further or alternative embodiments, the battery comprises (b). In further or alternative embodiments, the battery comprises (c). In some embodiments, the battery comprises (a) and (b). In certain embodiments, the battery comprises (a) and (c). In some embodiments, the battery comprises (b) and (c). In certain embodiments, the battery comprises (a), (b), and (c).

Cathode

In some embodiments, provided herein is a cathode (or cathode catalyst) (e.g., in or for a lithium air battery) comprising a nanostructured cathode material. In some embodiments, the nanostructured cathode material is a nanostructured metal catalyst material (e.g., nanostructured metal or metal oxide, such as described herein). In certain embodiments, the nanostructured metal catalyst material comprises high aspect ratio metal catalyst structures (e.g., nanofibers comprising metal and/or metal oxide (catalyst), such as having aspect ratios of greater than 1,000, 10,000, or the like). In further or additional embodiments, the nanostructured metal catalyst material comprises nanostructured composites comprising a nanostructured carbon substrate (e.g., carbon nanotubes, nanostructured graphene (e.g., GNR, graphene sheets, etc.), or the like) and a metal catalyst material (e.g., deposited on the nanostructured carbon substrate, such as according to a process described herein). In specific embodiments, the cathode comprises both high aspect ratio and nanostructured metal catalyst (e.g., metal and/or metal oxide nanofibers) and nanostructured composites comprising nanostructured carbon substrate and metal catalyst material (e.g., metal, such as Pt, deposited on CNTs).

In certain embodiments, provided herein is a cathode (or cathode catalyst) (e.g., in a lithium air battery) comprising a cathode nanofiber material. In some embodiments, provided herein is a cathode (or cathode catalyst) (e.g., in a lithium air battery) comprising a metal catalyst (e.g., a nanostructured metal catalyst, such as in a cathode nanofiber material, or the like). In some embodiments, the cathode (or cathode catalyst) further comprises a carbon material (e.g., a carbon substrate).

In certain embodiments, the cathode nanofiber material comprises at least one nanofiber. In certain embodiments, the cathode nanofiber material comprises a material that enhances oxygen reduction kinetic and/or increases specific capacity of the cathode (e.g., a metal catalyst). In some embodiments, the cathode nanofiber material comprises metal catalyst (e.g., comprising metal and/or metal oxide). In certain embodiments, the cathode nanofiber comprises a continuous matrix (e.g., a continuous core matrix) of metal catalyst. In specific embodiments, cathode nanofiber comprises a continuous core matrix of metal catalyst. In some embodiments, the continuous matrix of metal catalyst is hollow. In certain embodiments, the cathode nanofiber is mesoporous. In some embodiments, the cathode nanofibers comprise discrete domains of the metal catalyst material (e.g., embedded in a continuous matrix of a second material, such as metal, ceramic, carbon, or the like). In some embodiments, cathode nanofiber materials provide batteries and battery components with improved energy capacity, reduced pulverization, increased charging rates, and/or other advantages.

In various embodiments, materials described herein comprise the specific chemical component referred to another optional chemical component. For example, in some embodiments a ceramic material comprises a ceramic and another optional material. In other embodiments, a ceramic material consists of or consists essential of ceramic. In addition, in various embodiments, a specific device component described herein comprises the specific device component and optional additional components (e.g., chemical components). For example, in some embodiments, a cathode described herein comprises a cathodic material and another optional component. In other embodiments, a cathode described herein consists of or consists essentially of the cathodic material. Further, any general description of "comprising" herein includes a disclosure of "consisting of" and "consisting essentially of."

Metal Material

The metal catalyst is optionally selected from one or more metal types and is optionally in a zero oxidation state, a positive oxidation state, or a mixture thereof. In specific embodiments, the metal catalyst comprises manganese, cobalt, platinum, silver, gold, ruthenium, zinc, one or more oxide thereof, or any combination thereof. In more specific embodiments, the cathode nanofiber comprises a continuous matrix (e.g., a continuous core matrix) of manganese, cobalt, platinum, silver, gold, ruthenium, zinc, one or more oxide thereof, or any combination (e.g., mixture, alloy, or the like) thereof. In specific embodiments, the metal catalyst comprises cobalt, cobalt oxide (e.g., $Co_3O_4$), or a combination thereof. In further or alternative embodiments, the metal catalyst comprises zinc, zinc oxide (e.g., ZnO), or a combination thereof.

Figure 2:
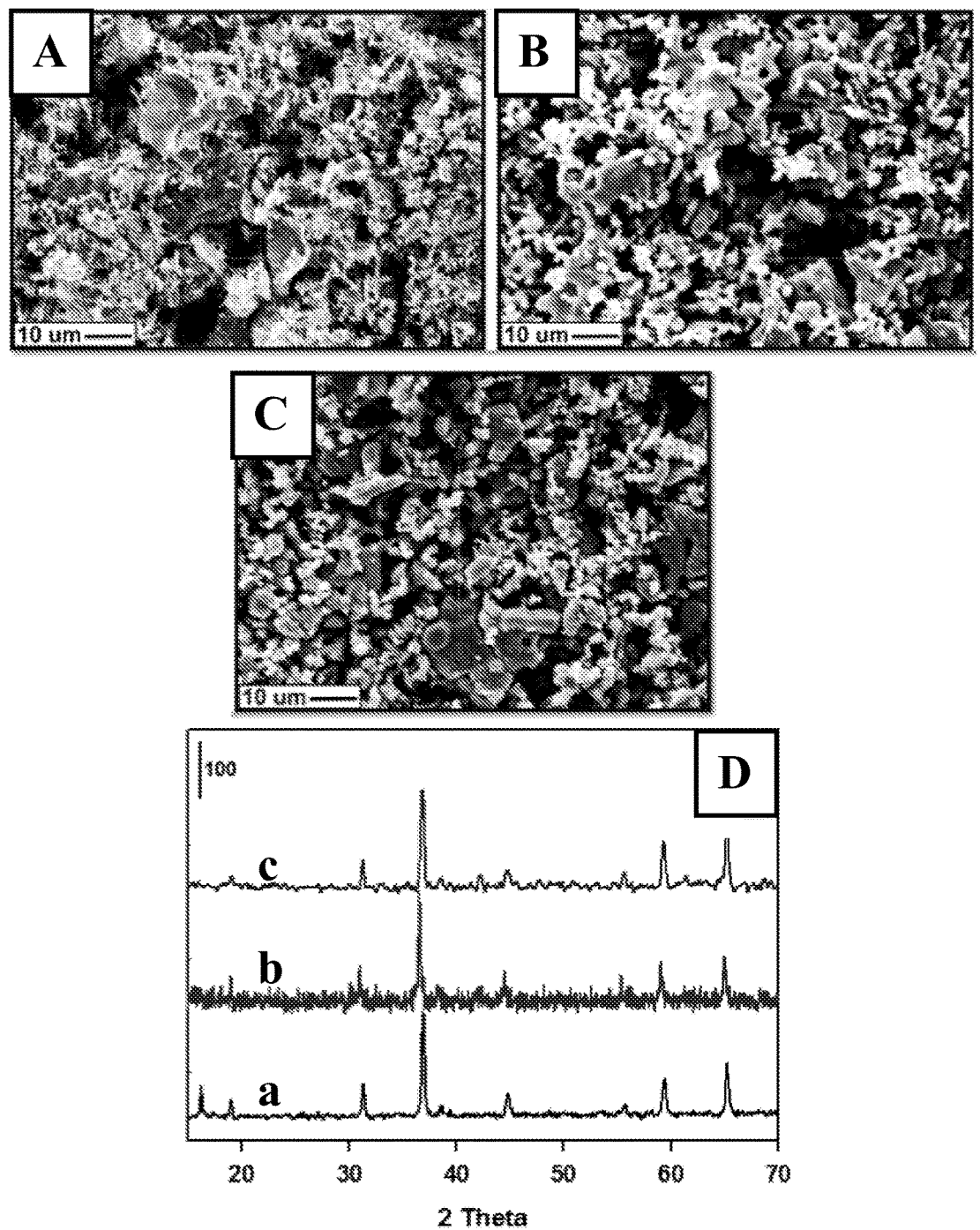
FIG. 2 illustrates SEM images (A-C) and XRD patterns (D) for various metal catalyst (cobalt oxide) nanofibers described herein.
Figure 17:
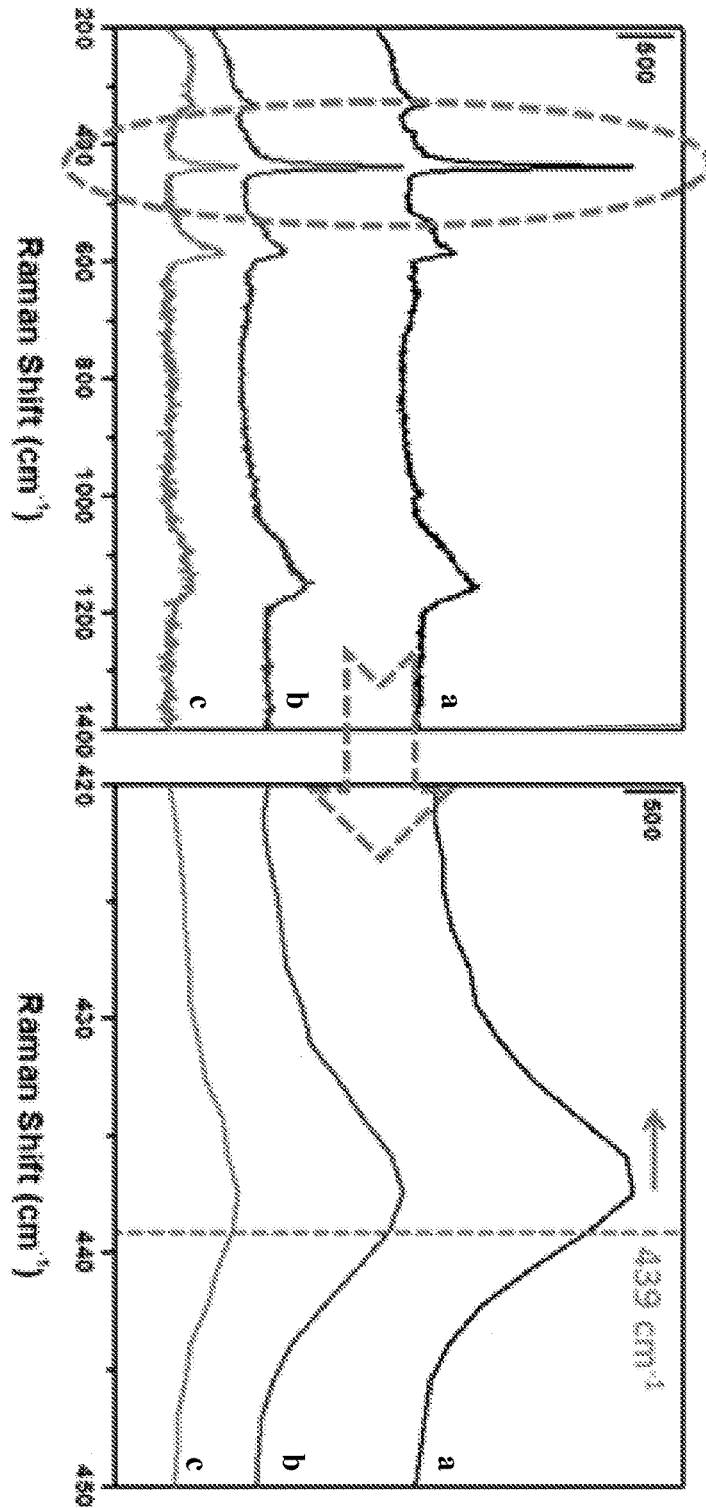
FIG. 17 illustrates Raman spectra of metal oxide nanofibers calcinated at various temperatures
Figure 24:
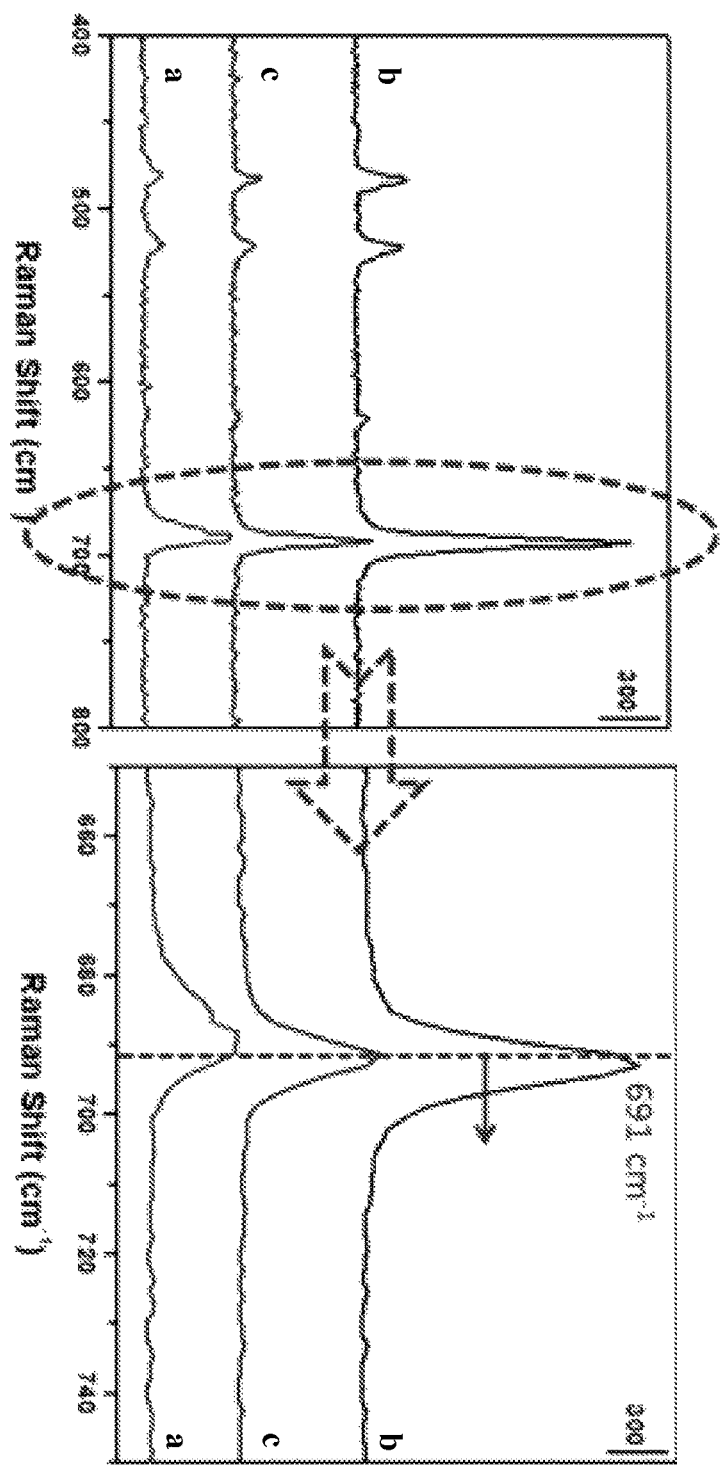
FIG. 24 illustrates Raman spectra of Cobalt Oxide nanofibers calcined from a polymer-cobalt precursor at various temperatures, including 1200° C. (a), 1000° C. (b), and 700° C. (c).

FIG. 1 illustrates SEM images of exemplary zinc oxide nanostructures provided herein. Panel (A) illustrates exemplary nanostructures prepared by electrospinning a fluid stock (e.g., an aqueous fluid stock) comprising polymer (e.g., polyvinylalcohol (PVA)) and zinc precursor (e.g., zinc acetate), forming a precursor nanofiber, and subsequently subjecting the precursor nanofiber to thermal treatment (e.g., under air) at 600° C. (e.g., calcinating the zinc precursor to zinc oxide and removing organic (polymer and precursor ligand) residue). Panels (b) and (c) illustrate cathode nanofiber material prepared according to similar techniques, with thermal treatment at 800° C. and 1000° C., respectively. Panel (E) illustrates X-Ray Diffraction (XRD) patterns for such nanofibers thermally treated at 600° C. (c), 800° C. (b), and 1000° C. (a). FIG. 2 illustrates SEM images of exemplary cobalt oxide nanostructures provided herein. Panel (A) illustrates exemplary nanostructures prepared by electrospinning a fluid stock (e.g., an aqueous fluid stock) comprising polymer (e.g., polyvinylalcohol (PVA)) and cobalt precursor (e.g., cobalt acetate), forming a precursor nanofiber, and subsequently subjecting the precursor nanofiber to thermal treatment (e.g., under air) at 700° C. Panels (B) and (C) illustrate cathode nanofiber material prepared according to similar techniques, with thermal treatment at 1000° C. and 1200° C., respectively. Panel (D) illustrates X-Ray Diffraction (XRD) patterns for the nanofibers illustrated in Panels (A)-(C), in traces (a)-(c), respectively. FIG. 17 illustrates Raman spectra of Zinc Oxide nanofibers calcined from a polymer-zinc precursor at various temperatures, including 900° C. (a), 700° C. (b), and 500° C. (c). FIG. 24 illustrates Raman spectra of Cobalt Oxide nanofibers calcined from a polymer-cobalt precursor at various temperatures, including 1200° C. (a), 1000° C. (b), and 700° C. (c). As can be seen, variation in the Raman spectra are observed depending on thermal treatment conditions utilized.

Carbon Material

Figure 20:
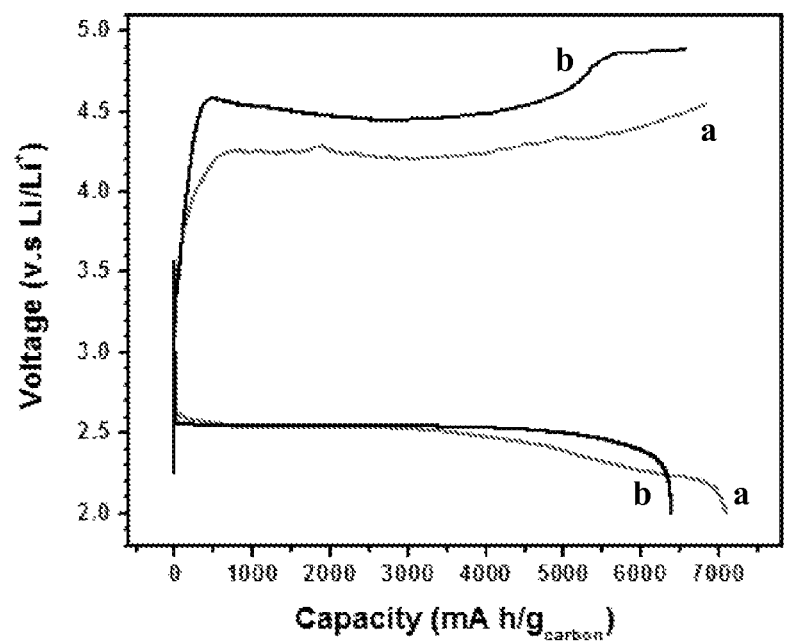
FIG. 20 illustrates lithium air charge/discharge results for an exemplary cathode comprising both (1) high aspect ratio metal catalyst nanostructures (e.g., zinc oxide nanofibers), and (2) metal catalyst loaded onto a nanostructured carbon substrate (e.g., Pt on CNT).

In some embodiments, the cathode comprises a metal catalyst material (e.g., metal(s), metal oxide(s), or combination thereof as described herein) and a carbon material. In specific embodiments, the metal catalyst material is present in a cathode nanofiber material, such as described herein. In some embodiments, the carbon material is a carbon substrate upon which the metal catalyst (e.g., nanofiber) material is loaded. In general, loading of the metal catalyst material on the carbon substrate is achieved using any suitable technique. In certain embodiments, the carbon material is any suitable carbon material, such as graphite, mesoporous carbon, graphene, graphene nanoribbons (GNRs), carbon black (e.g., super C65), carbon nanotubes, graphene sheets, or the like. In specific embodiments, the carbon material is graphene nanoribbons (GNRs), carbon nanotubes, or carbon black (e.g., Super C65 or Super P). In additional or alternative embodiments, the carbon material is a carbon composite material comprising carbon component (e.g., nanostructured carbon) and a metal component (e.g., a metal catalyst, metal, or metal oxide described herein). In specific embodiments, the carbon component is a nanostructured carbon, such as CNT or GNR. In more specific embodiments, the carbon material (e.g., carbon substrate) has metal or metal oxide (e.g., that functions as a lithium air cathode catalyst) deposited on the carbon component (e.g., nanostructured carbon). Exemplary materials are described herein, such as in FIG. 10. Exemplary results of combinations of such carbon substrates with metal catalyst nanofibers are illustrated in FIG. 20.

In some embodiments, the cathode comprises carbon materials and metal catalyst material in any suitable ratio. In some embodiments, the carbon-to-metal catalyst (e.g., metal, metal oxide, or a combination thereof) weight ratio is at least 1:1 (e.g., 2:1, 3:1, 4:1, or the like). In certain embodiments, the carbon-to-metal catalyst ratio is less than 2:1. In certain embodiments, the carbon-to-metal catalyst ratio is less than 3:1. In specific embodiments, the carbon-to-metal catalyst ratio is about 4:1.

Cathode Performance

In certain embodiments, provided herein is a lithium-air battery having a cathode with an initial discharge capacity of at least 2000 mAh/$g_{carbon}$ (e.g., for a cathode comprising a carbon to catalyst ratio of 4:1). In specific embodiments, provided herein is a lithium ion battery having a cathode with an initial discharge capacity of at least 2500 mAh/$g_{carbon}$ (e.g., for a cathode comprising a carbon to catalyst ratio of 4:1). In more specific embodiments, provided herein is a lithium ion battery having a cathode with an initial discharge capacity of at least 3000 mAh/$g_{carbon}$ (e.g., for a cathode comprising a carbon to catalyst ratio of 4:1). In still more specific embodiments, provided herein is a lithium ion battery having a cathode with an initial discharge capacity of at least 3500 mAh/$g_{carbon}$ (e.g., for a cathode comprising a carbon to catalyst ratio of 4:1). In yet more specific embodiments, provided herein is a lithium ion battery having a cathode with an initial discharge capacity of at least 4000 mAh/$g_{carbon}$ (e.g., for a cathode comprising a carbon to catalyst ratio of 4:1). In still more specific embodiments, provided herein is a lithium ion battery having a cathode with an initial discharge capacity of at least 4500 mAh/$g_{carbon}$ (e.g., for a cathode comprising a carbon to catalyst ratio of 4:1). In still more specific embodiments, provided herein is a lithium ion battery having a cathode with an initial discharge capacity of at least 5000 mAh/$g_{carbon}$, at least 5500 mAh/$g_{carbon}$, at least 6000 mAh/$g_{carbon}$, at least 6500 mAh/$g_{carbon}$, at least 7000 mAh/$g_{carbon}$, or the like (e.g., for a cathode comprising a carbon to catalyst ratio of 4:1).

In some embodiments, the charge potential plateau (in a lithium-air battery cell) provided by the cathode (e.g., as measured v.s. Li/Li+) is less than 4.8 V. In specific embodiments, the charge potential plateau provided by the cathode (e.g., as measured v.s. Li/Li+) is less than 4.75 V. In more specific embodiments, the charge potential plateau provided by the cathode (e.g., as measured v.s. Li/Li+) is less than 4.7 V. In still more specific embodiments, the charge potential plateau provided by the cathode (e.g., as measured v.s. Li/Li+) is less than 4.6 V. In yet more specific embodiments, the charge potential plateau provided by the cathode (e.g., as measured v.s. Li/Li+) is less than 4.5 V. In specific embodiments, the charge potential plateau provided by the cathode (e.g., as measured v.s. Li/Li+) is less than 4.4 V.

In some embodiments, the discharge potential plateau (in a lithium-air battery cell) provided by the cathode (e.g., as measured v.s. Li/Li+) is greater than 2.25 V. In specific embodiments, the discharge potential plateau provided by the cathode (e.g., as measured v.s. Li/Li+) is greater than 2.35 V. In more specific embodiments, the discharge potential plateau provided by the cathode (e.g., as measured v.s. Li/Li+) is greater than 2.4 V. In still more specific embodiments, the discharge potential plateau provided by the cathode (e.g., as measured v.s. Li/Li+) is greater than 2.5 V. In yet more specific embodiments, the discharge potential plateau provided by the cathode (e.g., as measured v.s. Li/Li+) is greater than 2.6 V.

Figure 3:
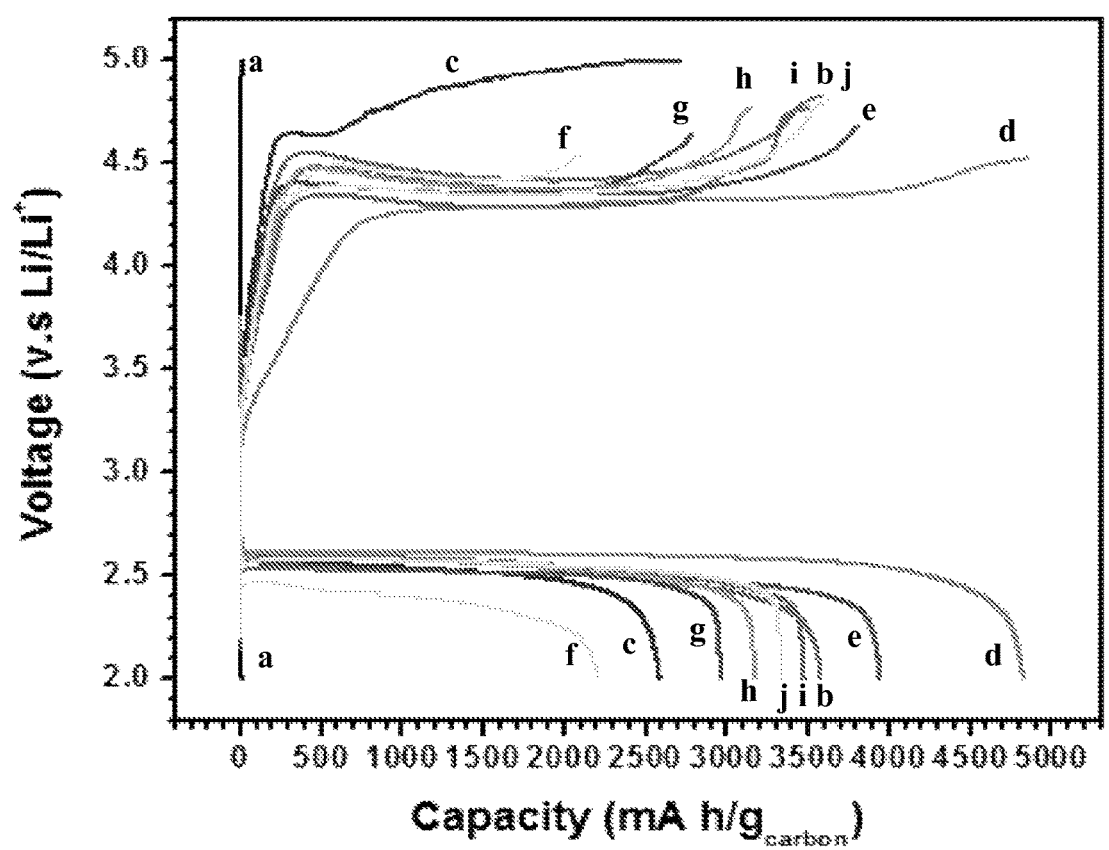
FIG. 3 illustrates initial charge/discharge cycles for various carbon substrates.
Figure 4A:
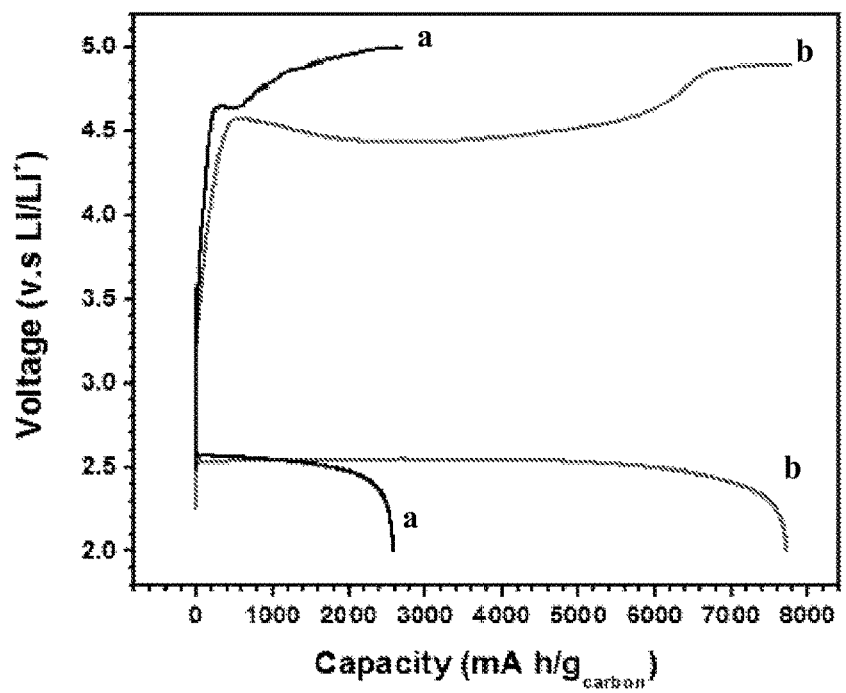
FIGS. 4 (A-D) illustrates initial charge/discharge cycles for various cathodes described herein comprising metal catalyst nanofibers (e.g., zinc oxide, cobalt oxide, manganese oxide, and nickel oxide).
Figure 4B:
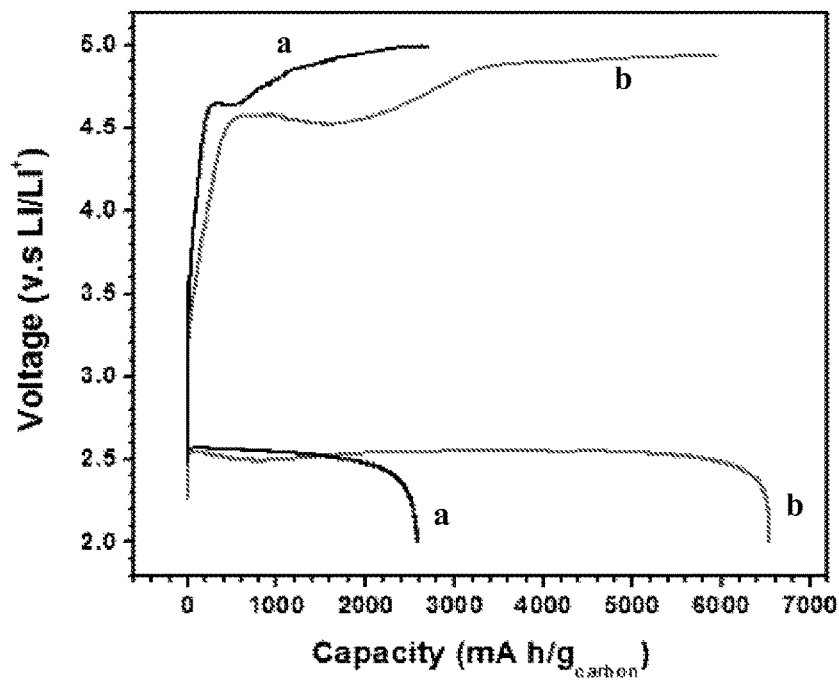
Figure 4C:
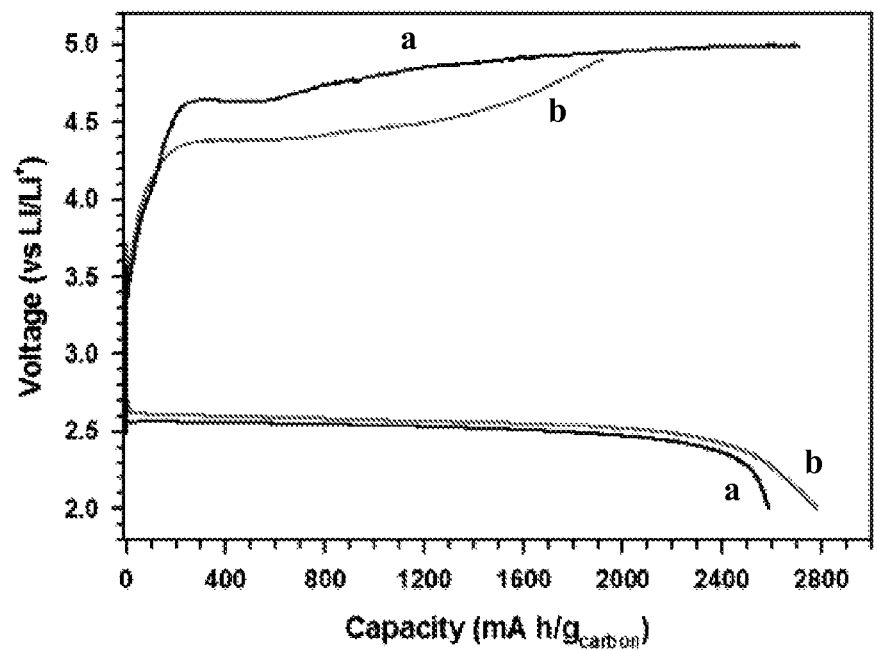
Figure 4D:
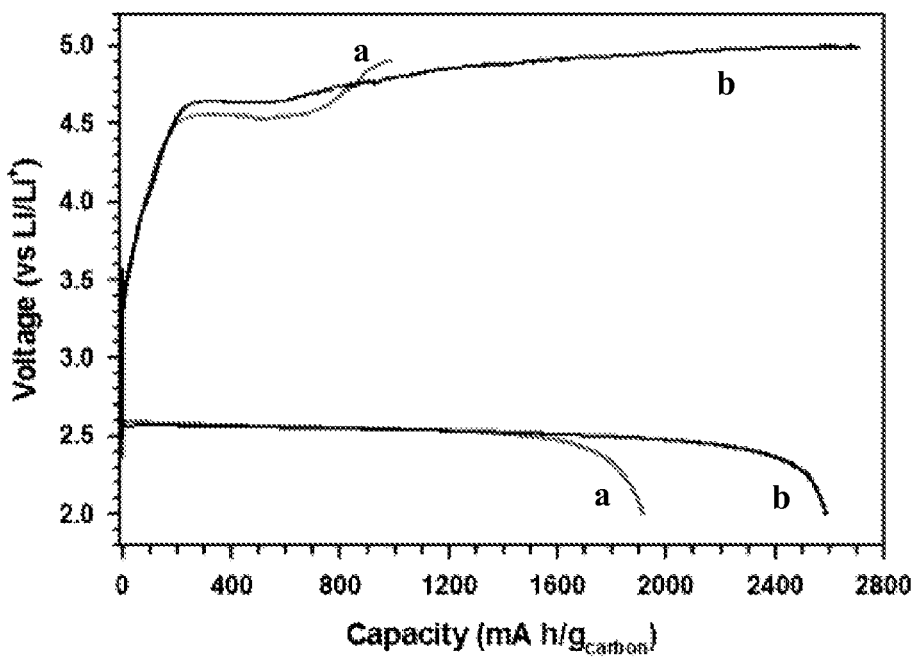
Figure 5:
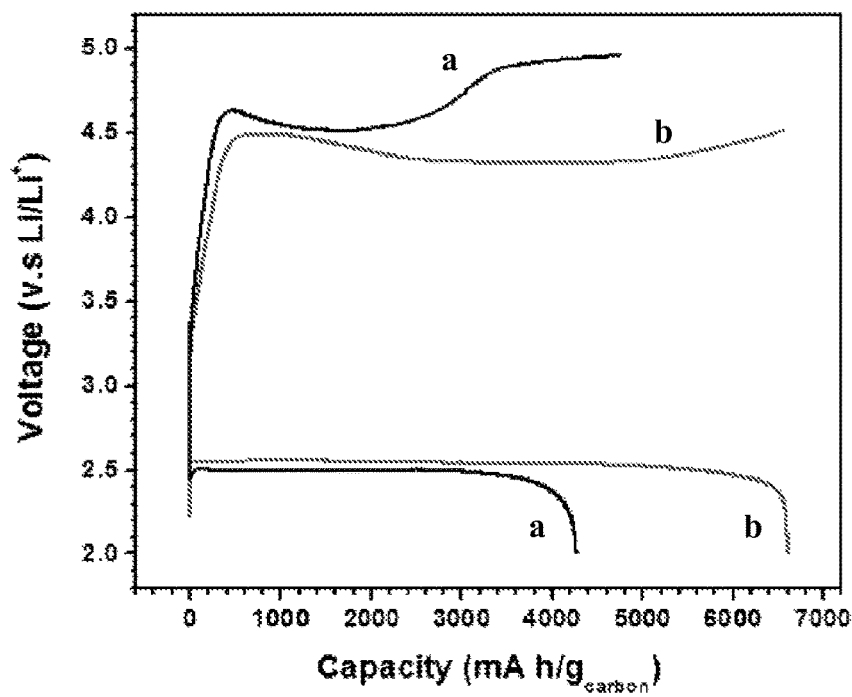
FIG. 5 illustrates initial charge/discharge cycles for various cathodes described herein comprising metal catalyst nanofibers and alternate carbon substrate materials.

FIG. 3 illustrates lithium-air charge/discharge comparisons for various carbon substrates, including graphite (a), super P (b), super C65 (c), carbon nanotubes (CNTs) (d), and a variety of graphene nanoribbon (GNR) samples (e-j). Among the illustrated carbon substrates, multi-walled carbon nanotubes (CNTs) provided the highest discharge capacity (~4800 mA h/g carbon), provided the highest discharge potential plateau (~2.6 V) and provided the lowest charge potential plateau (~4.3 V) (i.e., had the best overpotential). The various graphene nanoribbons provided a variety of different discharge capacity (up to ~4000 mA h/g carbon; and at least ~2200 mA h/g carbon), but generally provided similar overpotential results. FIG. 4 (Panels A-D) illustrate lithium-air charge/discharge comparisons for exemplary cathodes comprising carbon black (Super C65) or carbon black (Super C65) and a metal catalyst nanofiber material (at 20 wt. % nanofiber loading—a carbon-to-nanofiber weight ratio of 4:1). FIG. 4A illustrates a comparison between cathodes comprising carbon black (Super C65) (a) or carbon black (Super C65) and nanofibers comprising a continuous matrix of zinc oxide (a PVA/zinc precursor NF calcined at 900 C) (b); FIG. 4B illustrates a comparison between cathodes comprising carbon black (Super C65) (a) or carbon black (Super C65) and nanofibers comprising a continuous matrix of cobalt oxide (a PVA/zinc precursor NF calcined at 1000 C) (b); FIG. 4C illustrates a comparison between cathodes comprising carbon black (Super C65) or carbon black (Super C65) (a) and nanofibers comprising a continuous matrix of manganese oxide (a calcined PVA/zinc precursor NF) (b); and FIG. 4D illustrates a comparison between cathodes comprising carbon black (Super C65) (a) or carbon black (Super C65) and nanofibers comprising a continuous matrix of nickel oxide (a calcined PVA/zinc precursor NF) (b). As seen in FIGS. 4A and 4B, addition of zinc oxide and cobalt oxide nanofiber materials provide substantial improvement to cathode capacity and overpotential parameters. The zinc oxide (ZnO) containing cathodes demonstrated very high initial discharge capacity (~7700 mA h/g carbon) and the cobalt oxide ($Co_3O_4$) also demonstrated very high initial discharge capacity (~6500 mA h/g carbon). FIG. 5 illustrates lithium-air charge/discharge comparisons for exemplary cathodes comprising different carbon substrate material using similar metal catalyst nanofiber material (zinc oxide nanofibers at 20 wt. % nanofiber loading—i.e., a carbon-to-nanofiber weight ratio of 4:1). Zinc oxide nanofiber sample with graphene nanoribbons (GNRs) (b) and carbon black (Super C65) (a) as substrates are illustrated, displaying good battery performance, including initial discharge capacities (GNRs: 6600 mAh/g carbon; Super C65: 4300 mA h/g carbon) and overpotential. The fibers supported on GNRs show the discharge plateau at ~2.55 V and charge plateau at ~4.30 V, while the supported on Super C65 display ~2.50 V and ~4.70 V for discharge and charge plateaus, respectively.

Nanostructures

Provided in certain embodiments herein are cathodic nanostructures having a high metal content. In some embodiments, the cathodic nanostructure comprises a continuous matrix of a metal catalyst (e.g., metal and/or metal oxide). In some embodiment, the cathodic nanostructures comprise (i) a metal catalyst (e.g., metal and/or metal oxide) component, and (ii) a continuous matrix material (e.g., a continuous matrix of carbon or ceramic). In certain embodiments, the cathodic nanostructure comprises (i) a metal catalyst (e.g., metal and/or metal oxide) and (ii) a carbon inclusion, such as nanostructured carbon domains (e.g., comprising GNR, CNT, or the like). In various embodiments, the metal catalyst comprises the matrix of the nanofiber, and in other embodiments, the matrix of the nanofiber comprises carbon (e.g., carbonized polymer, such as thermally carbonized polymer). In certain embodiments, the continuous matrix is a continuous core matrix (e.g., not a hollow tube). In some embodiments, the metal component makes up discrete isolated domains of the cathode nanofibers. In some embodiments, the domains have various sizes, for example about 1 nm to about 100 nm, about 10 nm to about 50 nm, or any other suitable size.

In some embodiments, the nanofibers have few defects and/or voids. In some instances a voids and defects in the nanofiber include breaks in the nanofiber, regions of nanofiber wherein the diameter is so narrow as to be easily broken (e.g., having a diameter of less than 10% or less than 5% of the average nanofiber diameter), regions of the nanofiber wherein the nanofiber material has anomalous morphologies (e.g., crystalline domains in a substantially amorphous nanofiber—such crystalline domains may increase fracturing and brittleness of the nanofiber), and the like. In some embodiments, there are about 1, about 5, about 10, about 50, about 100, and the like defects per linear mm of nanofiber. In some embodiments, there are at most about 1, at most about 5, at most about 10, at most about 50, at most about 100, and the like defects per linear mm of nanofiber. In other embodiments, the nanofibers have fewer defects and/or voids, wherein the number of defects and/or voids in the nanofiber is in comparison to a nanofiber not produced by the methods of the disclosure (for example with a low loading of precursor).

Provided in various embodiments herein are cathode nanofibers comprising high metal content (e.g., metal and/or metal oxide containing nanofibers). In some embodiments, nanofibers provided herein comprise at least 99%, at least 98%, at least 97%, at least 96%, at least 95%, at least 90%, at least 80%, or the like of metal and oxygen, when taken together, by mass (e.g., elemental mass). In some embodiments, cathode nanofibers provided herein comprise at least 50%, at least 60%, at least 70%, or at least 75% metal by mass (e.g., elemental mass).

Provided in certain embodiments herein are cathode nanofibers comprising high metal, oxygen and carbon content (e.g., comprising a carbon matrix and domains of metal and/or metal oxide). In some embodiments, nanofibers provided herein comprise at least 99%, at least 98%, at least 97%, at least 96%, at least 95%, at least 90%, at least 80%, or the like of metal, oxygen and carbon, when taken together, by mass (e.g., elemental mass). In some embodiments, cathode nanofibers provided herein comprise at least 20%, at least 30%, at least 40%, or at least 50% metal by mass (e.g., elemental mass). In some embodiments, cathode nanofibers provided herein comprise at least 50%, at least 60%, at least 70%, or at least 75% metal oxide by mass (e.g., elemental mass).

In some embodiments, the nanofibers comprise a single metal type. In other embodiments, the metal nanofibers comprise two or more metal types. In some embodiments, provided herein are nanofibers comprising two or more metals and the metals are in the form of an alloy. The metal of the metal, metal oxide, or ceramic provided here is any suitable metal, including: manganese, cobalt, platinum, silver, gold, ruthenium, and/or zinc.

As described herein, certain cathode nanofibers provided herein comprise a continuous matrix (e.g., a continuous core matrix) material. In some embodiments, the matrix segment or segments within the nanofiber continue along a substantial portion of the nanofiber. In some embodiments, the continuous matrix is found along at least 50%, at least 60%, at least 70%, at least 80%, at least 90%, at least 95%, at least 98%, or at least 99% the length of the nanofiber (e.g., on average for a plurality of nanofibers). In some instances, the continuous matrix runs along at least 50% the length of the nanofiber (e.g., on average for populations of nanofibers). In specific instances, the continuous matrix runs along at least 70% the length (e.g., on average) of the nanofiber(s). In more specific instances, the continuous matrix runs along at least 80% the length (e.g., on average) of the nanofiber(s). In still more specific embodiments, the continuous matrix runs along at least 90% of the length (e.g., on average) of the nanofiber(s). In yet more specific embodiments, the continuous matrix runs along at least 95% of the length (e.g., on average) of the nanofiber(s).

In some embodiments, provided herein are cathode nanofibers comprising a hollow core. The hollow core of the nanofiber has any suitable diameter. In some embodiments, the diameter of the hollow core is on average between about 1 nm and 1000 nm, between about 1 nm and 500 nm, between about 5 nm and 250 nm, between about 10 nm and 200 nm, or the like.

In various embodiments, provided herein are nanofibers or processes for producing nanofibers having any suitable diameter. In specific embodiments, cathode nanofibers provided herein have a (e.g., average) diameter of less than 1500 nm. In more specific embodiments, cathode nanofibers provided herein have a (e.g., average) diameter of 100 nm to 1000 nm. In some embodiments, cathode nanofibers provided herein have a (e.g., average) diameter of 500 nm or less. In some embodiments, cathode nanofibers provided herein have a (e.g., average) diameter of 400 nm or less. In some embodiments, cathode nanofibers provided herein have a (e.g., average) diameter of 200 nm to 500 nm.

The nanofibers have any suitable length. In some embodiments, cathode nanofibers provided herein have an average length of about 20 µm, about 50 µm, about 100 µm, about 500 µm, about 1,000 µm, about 5,000 µm, about 10,000 µm, about 50,000 µm, about 100,000 µm, about 500,000 µm, or the like. In some embodiments, cathode nanofibers provided herein have an average length of at least about 20 µm, at least about 50 µm, at least about 100 µm, at least about 500 µm, at least about 1,000 µm, at least about 5,000 µm, at least about 10,000 µm, at least about 50,000 µm, at least about 100,000 µm, at least about 500,000 µm, or the like. In other embodiments, the nanofibers are optionally shorter (e.g., a longer nanofiber material is optionally fragmented to facilitate processing of the material, such as when processing to combine with a carbon material to form the cathode).

The cathode nanofibers provided herein have any suitable aspect ratio (nanofiber length divided by diameter). In some embodiments, the cathode nanofibers provided herein have an aspect ratio (e.g., average aspect ratio) of at least 10, at least $10^2$, at least $10^3$, at least $10^4$, at least $10^5$, at least $10^6$, at least $10^7$, or the like. In specific embodiments, the aspect ratio (e.g., average aspect ratio) of nanofibers provided herein is at least 100. In some embodiments, aspect ratio refers to a single nanofiber. In some embodiments, aspect ratio refers to a plurality of nanofibers and is reported as a single average value (i.e., the aspect ratio being the average length of the nanofibers of a sample divided by their average diameter). In some instances, diameters and/or lengths are measured by microscopy.

Figure 12:
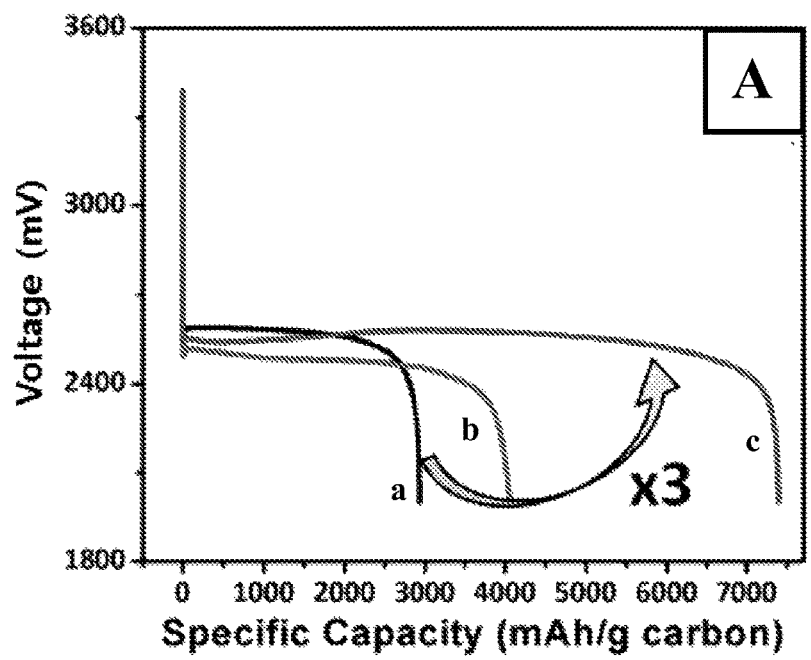
FIG. 12 (A) illustrates improved specific capacities of lithium air battery cathodes comprising high surface area cathode nanostructures and (B) illustrates a TEM of a porous nanofiber comprising a zinc oxide matrix.
Figure 12:
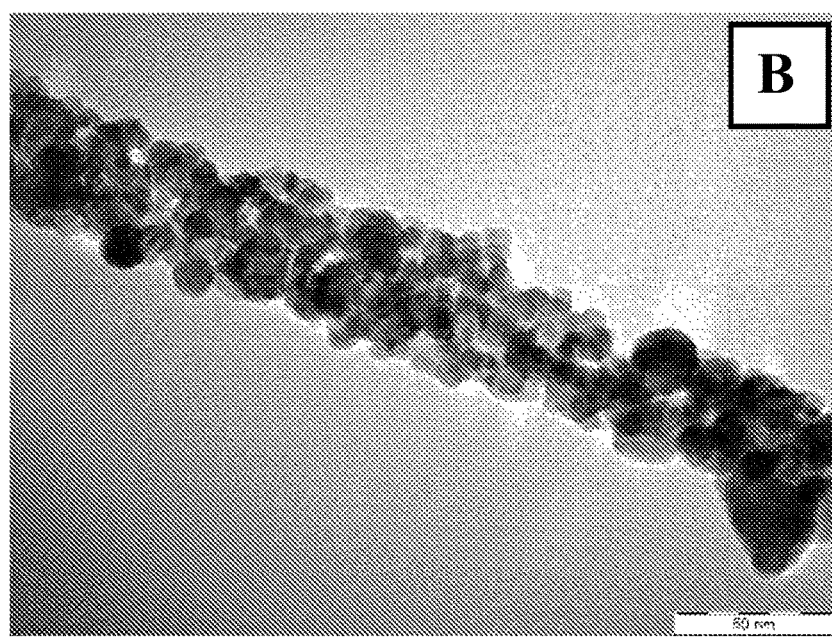

The cathode nanofibers provided herein have any suitable specific surface area (surface area divided by mass (or volume)). In some embodiments, the specific surface area of cathode nanofibers provided herein is at least 0.1 m$^2$/g, at least 1 m$^2$/g, at least 5 m$^2$/g, at least 10 m$^2$/g, at least 50 m$^2$/g, at least 100 m$^2$/g, at least 200 m$^2$/g, at least 500 m$^2$/g, at least 1,000 m$^2$/g, at least 1,500 m$^2$/g, at least 2,000 m$^2$/g, or the like. In specific embodiments, the nanofibers are mesoporous. In some specific embodiments, nanofiber have a surface area (e.g., as measured by BET analysis) have a specific surface area of at least 100 m$^2$/g. FIG. 12 (Panel A) illustrates improved specific capacities of lithium air battery cathodes comprising high surface area cathode nanostructures. FIG. 12A demonstrates that addition of catalyst nanostructures (e.g., zinc oxide nanofibers) to a carbon substrate (e.g., carbon black—such as Super C) (b), as described herein, greatly improves the specific capacity of the cathode over the carbon substrate alone (such as Super C (a)). FIG. 12A further demonstrates that the use of a high specific surface area cathode nanofiber improves the specific capacity of the cathode even further. As can be seen in FIG. 12A, use of a high surface area catalyst nanostructure (e.g., mesoporous nanofiber, such as a mesoporous zinc oxide nanofiber (c)) provides a dramatic improvement in cathode specific capacity (e.g., in the exemplary embodiment illustrated in FIG. 12A, a three fold improvement—to about 7400 mAh/g carbon—is observed).

Figure 21:
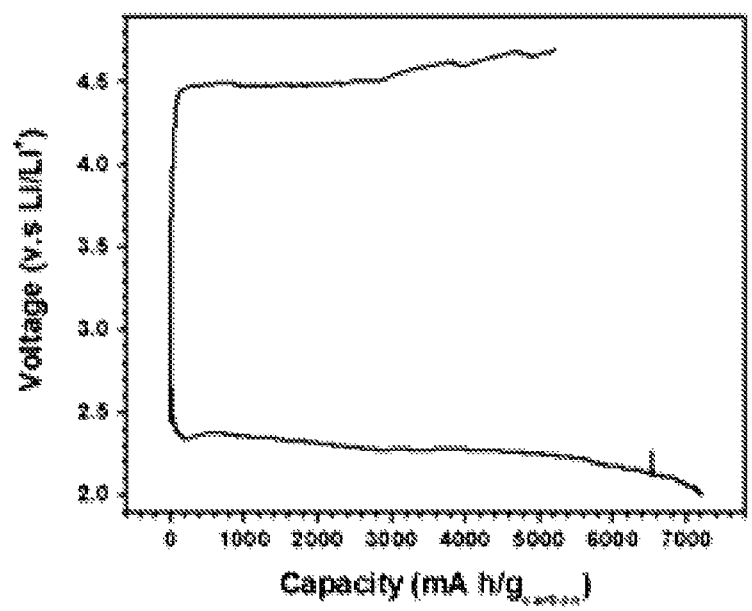
FIG. 21 illustrates exemplary capacities of lithium air battery cathodes comprising nanostructured composites comprising metal catalyst and carbon nanostructures.

FIG. 21 illustrates exemplary capacities of lithium air battery cathodes comprising nanostructured composites comprising metal catalyst (e.g., platinum, gold, zinc oxide, cobalt oxide, or a combination thereof) and carbon nanostructures. In specific instances, the nanostructured composites comprise the metal catalyst and carbon nanostructured inclusions embedded in a carbon matrix (e.g., from carbonized polymer). For example, the nanostructures of FIG. 21 are manufactured by (i) preparing a fluid stock comprising polymer (e.g., PAN), nanostructured carbon (e.g., GNR), and metal precursor (e.g., platinum precursor); (ii) electrospinning the fluid stock, such as by gas-assisted techniques described herein; and (iii) thermally treating the electrospun material (e.g., carbonizing the polymer when conducted under inert and/or reducing conditions, and calcining the metal precursor to a metal or metal oxide). FIG. 21 specifically illustrates exemplary capacities of lithium air battery cathodes comprising nanostructured composites comprising platinum and GNR in a carbon matrix. Other exemplary composites include, by way of non-limiting example, cobalt oxide and nanostructured carbon (e.g., GNR) in a carbon matrix, cobalt oxide, platinum and nanostructured carbon (e.g., GNR) in a carbon matrix, zinc oxide and nanostructured carbon (e.g., GNR) in a carbon matrix, or zinc oxide, platinum and nanostructured carbon (e.g., GNR) in a carbon matrix. In other embodiments, such as in some instances wherein carbonization is conducted under oxidative conditions, such as air, the nanostructured composites lack the carbon matrix.

In some instances, methods disclosed herein (e.g., including using a high loading of uniformly distributed precursor) reduce the number and size of pores. Porosity is also called "void fraction" and is a measure of the void spaces in a material. In some embodiments, porosity is a fraction of the volume of voids over the total volume and is reported as a percentage between 0% and 100%. In various embodiments, the porosity depends on many factors including loading and distribution of precursor in the fluid stock, calcination conditions, mesoporous processing techniques, and the like. The nanofibers have any suitable porosity. In some embodiments, the porosity is at least 1%, at least 5%, at least 10%, at least 20%, at least 25%, at least 50%, at most 1%, at most 5%, at most 10%, at most 25%, at most 50%, or the like. In some embodiments, the porosity is between about 1% and 50%, between about 5% and 20%, or the like.

Manufacturing

Also provided in certain embodiments herein is a process for preparing a lithium air cathode. In some embodiments, the process comprises preparing a cathode nanofiber by, e.g.:
a. electrospinning a fluid stock to produce a precursor material (e.g., nanofiber), the fluid stock comprising or prepared by combining (1) a metal component (e.g., metal precursor, nanoparticles comprising metal and/or metal oxide, or a combination thereof); and (2) polymer; and
b. treating (e.g., thermally and/or chemically treating) the precursor material (e.g., nanofiber) (e.g., to provide calcination of the metal precursor, and/or carbonization or removal of polymer), thereby providing a cathode nanofiber.

In specific embodiments, the metal component of a process or composition described herein comprises a metal precursor, a metal nanoparticle, a metal oxide nanoparticle, a ceramic nanoparticle, or a combination thereof. In specific embodiments, the metal of the metal component comprises any suitable metal. In specific embodiments, the metal of the metal component comprises or is manganese, cobalt, platinum, silver, gold, ruthenium, zinc, one or more oxide thereof, or any combination thereof. In specific embodiments, the metal of the metal component is zinc, cobalt, or a combination thereof. In other specific embodiments, the metal of the metal component is gold, platinum, or a combination thereof. Generally, such nanostructures are optionally combined with a carbon material, such as graphene, carbon black, etc. In specific embodiments, carbon material (or precursor thereof) is optionally present in the fluid stock. In additional or alternative embodiments, the nanostructures are prepared in the absence of carbon material (or precursor thereof) and such nanostructures (pre- or post-treatment) are deposited onto the carbon material (carbon substrate).

More generally, also provided herein is a process for preparing metal-carbon (e.g., composite/hybrid) nanostructures. Such nanostructures are optionally utilized in lithium air batteries, as described herein, or may be used in any other suitable application. In some embodiments, the process comprises preparing such a composition by, e.g.:
a. electrospinning a fluid stock to produce a precursor material (e.g., nanofiber), the fluid stock comprising or prepared by combining (1) a metal component (e.g., metal precursor, nanoparticles comprising metal and/or metal oxide, or a combination thereof); (2) polymer; and (3) carbon material (e.g., graphene or carbon black) or carbon precursor (e.g., cellulose); and
b. treating (e.g., thermally and/or chemically treating) the precursor material (e.g., nanofiber) (e.g., to provide calcination of the metal precursor, and/or carbonization or removal of polymer), thereby providing a metal-carbon composite nanostructure.

In further or additional embodiments, the process comprises preparing such a composition by, e.g.:
a. electrospinning a fluid stock to produce a precursor material (e.g., nanofiber), the fluid stock comprising or prepared by combining (1) a metal component (e.g., metal precursor, nanoparticles comprising metal and/or metal oxide, or a combination thereof); and (2) polymer;
b. depositing precursor material (e.g., nanofiber) onto a carbon substrate (e.g., carbon black or graphene); and
c. treating (e.g., thermally and/or chemically treating) the precursor nanofiber (e.g., to provide calcination of the metal precursor, and/or carbonization or removal of polymer), thereby providing a metal-carbon composition.

In further or additional embodiments, the process comprises preparing such a composition by, e.g.:
a. electrospinning a fluid stock to produce a precursor material (e.g., nanofiber), the fluid stock comprising or prepared by combining (1) a metal component (e.g., metal precursor, nanoparticles comprising metal and/or metal oxide, or a combination thereof); and (2) polymer;
b. treating (e.g., thermally and/or chemically treating) the precursor material (e.g., nanofiber) (e.g., to provide calcination of the metal precursor, and/or carbonization or removal of polymer) to produce a treated material (e.g., nanofiber, such as metal, or metal oxide, or calcined nanofiber); and
c. depositing the treated material onto a carbon substrate (e.g., carbon black or graphene), thereby providing a metal-carbon composition.

Precursors

In specific embodiments, the metal component is a metal precursor. In some embodiments, the precursor is a metal containing compound that is associated with at least one ligand. In certain embodiments, the metal-ligand association is associated via any suitable type of bond or interaction (e.g., an ionic bond, a covalent bond, a coordination complex between ligand and metal, or the like). In some instances a precursor described herein is associated with a polymer instead of, or in addition to, other ligands—such compounds are intended to be considered was metal-ligand associations (whether or not additional ligands are present).

In specific embodiments, the metal precursor is a metal-ligand association (complex) (e.g., a coordination complex), each metal precursor comprising metal atom(s) associated (complexed) with one or more ligand(s) (e.g., 1-10, 2-9, or any suitable number of ligands). In specific embodiments, the precursor described herein comprises at least two different types of ligand (e.g., at least one acetate and at least one halide). In some embodiments, the precursor is a metal carboxylate (e.g., —OCOCH$_3$ or another —OCOR group, wherein R is an alkyl, substituted alkyl, aryl, substituted aryl, or the like). In certain embodiments, the precursor is a metal nitrate. In some embodiments, the precursor is a metal alkoxide (e.g., a methoxide, ethoxide, isopropyl oxide, t-butyl oxide, or the like). In some embodiments, the precursor is a metal halide (e.g., chloride, bromide, or the like). In certain embodiments, the precursor is a diketone (e.g., acetylacetone, hexafluoroacetylacetone, or the like). In other embodiments, any suitable ligand may be utilized in a metal-ligand association (metal precursor) described herein, e.g., ketones, diketones (e.g., a 1,3-diketone, such as ROC-CHR'COR group, wherein R is an alkyl, substituted alkyl, aryl, substituted aryl and R' is R or H), carboxylates (e.g., acetate or —OCOR group, wherein each R is independently an alkyl, substituted alkyl, aryl, substituted aryl), halides, nitrates, amines (e.g., NR'$_3$, wherein each R" is independently R or H or two R", taken together form a heterocycle or heteroaryl), and combinations thereof. Further examples include iodide, bromide, sulfide (e.g., —SR), thiocyanate, chloride, nitrate, azide, fluoride, hydroxide, oxalate, water, nitrite (e.g., RN$_3$), isothiocyanate, acetonitrile, pyridine, ammonia, ethylenediamine, 2,2'-bipyridine, 1,10-phenanthroline, nitrite, triphenylphosphate, cyanide, carbon monoxide, or alko-oxide. In some embodiments, the metal precursor is optionally utilized in a hydrate or solvate form.

In specific embodiments, the metal precursor is manganese acetate, cobalt acetate, platinum acetate, silver acetate, gold acetate, ruthenium acetate, zinc acetate, manganese acetylacetonate, cobalt acetylacetonate, platinum acetylacetonate, silver acetylacetonate, gold acetylacetonate, ruthenium acetylacetonate, zinc acetylacetonate, manganese halide (e.g., chloride), cobalt halide (e.g., chloride), platinum halide (e.g., chloride), silver halide (e.g., chloride), gold halide (e.g., chloride), ruthenium halide (e.g., chloride), zinc halide (e.g., chloride), or a combination thereof. In more specific embodiments, the metal precursor is zinc acetate, cobalt acetate, zinc acetylacetonate, cobalt acetylacetonate, zinc halide (e.g., chloride), cobalt halide (e.g., chloride), or a combination thereof.

In some embodiments, a fluid stock provided herein comprises and/or is prepared by combining at least two different types of metal components. In certain embodiments, a cathode nanofiber provided herein comprises at least two different types of metal components (e.g., as an alloy or composite).

Polymers

In specific embodiments, the polymer is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Water soluble or swellable polymers are generally at least somewhat hydrophilic. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, a polymer described herein (e.g., in a process, precursor nanofiber, a fluid stock, or the like) is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like).

In some embodiments, the polymer is used as a polymer melt or a polymer solution (e.g., in an organic solvent or water). In certain embodiments, the polymer is a block copolymer, such as any copolymer comprising blocks of any polymers described herein, or a polymer blend, such as a blend of any polymers described herein.

For example, in certain embodiments, the block co-polymer comprises a polyvinyl alcohol (PVA) block, a polyethylene oxide (PEO) block, polyvinylpyridine block or any combination thereof. In certain embodiments, block co-polymers provided herein comprise a first block and a second block, the first block being more or less hydrophobic or lipophilic than the second block. In some embodiments, the second block (e.g., the more hydrophobic or lipophilic block) is any suitable polymer block, such as a polyimide block, a polylactic acid (PLA) block, a polypropylene oxide (PPO) block, polystyrene (PS) block, a nylon block, a polyacrylate block (e.g., poly acrylic acid, polyalkylalkacrylate—such as polymethylmethacrylate (PMMA), polyalkylacrylate, polyalkacrylate), polyacrylamide (PAA) block, polyvinylpyrrolidone (PVP) block, polyacrylonitrile (PAN), or any combination thereof. In some embodiments, the block co-polymer comprises a thermally or chemically degradable polymer block (e.g., as a less hydrophobic/lipophilic block), e.g., a polyisoprene (PI) block, a polylactic acid (PLA) block, a polyvinyl alcohol (PVA) block, a polyethylene oxide (PEO) block, a polyvinylpyrrolidone (PVP) block, polyacrylamide (PAA) block or any combination thereof. In certain embodiments, the block co-polymer comprises thermally or chemically stable polymer block, e.g., a polystyrene (PS) block, a poly(methyl methacrylate) (PMMA) block, a polyacrylonitrile (PAN) block, or any combination thereof. In certain embodiments, the block co-polymer comprises a block degradable under chemical or thermal conditions, and a second block that is not degradable under such conditions.

In specific embodiments, a block co-polymer described herein is or comprises PI-b-PEO, PAN-b-PEO, PVA-b-PS, PEO-b-PPO-b-PEO, PPO-b-PEO-b-PPO, PVA-b-PEO, PVA-b-PAN, PVA-b-PPO, PI-b-PS, PEO-b-PS, PI-b-PS, PVA-PMMA, PVA-PAA, PEO-b-PMMA, or a combination thereof. In more specific embodiments, the block co-polymer comprises PI-b-PS, PS-b-PLA, PMMA-b-PLA, PI-b-PEO, PAN-b-PEO, PVA-b-PS, PEO-b-PPO-b-PEO, PPO-b-PEO-b-PPO, or any combination thereof. In certain embodiments, the polymer is PVA-b-PS, PVA-b-PEO, PEO-b-PPO, PEO-b-PPO-b-PEO, or the like. In some embodiments, the polymer is a polymer blend (e.g., comprising PVA and PS, PVA and PEO, PEO and PPO, or the like). In some embodiments, such electrospinning techniques are gas assisted (e.g., common-axially gas assisted).

In some embodiments, use of block copolymers or a polymer blend is utilized to prepare a mesoporous nanofiber (e.g., comprising a mesoporous continuous matrix of lithium). In some embodiments, after electrospinning a polymer containing nanofiber described herein, the nanofiber is annealed. In some embodiments, the annealing is performed thermally and/or chemically and/or using any other suitable mechanism.

In some embodiments, the polymer imparts a suitable elongational viscosity to the fluid stock for electrospinning nanofibers. In some embodiments, low shear viscosity leads to beaded nanofibers. In one aspect, uniform distribution of the precursor in the fluid feed helps to maintain a suitably high elongational viscosity.

In some embodiments, the polymer or fluid stock has an viscosity of at least 50 poise, at least 100 poise, at least 200 poise, at least 300 poise, at least 400 poise, at least 500 poise, at least 600 poise, at least 800 poise, at least 1,000 poise, at least 1,500 poise, at least 2,000 poise, at least 2,500 poise, at least 3,000 poise, at least 5,000 poise, and the like. A polymer in used in a process or found in a composition herein has any suitable molecular weight. In some embodiments, the polymer has a molecular weight of at least 20,000 atomic mass units ("amu"), at least 50,000 amu, at least 100,000 amu, at least 200,000 amu, at least 300,000 amu, at least 400,000 amu, at least 500,000 amu, at least 700,000 amu, or at least 1,000,000 amu and the like. A polymer in used in a process or found in a composition herein has any suitable PDI (weight average molecular weight divided by the number average molecular weight). In some embodiments, the polymer has a polydispersity index of about 1 to about 10, about 2 to about 5, about 1 to about 5, or the like.

Fluid Stock

In some embodiments, provided herein are fluid stocks comprising and/or methods comprising electrospinning a fluid stock comprising a polymer. The methods described herein optionally utilize an aqueous fluid stock. In some applications, a water-based process is desirable, for instance if one wants to avoid potential health, environmental, or safety problems associated with organic solvents. As described herein, in some embodiments it is advantageous to electrospin a fluid stock that is homogenous. In some embodiments, the fluid stock is homogenous (e.g., which comprises a water-soluble polymer)

Figure 6:
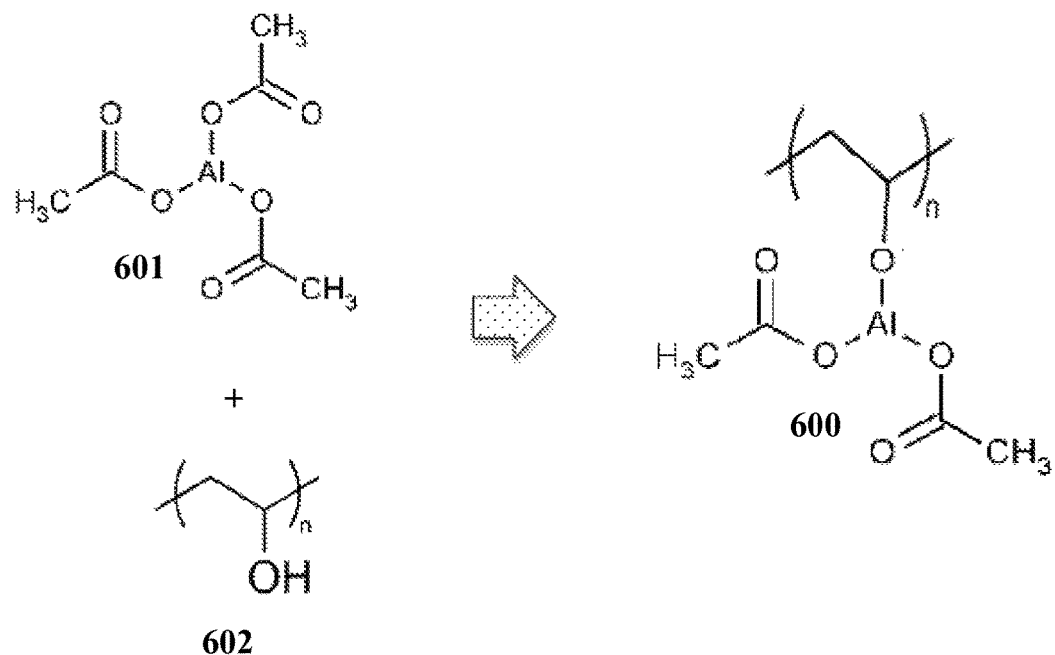
FIG. 6 illustrates an exemplary metal precursor combined with a polymer to provide a metal precursor-polymer association.

In certain embodiments, a fluid stock provided herein is prepared by combining a metal component (e.g., metal precursor or metal and/or metal oxide nanoparticles) and a polymer in a liquid medium (e.g., in water). In some embodiments, a metal component is combined with the polymer in a metal component to polymer weight-to-weight ratio of at least 1:2 (e.g., at least 1:1, or at least 1.25:1). In other embodiments, the ratio is at least 1:9, at least 1:8, at least 1:7, at least 1:6, at least 1:5, at least 1:4, at least 1:3, at least 1:2, at least 1:1.75, at least 1:1.5, or at least 1:1.25. In other embodiments there is about equal weights of metal component and polymer. In some embodiments, there is more metal component than polymer by weight. In some embodiments, the weight ratio of the metal component to polymer is at least 1.25:1, at least 1.5:1, at least 1.75:1, at least 2:1, at least 3:1, or at least 4:1. In yet other embodiments, the weight ratio of metal component to polymer is about 1:2 to about 5:1, or about 1:1 to about 4:1. FIG. 6 illustrates an exemplary metal precursor 601 combined with a polymer 602 to provide a metal precursor-polymer association 603. In such embodiments, the amount of polymer refers to the polymer component (i.e., excluding the metal and any non-polymer ligand) and the metal component refers to the metal that is complexed to polymer, along with any non-polymer ligands (as well as any non-polymer-complexed metal precursor present in the fluid stock). In some instances such an association process may be complete (i.e., all metal precursor and/or polymer reactive sites may be associated), and in other instances, some of the metal precursor and/or polymer reactive sites (e.g., —OH groups for the PVA of FIG. 6) may remain unassociated. In some embodiments, all or part of the metal component is associated with the polymer and the metal reagent component to polymer weight-to-weight ratio is determined by the ratio of the sum of the associated and non-associated metal component to the polymer.

In certain embodiments, treatment of a precursor nanofiber (also referred to herein as an electrospun nanofiber) described herein (e.g., a precursor nanofiber comprising a polymer and a metal component) comprises thermally treating the precursor nanofiber (e.g., as-electrospun or further treated). In further embodiments, treatment of a precursor nanofiber described herein comprises thermally and/or chemically treating the precursor nanofiber.

The fluid stock contains any suitable amount of polymer. The weight percent of polymer in the fluid stock is represented as the weight percent of polymer (whether the polymer is associated with metal component or not). In some embodiments, the fluid stock comprises at least about 0.5 weight %, at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 12 weight %, at least about 14 weight %, at least about 16 weight %, at least about 18 weight %, at least about 20 weight %, at least about 30 weight %, or at least about 40 weight % polymer. In some embodiments, the fluid stock comprises from about 1 weight % to about 20 weight % polymer. In some embodiments, the fluid stock comprises from about 1 weight % to about 10 weight %, from about 1 weight % to about 5 weight %, from about 5 weight % to about 20 weight %, from about 5 weight % to about 10 weight %, from about 10 weight % to about 15 weight %, or from about 15 weight % to about 20 weight % polymer.

In certain embodiments, polymer concentration in the fluid stock is determined on a monomeric residue concentration. In other words, the concentration of the polymer is determined based on the concentration of polymeric repeat units present in the stock. For example, polymer concentration of polyvinyl alcohol may be measured based on the concentration of (—CH$_2$CHOH—) present in the fluid stock. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In at least 5 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the precursor in the fluid stock is between 5 mM and 5 M, between 200 mM and 1 M, between 100 mM and 700 mM, and the like. In some embodiments, the concentration of metal component (e.g., precursor) in the fluid stock to monomeric residue in the fluid stock is at least 1:4. In specific embodiments, the concentration of metal component (e.g., precursor) in the fluid stock to monomeric residue in the fluid stock is at least 1:3. In more specific embodiments, the concentration of metal component (e.g., precursor) in the fluid stock to monomeric residue in the fluid stock is at least 1:2. In still more specific embodiments, the concentration of metal component (e.g., precursor) in the fluid stock to monomeric residue in the fluid stock is at least 1:1.2. In yet more specific embodiments, the concentration of metal component (e.g., precursor) in the fluid stock to monomeric residue in the fluid stock is about 1:1 (e.g., within 5%). In other embodiments, the concentration of metal component (e.g., precursor) in the fluid stock to monomeric residue in the fluid stock is at least 1:10, at least 1:8, at least 1:6, at least 1:1.5, at least 1:3.5, at least 1:2.5, or any suitable ratio.

In one aspect, the concentration of metal component (e.g., precursor) in the fluid stock is high. The concentration is any suitable concentration. In some embodiments, the concentration of the metal component (e.g., precursor) in the fluid stock is about 5 mM, about 10 mM, about 20 mM, about 40 mM, about 60 mM, about 80 mM, about 100 mM, about 150 mM, about 200 mM, about 250 mM, about 300 mM, about 350 mM, about 400 mM, about 500 mM, about 700 mM, about 900 mM, about 1.2 M, about 1.5 M, about 2 M, about 5 M, and the like. In some embodiments, the concentration of the metal component (e.g., precursor) in the fluid stock is at least 5 mM, at least 10 mM, a at least 20 mM, at least 40 mM, at least 60 mM, at least 80 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the metal component (e.g., precursor) in the fluid stock is between 5 mM and 5 mM, between 20 mM and 1 M, between 100 mM and 700 mM, between 100 mM and 300 mM, and the like.

In some embodiments, a fluid stock is prepared by (i) dissolving or dispersing a metal component (e.g., precursor) in a first fluid (e.g., water, or another aqueous medium) to form a first composition; (ii) dissolving or dispersing a polymer in a second fluid (e.g., water, or another aqueous medium) to form a second composition; and (iii) combining at least a portion of the first and second compositions to form the fluid stock.

In some embodiments, the fluid stock and/or precursor nanofiber comprises a high loading of metal component. In some embodiments, the polymer is at least 20% loaded with metal component (i.e., at least 20% of the reactive sites of the polymer are associated with a metal component). In specific embodiments, the polymer is at least 35% loaded with metal component. In more specific embodiments, the polymer is at least 50% loaded with metal component. In still more specific embodiments, the polymer is at least 75% loaded with metal component. In various embodiments, the polymer is at least 20%, at least at least 30%, at least 40%, at least 50%, at least 60%, at least 70%, at least 75%, at least 80%, at least 85%, at least 85%, at least 90%, at least 95%, at least 96%, at least 97%, at least 98%, or at least 99% loaded with metal component. In some instances, the polymer is about 50% to 100%, about 70% to 100%, about 90% to 100%, about 50% to about 90%, about 60% to about 80%, or about 20% to about 50% loaded with metal component.

Electrospinning

Any suitable method for electrospinning is used. In some instances, elevated temperature electrospinning is utilized. Exemplary methods for comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process. In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some embodiments, incorporating a gas stream inside a fluid stock produces hollow nanofibers. In some embodiments, the fluid stock is electrospun using any method known to those skilled in the art.

In specific embodiments, the process comprises commonaxial (i.e., substantially concentric electrospinning of multiple fluids—also referred to herein as coaxial) electrospinning (electrospinning two or more fluids about a common axis). As described herein, coaxial electrospinning a first fluid stock as described herein (i.e., prepared by combining or comprising (i) metal precursor or metal/metal oxide nanoparticles and (ii) a polymer) with a second fluid is used to add coatings, make hollow nanofibers (e.g., the center fluid is a removable oil or gas), make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning). In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas. In other embodiments, the second fluid is a second fluid stock having the characteristics as described herein. In further specific embodiments, a third fluid is optionally a gas (e.g., providing gas-assisted electrospinning of a multi-layered nanofiber).

Figure 7:
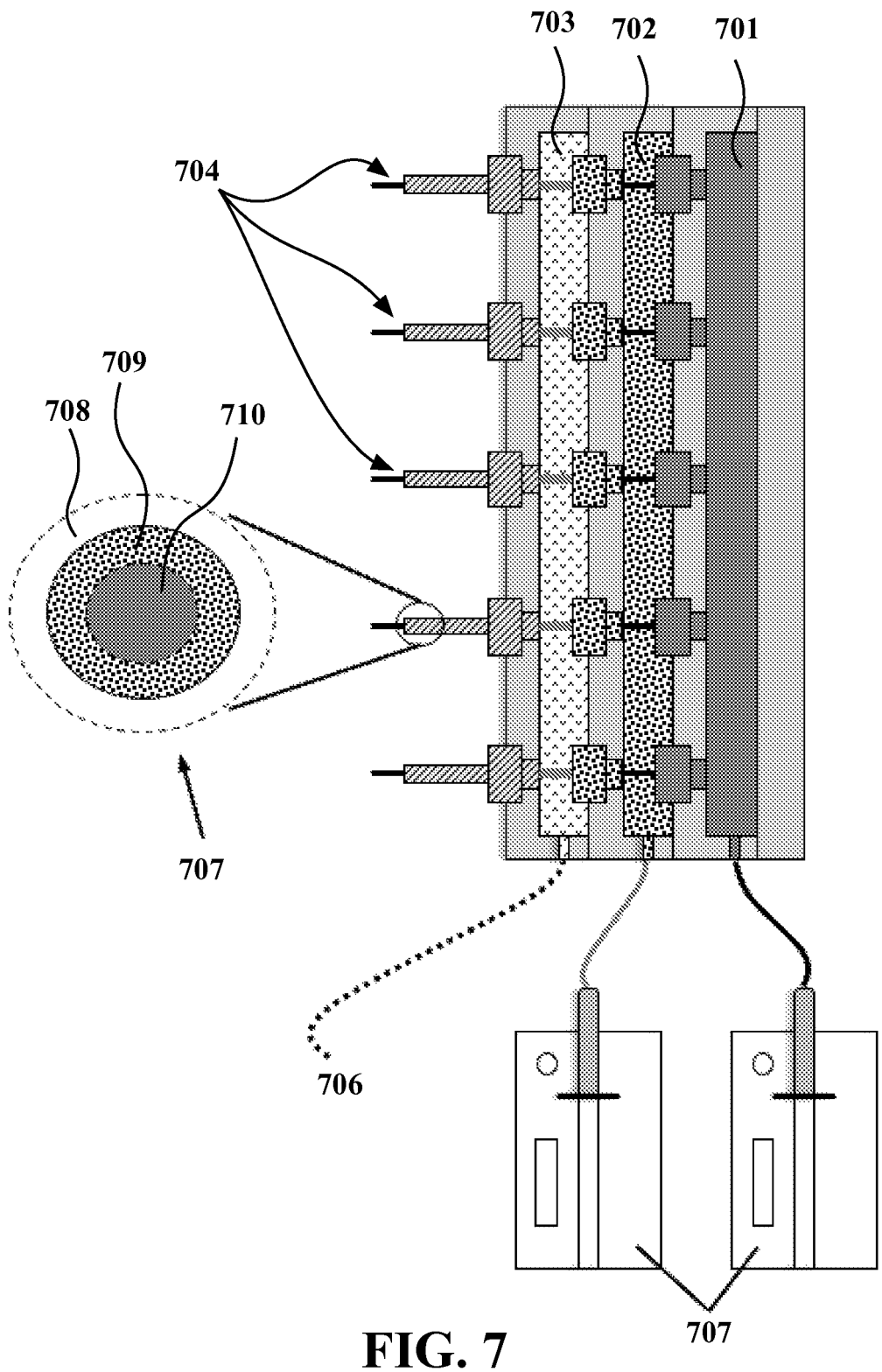
FIG. 7 illustrates an exemplary schematic of a process or apparatus described herein, e.g., for preparing a continuous matrix nanofiber or a layered nanocomposite nanofiber by a common-axial (co-axial) gas assisted electrospinning process.
Figure 8:
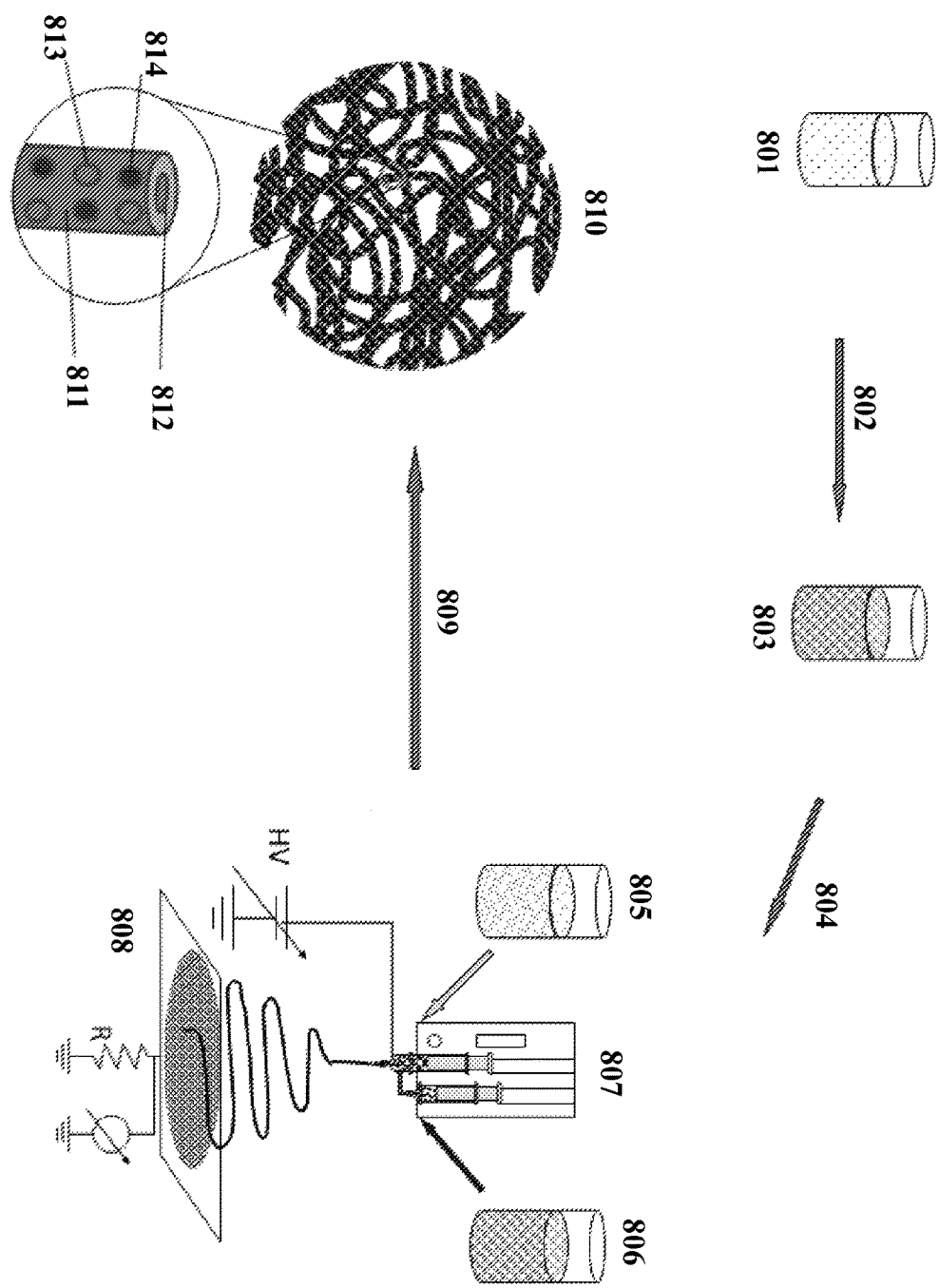
FIG. 8 illustrates an exemplary schematic of a nanofiber manufacturing process described herein.

FIG. 7 illustrates an exemplary schematic of a process or apparatus described herein, e.g., for preparing a layered nanocomposite nanofiber by a common-axial (co-axial) gas assisted electrospinning process. In some instances, a first fluid stock 701 (e.g., comprising a metal reagent component and a polymer) is electrospun with an optional second fluid stock 702 (e.g., comprising a second metal precursor and a second polymer, the second precursor and polymer independently being either the same or different from the first), and a third fluid (e.g., gas) 703. The fluid stocks may be provided to the apparatus by any device, e.g., by a syringe 705. And the gas may be provided from any source 706 (e.g., air pump). In some embodiments such an apparatus comprises a plurality of common-axial (co-axial) needles 704. Exemplary needles, as illustrates by the cross section 707, comprise an outer sheath tube 708 (e.g., having a supply end and a nozzle end), at least one intermediate tube 709 (e.g., having a supply end and a nozzle end), and a core tube 710 (e.g., having a supply end and a nozzle end). In specific instances, each of the tubes are coaxially or common-axially aligned (i.e., aligned along the substantially same axis). In certain embodiments, such a process may be utilized to prepare a nanofiber comprising a core and a sheath layer. In some embodiments, the intermediate tube may be absent and a fluid stock may be electrospun in a gas-assisted manner (i.e., the sheath tube provides a high velocity gas and the center tube provides a fluid stock)—e.g., to provide a non-layered nanofiber. In other embodiments, the fluid stock may be electrospun from the sheath tube, the intermediate tube may be absent and the gas may be provided from the core tube (e.g., to produce a hollow nanofiber, which may be further treated/processed according to the techniques described herein to produce a hollow carbonaceous nanofiber). In some instances, the tube or nozzle end of any tube (e.g., any tube providing a fluid stock is) heated or capable of being heated. In some instances, heating of the nozzle provides for improved electrospinning performance and/or electrospun nanofiber morphology. Exemplary manufacturing of nanofibers are illustrated in the schematic of FIG. 8. In certain instances, a polymer fluid stock 801 is prepared by combining (i) a polymer (e.g., PVA, PAN, PEO, or the like) with (ii) inorganic precursors (e.g., metal nitrate, acetate, acetylacetonate, or the like) and/or nanoinclusions (e.g., nanoparticles), such as metal, metal oxide, carbon, or the like. In some instances, the stock is prepared by heating and/or mixing 802, such as to prepare a homogeneous solution or suspension 803. Generally, the fluid stock has a viscosity suitable for electrospinning (e.g., gas assisted electrospinning, which may allow for a higher viscosity than non-gas-assisted processes). In some instances, a single fluid stock or multiple fluid stocks (e.g., to produce layered nanostructures) are optionally electrospun 804, such as using a first fluid stock 805 that is fed into the inner nozzle (e.g., forming an inner jet when expelled) of a electrospinning apparatus (e.g., dual syringe pump) 807, and a second fluid stock 806 that is fed into the outer nozzle of an electrospinning apparatus. In some instances, the non-woven and/or aligned nanofibers 810 are collected on a collector 808 and optionally thermally treated or otherwise calcined 809 to remove or carbonize organics and calcine metal precursors to, e.g., metals (e.g., under reducing or inert conditions) or metal oxides (e.g., under oxidizing conditions, such as air or oxygen). In certain embodiments, the nanofiber comprises at least one matrix material. In some instances, the fibers comprise at least two matrix materials, such as a shell/substrate material 811 and a core material 812 (such as when an inner and outer fluid stock are utilized). In certain embodiments, the matrix material comprises at least one inclusion, such as a metal catalyst material and/or a carbon inclusion material. In specific embodiments, at least two types of inclusions 813 and 814 (e.g., metal oxide and carbon inclusion) are provided in the matrix (e.g., carbon matrix).

In some embodiments, an electrospinning process described herein comprises dispersing and/or maintaining the dispersion of the fluid stock (e.g., uniformly dispersed or homogenously dispersed). In some embodiments, to achieve or maintain dispersion, the fluid stock is heated and/or agitated (e.g., by stirring, mixing, sonicating, vortexing, or like techniques).

Post Electrospinning Treatment

In specific embodiments, treatment of a precursor nanofiber described herein comprises carbonizing the polymer to form (e.g., through at least partial conversion of the polymer) a continuous carbon nanofiber matrix. In other embodiments, treatment of a precursor nanofiber described herein comprises treating the nanofiber to remove the polymer (and other organic residues, such as ligands from the metal component if precursors using organic ligands are utilized). In certain embodiments, wherein metal precursors are utilized, treatment of the precursor nanofiber serves to calcine the metal precursor to, e.g., a metal, metal oxide, or the like.

In specific embodiments, thermal treatment described herein is performed at a temperature of about 400° C. to about 2000° C. (e.g., under inert conditions or under oxidative conditions—such as air). In specific embodiments, thermal treatment is performed at a temperature of about 400° C. to about 1500° C., or about 600° C. to about 1200° C. In specific embodiments, thermal treatment described herein is performed at about 600° C. to about 1000° C. In specific embodiments, thermal treatment of the precursor nanofiber is performed at about 600° C., about 700° C., about 800° C., about 900° C., 1000° C., 1200° C., or the like—e.g., as illustrated in the examples.

In some embodiments, thermal treatment is performed at a constant or variable temperature. In some embodiments, the treatment conditions comprise using a temperature gradient. In some embodiments, the temperature increases from a first temperature (e.g., the temperature of the electrospinning process, optionally room temperature) to a second temperature. In certain embodiments, treatment conditions comprise utilization of a temperature increase during the treatment process. In some instances, the rate of temperature increase is any suitable rate, for example about 1° C./min to about 35° C./min. In some embodiments, the treatment occurs for any suitable amount of time. In specific embodiments, the dwell time at the maximum (second) temperature occurs for 10 minutes to 20 hours, or any other suitable amount of time.

In some embodiments, treatment procedures are performed under inert conditions (e.g., under argon or nitrogen). In some instances, treatment procedures are performed under reducing conditions (e.g., under hydrogen, or a mixture of hydrogen and argon). In some embodiments, if a metal component that is a metal is desired, treatment procedures are performed under such reducing conditions. In specific embodiments, inert and/or reducing conditions are utilized to prepare nanofibers having a continuous carbon matrix (e.g., for converting polymer to carbon without oxidizing the carbon to carbon monoxide or carbon dioxide). In further embodiments, treatment procedures are performed under oxidative conditions (e.g., under air or other oxygen containing gases). In some embodiments, if a metal component that is a metal oxide or ceramic is desired, treatment procedures are performed under oxidative conditions. In some embodiments, treatment conditions include gaseous conditions, liquid conditions, or the like. In specific embodiments, inert or oxidizing conditions are utilized to prepare nanofibers having a continuous metal component (e.g., a metal catalyst as described herein, such as a metal, metal oxide, or a combination thereof). In certain cases, where non-oxidized metal is desired for the metal catalyst, the process optionally further comprises reducing the treated nanofibers.

Figure 9:
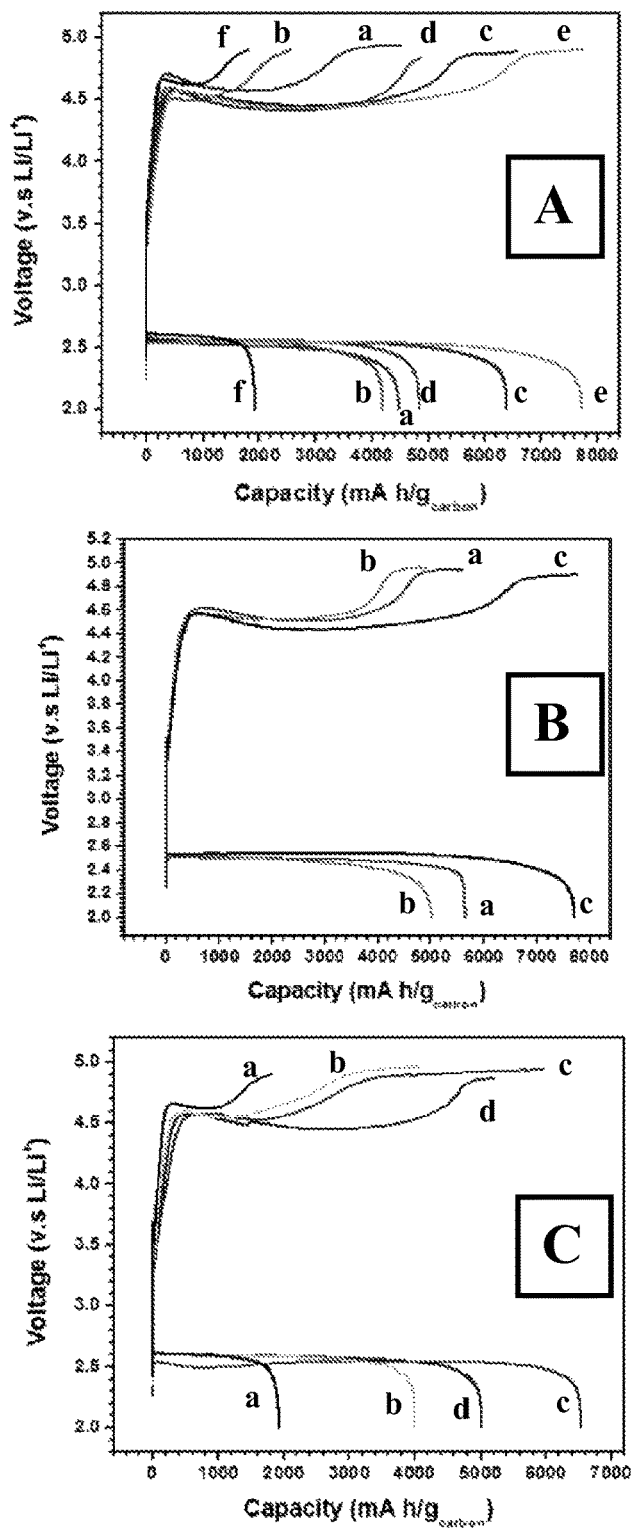
FIGS. 9 (A-C) illustrates initial charge/discharge cycles for various cathodes described herein comprising metal catalyst nanofibers (e.g., zinc oxide, cobalt oxide) manufactured using various precursor loading and post-electrospinning thermal treatment parameters.

FIG. 9 illustrates lithium-air charge/discharge comparisons for exemplary cathodes comprising carbon black (Super C65) or carbon black (Super C65) and a metal catalyst nanofiber material. Panel A illustrates the comparisons for various zinc oxide nanofibers, prepared using different metal precursor-to-polymer ratios in preparing the fluid stock (e.g., at ratios of 1:1, 2:1, or 3:1) and different thermal treatment parameters (e.g., at 600° C., 700° C., 800° C., or 900° C.). For the exemplary material prepared from a 3:1 ratio metal precursor-to-polymer fluid, the cathode prepared using an 800° C. thermal treatment (a) exhibits slightly higher discharge capacity than the one under 600° C. treatment (b). Further, for exemplary material prepared from a 1:1 ratio metal precursor-to-polymer fluid, the cathode prepared using a 900° C. thermal treatment (e) a very highest initial discharge capacity (~7700 mA h/g carbon). Other results are illustrated for 1:1 loading with thermal treatment at 700° C. (c), and 2:1 loading with thermal treatment at 700° C. (d). All exhibit marked improvements over carbon black alone (a). Panel B illustrates results for various zinc oxide nanofibers at different catalyst to carbon loading percentages. The zinc oxide nanofibers are prepared by using precursor-to-polymer ratios of 1:1 and thermally treating at 900° C., using nanofiber loading of 10 wt. % (a), 20 wt. % (c), and 40 wt. % (b). Panel C illustrates results for various cobalt oxide nanofibers on carbon substrate, prepared using different thermal treatment parameters (e.g., at 700° C. (b), 1000° C. (c), or 1200° C. (d)) compared to Carbon Super C65 substrate (a) alone. The resultant cathodes provided good initial discharge capacities—between about 4000 mAh/g (for the nanofibers treated at 700° C.) carbon and about 6500 mAh/g carbon (for the nanofibers treated at 1000° C.).

In some instances, treatment of an electrospun nanofiber results in a nanofiber described herein (e.g., nanofiber having a continuous (e.g., core) carbon matrix and discrete isolated domains of metal and/or metal oxide, or a continuous (e.g., core) metal or metal oxide matrix). In some embodiments, the nanofiber consists essentially of pure metal and/or metal oxide and optional carbon matrix material (i.e., optionally including small amounts of other materials). In some embodiments, the other materials are residual polymer, residual carbonaceous material (e.g., degraded ligand and/or polymer), minor amounts of oxygen (in the case of the metal component being a metal, not a metal oxide), or other components of the fluid stock.

In one aspect, the process has a high yield (e.g., which is desirable for embodiments in which the precursor is expensive). In some embodiments, the metal atoms in the nanofiber are about 10%, about 20%, about 30%, about 33%, about 40%, about 50%, about 60%, about 70%, about 80%, about 90%, about 95%, about 98%, or about 100% of the number of (e.g., in moles) precursor molecules in the fluid stock. In some embodiments, the metal atoms in the nanofiber are at least 10%, at least 20%, at least 30%, at least 33%, at least 40%, at least 50%, at least 60%, at least 70%, at least 80%, at least 90%, at least 95%, at least 98%, or at least 99% of the moles of precursor molecules in the fluid stock. In some embodiment, the moles of precursor molecules in the nanofiber are between about 10% and about 40%, between about 20% and about 50%, or between about 50% and about 100% of the moles of precursor molecules in the fluid stock.

In certain embodiments, e.g., wherein block copolymers or polymer blends are utilized, the process further comprises annealing the precursor nanofiber, prior to calcination treatment. In some instances, upon preparation of a precursor nanofiber (e.g., spinning of or annealing of the nanofiber), the different blocks of block copolymers or different polymers of polymer blends arrange into ordered structures, such as cubic-type structures, hexagonal-type structures, reverse hexagonal-type structures, lamellar-type structures, helical-type structures, assembled micelle-type structures, gyroid-type structures, spherical structures, cylindrical structures, layered structures, channel structures, bicontinuous structures, or the like. In some embodiments, upon calcination treatment (e.g., thermal and/or chemical treatments described herein—such as to remove organic residues and convert metal precursor/ions/etc. to metal catalyst—e.g., metal or metal oxide) of ordered nanofibers (e.g., comprising polymer and metal—e.g., metal ions, metal precursor, metal-polymer associations, or the like) produces mesoporous nanofibers comprising a mesoporous continuous matrix of metal catalyst (e.g., metal or metal oxide, or a combination thereof). More detailed descriptions of obtaining mesoporous metal-containing and metal-matrix nanofibers are described in PCT/US13/26060, entitled "Ordered Porous Nanofibers, Methods, and Applications," which is incorporated herein by reference for such disclosure.

Carbon Loading

Loading of the metal material (e.g., metal catalyst material) on the carbon is achieved in any suitable manner. For example, in some embodiments, precursor nanofiber is optionally electrospun directly onto a carbon substrate, followed by treatment (e.g., thermal treatment) of the precursor nanofiber. In other examples, the process further comprises loading the precursor nanofiber onto a carbon substrate. In still other examples, the process further comprises loading treated cathode nanofiber onto a carbon substrate. In certain instances, the treated cathode nanofiber is optionally fragmented into smaller aspect ratio cathode nanofibers (e.g., providing materials having beneficial characteristics of high aspect ratio materials, while also providing materials easier to process) prior to loading onto the carbon substrate. In yet other examples, the process comprises electrospinning a fluid stock comprising the carbon substrate (or precursor thereof) therein.

Further, in some embodiments, carbon substrate material (e.g., nanostructured carbon, such as graphene nanoribbons or other dispersible carbon nanostructured material) is loaded into the fluid stock and electrospun with the polymer and metal component (e.g., precursor). In some embodiments, following thermal treatment, cathode nanofibers resulting therefrom themselves comprise both metal catalyst and carbon substrate materials.

In various embodiments, any suitable amount of catalyst is loaded on the carbon. In some embodiments, the amount of catalyst loaded (e.g., nanostructured metal catalyst) on the carbon is about 5 wt. % to about 50 wt. %. In more specific embodiments, the catalyst is loaded on the carbon in an amount of about 10 wt % to about 30 wt. %, e.g., about 15 wt % to about 25 wt %. In more specific embodiments, the amount of catalyst loaded on the carbon substrate is about 20 wt %.

Further Cathode Manufacturing

In other embodiments, the process comprises preparing a cathode material (e.g., a cathode nanostructure material, or a carbon substrate (composite) material) by, e.g.:

combining (1) metal reagent (e.g., metal precursor, nanoparticles comprising metal and/or metal oxide, or a combination thereof); and (2) a carbon substrate (e.g., a nanostructured carbon substrate, such as carbon nanotubes, carbon nanofibers, nanostructured graphene—such as sheets or ribbons—or the like); and thermally treating the combination (e.g., to provide calcination of the metal precursor, and/or carbonization or removal of any organic materials), thereby providing a cathode material (e.g., a cathode nanostructure material).

In various embodiments, any suitable metal reagent is optionally utilized. In some embodiments, the metal reagent is any reagent, such as described above. In certain embodiments, the metal reagent is a metal precursor, such as described herein. In specific embodiments, the metal precursor is manganese acetate, cobalt acetate, platinum acetate, silver acetate, gold acetate, ruthenium acetate, zinc acetate, manganese acetylacetonate, cobalt acetylacetonate, platinum acetylacetonate, silver acetylacetonate, gold acetylacetonate, ruthenium acetylacetonate, zinc acetylacetonate, manganese halide (e.g., chloride), cobalt halide (e.g., chloride), platinum halide (e.g., chloride), silver halide (e.g., chloride), gold halide (e.g., chloride), ruthenium halide (e.g., chloride), zinc halide (e.g., chloride), or a combination thereof. In more specific embodiments, the metal precursor is gold halide, platinum halide, gold acetate, platinum acetate, platinum acetylacetonate, gold acetylacetonate, or a combination thereof. In some instances, hydrates or solvates of such metal precursors are optionally utilized.

In certain embodiments, the cathode material comprises manganese, cobalt, platinum, silver acetate, gold, ruthenium, zinc, any oxide thereof, or any combination thereof. In specific embodiments, wherein the cathode material is a nanofiber, the cathode material comprises zinc, cobalt, zinc oxide, cobalt oxide, or a combination thereof. In other specific embodiments, e.g., wherein the cathode material is a nanostructured material (e.g., using carbon nanotubes as a substrate), the cathode material comprises gold, platinum, or a combination thereof.

In certain embodiments, wherein metal precursors are utilized, treatment serves to calcine the metal precursor to, e.g., a metal, metal oxide, or the like. In some instances, treatment also serves to remove any organic residues. Treatment optionally includes chemical (e.g., oxidative conditions) and/or thermal treatments. More specific details on optional treatment conditions and considerations are described above.

In specific embodiments, thermal treatment described herein is performed at a temperature of about 100° C. to about 2000° C. (e.g., under inert conditions or under oxidative conditions—such as air). In specific embodiments, thermal treatment is performed at a temperature of about 150° C. to about 500° C., or about 200° C. to about 400° C. In specific embodiments, thermal treatment of the precursor nanofiber is performed at about 200° C., about 225° C., about 250° C., about 150° C., about 275° C., about 300° C., or the like.

Figure 10:
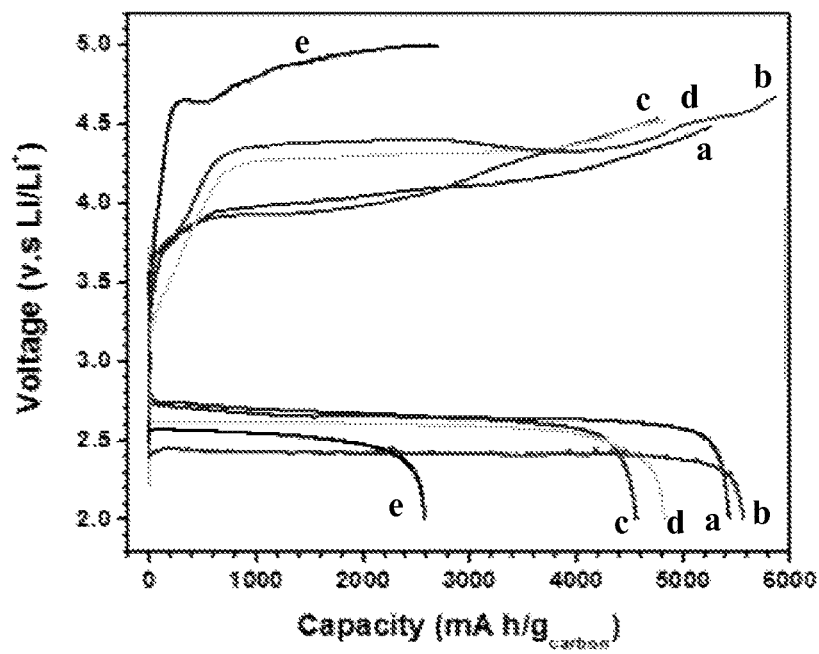
FIG. 10 illustrates initial charge/discharge cycles for various cathodes described herein comprising metal catalyst loaded on multi-walled carbon nanotubes.
Figure 18:
FIG. 18 illustrates images of the Pt/CNT samples.
Figure 19:
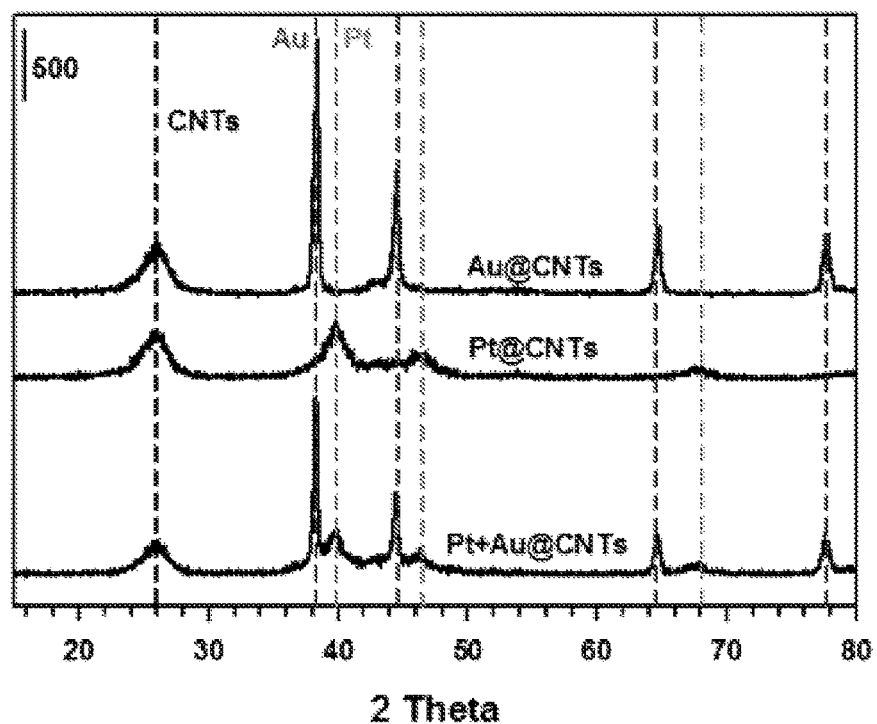
FIG. 19 illustrates XRD patterns for the Pt/CNT samples.
Figure 22:
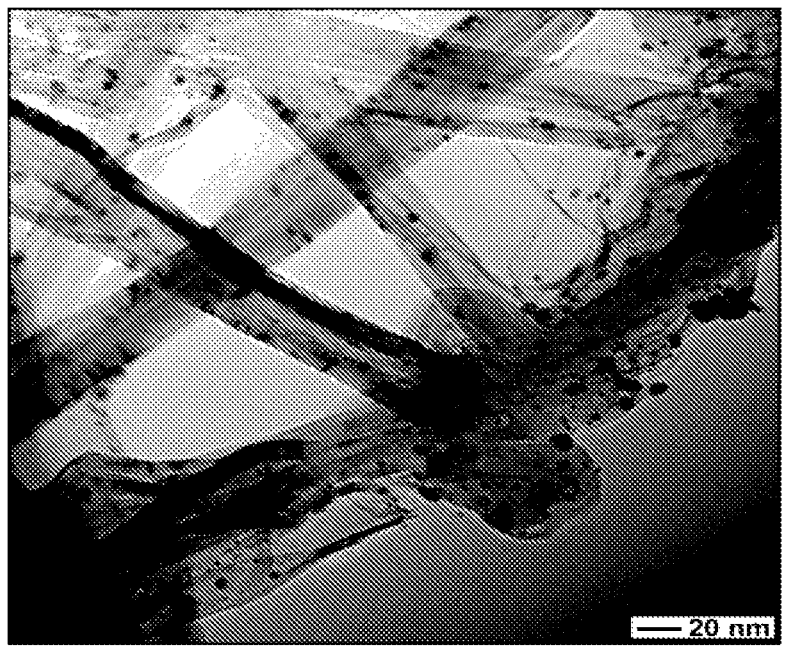
FIG. 22 illustrates TEM images of Pt on GNR samples.
Figure 23:
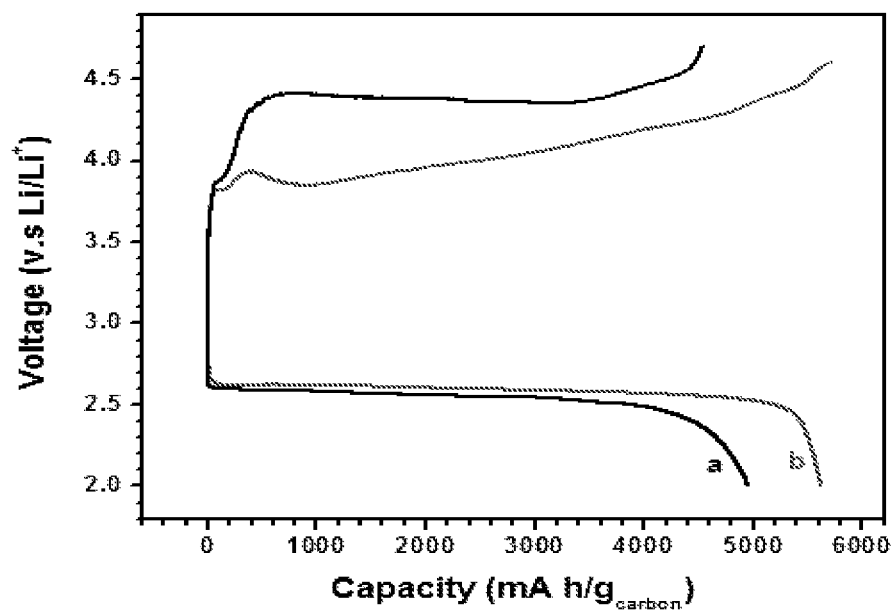
FIG. 23 illustrates lithium air charge/discharge cycles for the Pt/GNR sample (b) compared to GNR alone (a).

FIG. 10 illustrates lithium-air charge/discharge comparisons for exemplary cathodes comprising multi-walled carbon nanotubes (CNTs) and a metal catalyst material (at 20 wt. % nanofiber loading—a carbon-to-metal catalyst weight ratio of 4:1). For example, FIG. 10 illustrates capacity results for Gold, Platinum, and Gold and Platinum samples loaded on CNTs to prepare a cathode material (b), (a), and (c), respectively. All samples provided good initial discharge capacities: Pt/CNTs (~5500 mAh/g carbon), Au+Pt/CNTs (~4600 mAh/g carbon), and Au/CNTs (~5600 mAh/g carbon). Good overpotential was also observed (e.g., for the Pt/CNT and Au+PT/CNT samples—discharge: ~2.7 V; charge: ~4.0 V). For comparison, results for bare CNTs (d) and super C carbon substrates (e) are also provided. FIG. 18 illustrates images of the Pt on CNT samples, and FIG. 19 illustrates XRD patterns for the Pt/CNT samples, as well as Au/CNT and Pt+Au/CNT samples. FIG. 22 illustrates images of Pt on GNR samples, and FIG. 23 illustrates lithium air charge/discharge cycles for the Pt/GNR sample (b) compared to GNR alone (a). FIG. 20 illustrates lithium air charge/discharge results for an exemplary cathode comprising high aspect ratio metal catalyst nanostructures (e.g., zinc oxide nanofibers) loaded on both (a) carbon nanostructure (CNT) substrate loaded with metal catalyst (e.g., Pt on CNT), and (b) carbon black substrate (e.g., super C). As illustrated in the figure, capacities for cathodes comprising a metal oxide catalyst (e.g., zinc oxide) nanofiber loaded on a nanostructured carbon substrate pre-loaded with a second catalyst (e.g., Pt) were observed to be slightly improved over the use of metal catalyst nanofibers alone.

Such composite materials (which may serve as both a carbon substrate material and a metal catalyst material) are optionally utilized alone or in combination with other materials, such as other carbon substrate materials and/or other metal catalyst materials. In some embodiments, the composite materials are utilized without other metal catalyst material (e.g., alone, or in combination with other carbon materials), such as illustrated in FIG. 10. In other embodiments, the composite materials are utilized as a carbon substrate material in addition with an additional metal catalyst material—such as a high aspect ratio nanostructured metal catalyst material described herein (e.g., a metal or metal oxide nanofiber material), such as illustrated in FIG. 20.

Figure 11:
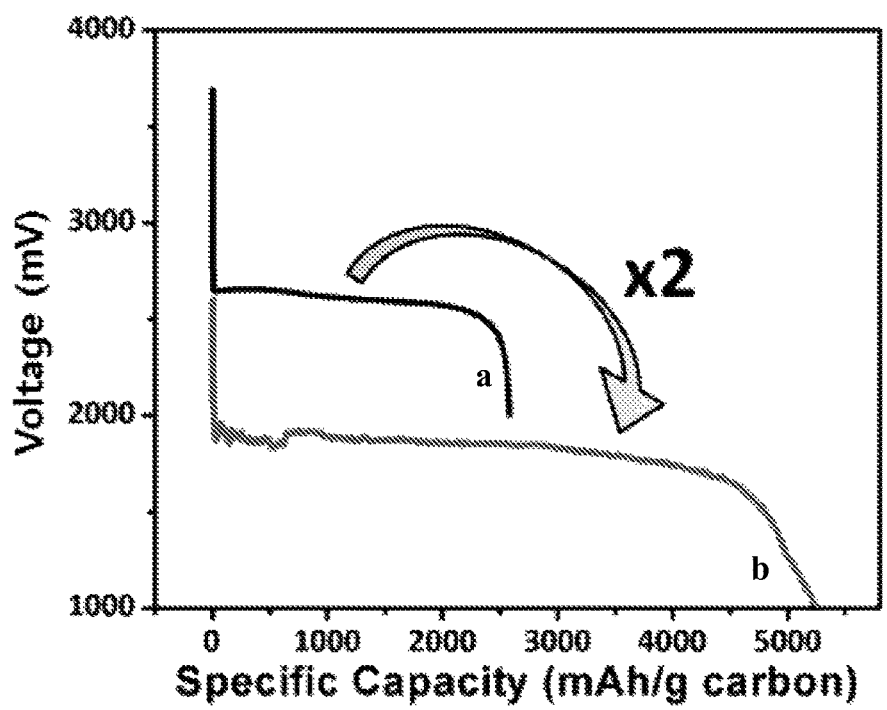
FIG. 11 illustrates the improved specific capacity of carbon substrate materials when provided in an electrospun morphology (e.g., nanofiber).

In further or additional embodiments, cathode material is prepared by electrospinning a fluid stock comprising carbon nanostructures, polymer, and an optional metal catalyst or metal catalyst precursor (e.g., to prepare an electrospun material). In specific embodiments, the process further comprises treating (e.g., thermally and/or chemically treating) the electrospun material to provide the cathode material. In more specific embodiments, thermal treatment carbonizes and/or removes the polymer material and, if present, calcines the metal catalyst precursor to a metal catalyst (e.g., a metal or metal oxide). In certain embodiments, the cathode nanostructures comprise a nanostructured carbon substrate (e.g., in the presence of or absence of a catalyst material). In some embodiments, the cathode nanostructures comprise a carbon substrate (e.g., a nanostructured carbon substrate—such carbon nanotubes, or nanostructured graphene—graphene nanoribbons, graphene sheets, or the like) and a catalyst material (such as a metal or metal oxide material described herein. In specific instances, such cathode nanostructures are prepared as described above (e.g., combining a carbon nanostructured substrate and metal precursor—followed by thermal treatment thereof). FIG. 11 illustrates the improved specific capacity of carbon substrate materials when provided in an electrospun morphology (e.g., nanofiber). As is demonstrated, a nanofiber comprising carbon nanostructured substrate (e.g., carbon nanotubes) embedded therein (e.g., in a carbon matrix—such as amorphous and/or crystalline carbon—such as obtained from carbonized polymer) (b) has improved specific capacity as a lithium air cathode—about 5300 mAh/$g_{carbon}$, as compared to CNT alone (a).

Separator/Electrolyte

In certain embodiments, provided herein is an electrolyte and/or separator component (e.g., in a lithium air battery) comprising a nanofiber material. In specific embodiments, the electrolyte and/or separator component serves as both an electrolyte and a separator. In some embodiments, the nanofiber material of the electrolyte and/or separator component functions as an electrolyte, a separator, or both. In certain embodiments, the nanofiber material, when combined with one or more additional material, functions as an electrolyte, a separator, or both.

In some embodiments, provided herein is an electrolyte and/or separator component (e.g., in a lithium air battery) comprising a nanofiber material, the nanofiber material comprising a ceramic or clay material (e.g., a nanostructured ceramic or clay—such as a nanoparticle having an aspect ratio of less than 10). In certain embodiments, the nanofiber material comprises a continuous matrix of ceramic material. In other embodiments, the nanofiber material comprises discrete domains (e.g., isolated and/or non-aggregated domains, which are optionally obtained via gas-assisted electrospinning of a polymer-containing fluid stock) of ceramic or clay (e.g., nano-ceramic or nano-clay) material in a continuous matrix material (e.g., a continuous matrix of a polymer material).

Ceramic/Clay Material

In certain embodiments, the electrolyte and/or separator component (e.g., in a lithium air battery) comprising a ceramic-containing nanofiber material and a polymer material. In specific embodiments, the nanofibers or nanofiber component comprises ceramic and polymer. In more specific embodiments, the nanofibers or nanofiber component comprise a continuous ceramic matrix with a polymer material (e.g., a block copolymer, a homopolymer, a polymer blend, or the like). In still more specific embodiments, the nanofibers or nanofiber component comprise a continuous core ceramic matrix with a polymer sheath material (e.g., at least partially surrounding the core matrix). In other embodiments, the nanofibers or nanofiber component comprise a ceramic or clay nanostructures embedded within a continuous matrix material (e.g., a polymer, such as a block copolymer, a homopolymer, a polymer blend, or the like).

Any suitable ceramic and/or clay is optionally utilized. In some embodiments, the ceramic and/or clay used is suitable (e.g., suitable stability, ionic conductivity, etc.) for use as a separator and/or electrolyte component of a battery cell (e.g., a lithium-air battery). In certain embodiments, the ceramics are based on silicon (e.g., silica or silicon carbide), aluminum (e.g., alumina), beryllium (e.g., beryllia), magnesium (e.g., magnesia), zirconium (e.g., zirconia), thorium (e.g., thoria), titanium (e.g., titania), or a combination thereof (e.g., cordierite, forsterite, steatite, zircon, or the like). In some embodiments, non-limiting exemplary ceramics (e.g., in nanoceramic structures) provided herein are selected from the group consisting of silica, alumina, titania, beryllia, silicon carbide, and combinations thereof. In some embodiments, non-limiting exemplary ceramics include metal oxide ceramics, metal carbide ceramics, metal silicate ceramics, metal nitride ceramics, and the like. Similarly, any suitable ceramic nanostructure (e.g., nanoparticle) is optionally utilized. In specific embodiments, the ceramic nanoparticle comprises silica, alumina, beryllia, magnesia, zirconia, thoria, cordierite, forsterite, steatite, zircon, or a combination thereof. Any suitable nanoclay is also optionally utilized. In some embodiments, non-limiting exemplary clays (e.g., in nanoclay structures) provided herein are selected from the group consisting of bentonite, aluminum phyllosilicate, montmorillonite, kaolinite, illite, vermiculite, smectite, chlorite, silicate clay, sesquioxide clays, allophane, imogolite, fluorohectorate, laponite, bentonite, beidellite, hectorite, saponite, nontronite, sauconite, ledikite, magadiite, kenyaite, stevensite, and combinations thereof. In specific embodiments, the clay (e.g., nanoclay) is a hydrophilic clay (e.g., nanoclay), such as bentonite.

Polymer Material

In certain embodiments, provided herein is an electrolyte and/or separator component (e.g., in a lithium air battery) comprising a nanofiber material, the nanofiber material comprising a block copolymer or a polymer blend material. In specific embodiments, the block copolymer comprises at least two blocks (a first and second block), the first block being harder than the second block. In some embodiments, e.g., wherein a polymer blend is utilized, the nanofiber material comprises a first and a second polymer, wherein the first polymer is harder than the second polymer. In some embodiments, the hard (or relatively harder) block or polymer provides structural and mechanical stability to the electrolyte and/or separator component (e.g., mechanically blocking or reducing lithium dendrite growth from the anode), while the soft (or relatively softer) block or polymer provides ionic conductivity for transporting ions (e.g., lithium ions). Hardness parameters are determined in any suitable manner, such as set forth in Beerbower et al., "The HSAB Principle and Extended Solubility Theory" *Inorganica Chimica Acta* 1983, 75:193-7, or Parr et al., "Absolute Hardness: Companion Parameter to Absolute Electronegativity" *J. Am. Chem. Soc.* 1983, 105:7512-6, both of which are incorporated herein by reference for such disclosure.

In certain embodiments, the electrolyte and/or separator component comprises an electrolyte and/or separator component nanofiber, such nanofiber comprising a block copolymer (e.g., PVA-b-PS, PVA-b-PEO, PEO-b-PPO, PEO-b-PPO-b-PEO, or the like). In specific embodiments, the block copolymer comprises at least one hard (or structural) polymer segment (e.g., block) and at least one soft (or ionic conductive) polymer segment (e.g., block). In certain embodiments, the hard or structural polymer segment (e.g., block) is a polymer with a bulk modulus of greater than $10^7$ Pa at 90° C. In some embodiments, the hard or structural polymer segment (e.g., block) is polystyrene (PS), polymethacrylate (PMA), polyvinylpyridine (PVP), polyvinylalkane, polyvinylcycloalkane (e.g., polyvinylcyclohexane), a polyimide, a polyamide, a polyalkene (e.g., polypropylene (PP)), or the like. In some embodiments, the soft or ionic conductive polymer segment (e.g., block) is a polyether (e.g., polyethyelene oxide (PEO), polypropylene oxide (PPO)), a polyamine, or the like.

In certain embodiments, the electrolyte and/or separator component comprises an electrolyte and/or separator component nanofiber, such nanofiber comprising at least two polymers (e.g., as a polymer blend). In specific embodiments, the polymer blend comprises PVA and PS, PVA and PEO, PEO and PPO, or the like. In specific embodiments, the polymer blend comprises at least one hard (or structural) polymer and at least one soft (or ionic conductive) polymer. In certain embodiments, the hard or structural polymer is a polymer with a bulk modulus of greater than $10^7$ Pa at 90° C. In some embodiments, the hard or structural polymer is polystyrene (PS), polymethacrylate (PMA), polyvinylpyridine (PVP), a polyvinylalkane, a polyvinylcycloalkane (e.g., polyvinylcyclohexane), a polyimide, a polyamide, a polyalkene (e.g., polypropylene (PP)), or the like. In some embodiments, the soft or ionic conductive polymer is a polyether (e.g., polyethylene oxide (PEO), polypropylene oxide (PPO)), a polyamine, or the like.

In some embodiments, e.g., wherein the electrolyte/separator nanofiber comprises a clay or ceramic and a polymer, any polymer described herein is utilized (e.g., a copolymer, a polymer blend, or a single homopolymer). In specific embodiments, the polymer is a soft homopolymer (e.g., a polyether, such as PEO or PPO, or a polyamine). In other embodiments, the polymer is a bock copolymer, such as PVA-b-PS, PVA-b-PEO, PEO-b-PPO, PEO-b-PPO-b-PEO, or comprising a hard and a soft block, such as described herein.

Nanostructures

Provided in certain embodiments herein are separator and/or electrolyte component nanofibers having a ceramic and/or clay component. In some embodiment, the nanofibers comprise (i) a ceramic and/or clay component, and (ii) a polymer component. In various embodiments, the ceramic/clay and/or polymer form a continuous matrix in a nanofiber structure. In certain embodiments, the nanofiber comprises a continuous core matrix (e.g., not a hollow tube) of ceramic. In some embodiments, the nanofibers comprise discrete isolated domains of ceramic/clay component and a continuous matrix of polymer. In other embodiments, the nanofibers comprise discrete isolated domains of polymer component and a continuous matrix of ceramic/clay component. In some embodiments, the domains have various sizes, for example about 1 nm to about 100 nm, about 10 nm to about 50 nm, or any other suitable size.

In some embodiments, the nanofibers have few defects and/or voids. In some instances voids and defects in the nanofiber include breaks in the nanofiber, regions of nanofiber wherein the diameter is so narrow as to be easily broken (e.g., having a diameter of less than 10% or less than 5% of the average nanofiber diameter), regions of the nanofiber wherein the nanofiber material has anomalous morphologies (e.g., crystalline domains in a substantially amorphous nanofiber—such crystalline domains may increase fracturing and brittleness of the nanofiber), and the like. In some embodiments, there are about 1, about 5, about 10, about 50, about 100, and the like defects per linear mm of nanofiber. In some embodiments, there are at most about 1, at most about 5, at most about 10, at most about 50, at most about 100, and the like defects per linear mm of nanofiber. In other embodiments, the nanofibers have fewer defects and/or voids, wherein the number of defects and/or voids in the nanofiber is in comparison to a nanofiber not produced by the methods of the disclosure (for example with a low loading of precursor).

Figure 13:
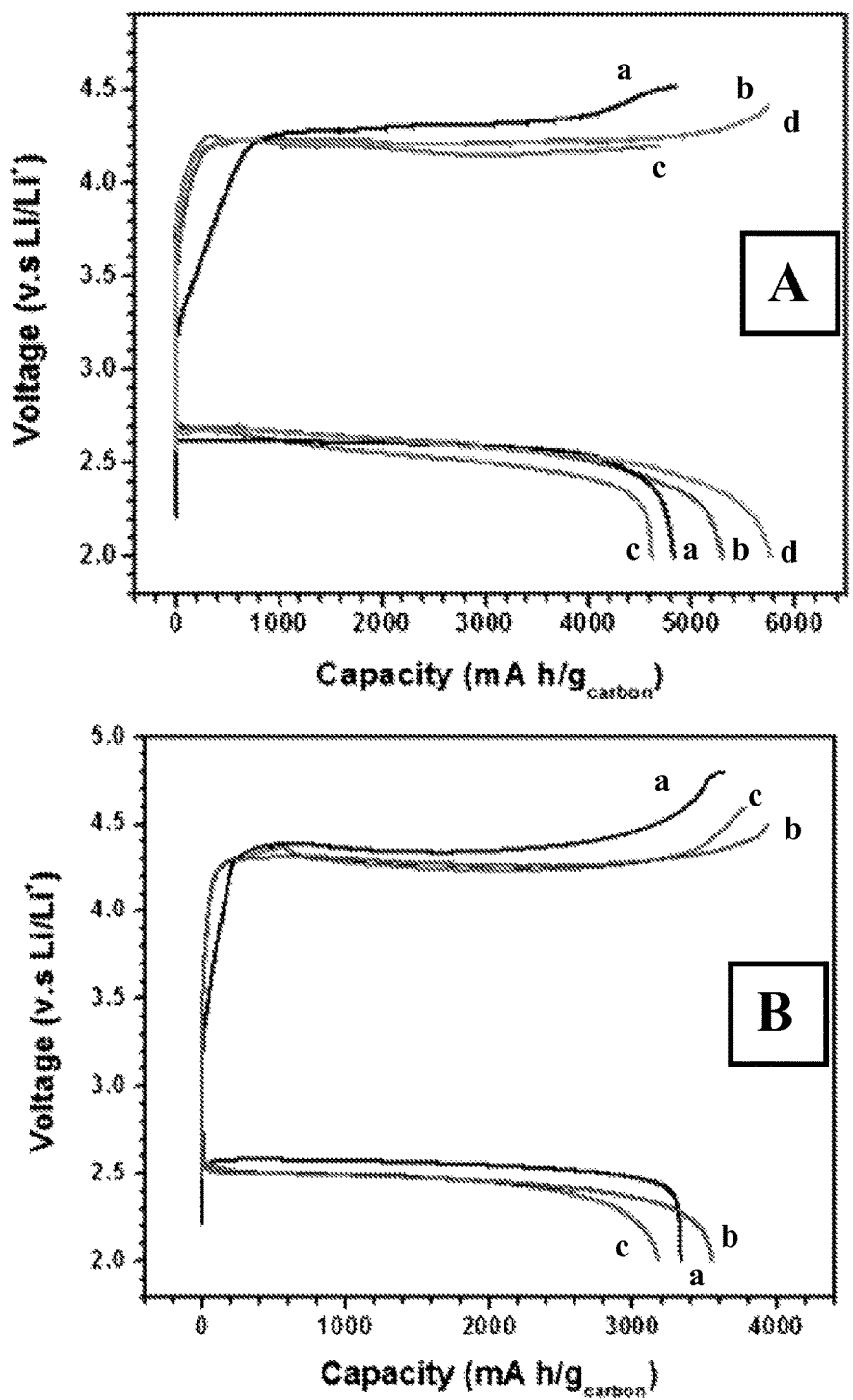
FIG. 13 illustrates the capacity of Li-air battery with various separator systems, with (A) illustrating results using a CNT based cathode and (B) a Pt/GNR based cathode.

Provided in various embodiments herein are separator (and/or electrolyte) components comprising any suitable amount of ceramic content. In specific embodiments, such nanofibers comprise high ceramic content. In some embodiments, nanofibers provided herein comprise at least 99%, at least 98%, at least 97%, at least 96%, at least 95%, at least 90%, at least 80%, or the like of ceramic by mass. In some embodiments, nanofibers provided herein comprise at least 99%, at least 98%, at least 97%, at least 96%, at least 95%, at least 90%, at least 80%, or the like of metal and oxygen, when taken together, by mass (e.g., elemental mass). In some embodiments, nanofibers provided herein comprise at least 99%, at least 98%, at least 97%, at least 96%, at least 95%, at least 90%, at least 80%, or the like of ceramic and polymer, when taken together, by mass. In some embodiments, nanofibers provided herein comprise at least 99%, at least 98%, at least 97%, at least 96%, at least 95%, at least 90%, at least 80%, or the like of metal, oxygen, and carbon, when taken together, by mass (e.g., elemental mass). In other embodiments, lower ceramic contents are optionally utilized, such as 2 wt % to 75 wt %, or 2 wt % to 50 wt %, or 2 wt % to 25 wt % or 2 wt % to 15 wt %. For example, FIG. 13 illustrates capacity results for a variety of separator systems provided herein. FIG. 13A illustrates results for lithium air batteries using a polyolefin (Celgard 2500) separator with a CNT cathode (a) a PAN nanofiber separator with a CNT cathode (b), a nanofiber separator comprising a PAN matrix with ceramic inclusions (4.5 wt % ceramic) (c), and a nanofiber separator comprising a PAN matrix with ceramic inclusions (9 wt % ceramic) (d). Similarly, FIG. 13B illustrates results for lithium air batteries using a polyolefin (Celgard 2500) separator with a Pt/GNR cathode (a), a nanofiber separator comprising a PAN matrix with ceramic inclusions (4.5 wt % ceramic) (b) with Pt/GNR cathode, and a nanofiber separator comprising a PAN matrix with ceramic inclusions (9 wt % ceramic) (c) with Pt/GNR cathode.

In some embodiments, the nanofibers comprise a single ceramic or clay type. In other embodiments, the nanofibers comprise two or more ceramic or clay type (or comprise at least one clay and one ceramic type). In some embodiments, provided herein are nanofibers comprising two or more metal types in a ceramic. In some embodiments, ceramics and clays are such as those described in the previous section(s).

As described herein, certain nanofibers provided herein comprise a continuous matrix (e.g., a continuous core matrix) material. In some embodiments, the matrix segment or segments within the nanofiber continue along a substantial portion of the nanofiber. In some embodiments, the continuous matrix is found along at least 50%, at least 60%, at least 70%, at least 80%, at least 90%, at least 95%, at least 98%, or at least 99% the length of the nanofiber (e.g., on average for a plurality of nanofibers). In some instances, the continuous matrix runs along at least 50% the length of the nanofiber (e.g., on average for populations of nanofibers). In specific instances, the continuous matrix runs along at least 70% the length (e.g., on average) of the nanofiber(s). In more specific instances, the continuous matrix runs along at least 80% the length (e.g., on average) of the nanofiber(s). In still more specific embodiments, the continuous matrix runs along at least 90% of the length (e.g., on average) of the nanofiber(s). In yet more specific embodiments, the continuous matrix runs along at least 95% of the length (e.g., on average) of the nanofiber(s).

In some embodiments, provided herein are nanofibers comprising a hollow core. The hollow core of the nanofiber has any suitable diameter. In some embodiments, the diameter of the hollow core is on average between about 1 nm and 1000 nm, between about 1 nm and 500 nm, between about 5 nm and 250 nm, between about 10 nm and 200 nm, or the like.

In various embodiments, provided herein are nanofibers or processes for producing nanofibers having any suitable diameter. In specific embodiments, nanofibers provided herein have a (e.g., average) diameter of less than 1500 nm. In more specific embodiments, nanofibers provided herein have a (e.g., average) diameter of 100 nm to 1000 nm. In some embodiments, nanofibers provided herein have a (e.g., average) diameter of 500 nm or less. In some embodiments, nanofibers provided herein have a (e.g., average) diameter of 400 nm or less. In some embodiments, nanofibers provided herein have a (e.g., average) diameter of 200 nm to 500 nm.

The nanofibers have any suitable length. In some embodiments, nanofibers provided herein have an average length of about 20 µm, about 50 µm, about 100 µm, about 500 µm, about 1,000 µm, about 5,000 µm, about 10,000 µm, about 50,000 µm, about 100,000 µm, about 500,000 µm, or the like. In some embodiments, nanofibers provided herein have an average length of at least about 20 µm, at least about 50 µm, at least about 100 µm, at least about 500 µm, at least about 1,000 µm, at least about 5,000 µm, at least about 10,000 µm, at least about 50,000 µm, at least about 100,000 µm, at least about 500,000 µm, or the like. In other embodiments, the nanofibers are optionally shorter (e.g., a longer nanofiber material is optionally fragmented to facilitate processing of the material, such as when processing to combine with a carbon material to form the cathode).

The nanofibers provided herein have any suitable aspect ratio (nanofiber length divided by diameter). In some embodiments, the nanofibers provided herein have an aspect ratio (e.g., average aspect ratio) of at least 10, at least $10^2$, at least $10^3$, at least $10^4$, at least $10^5$, at least $10^6$, at least $10^7$, or the like. In specific embodiments, the aspect ratio (e.g., average aspect ratio) of nanofibers provided herein is at least 100. In some embodiments, aspect ratio refers to a single nanofiber. In some embodiments, aspect ratio refers to a plurality of nanofibers and is reported as a single average value (i.e., the aspect ratio being the average length of the nanofibers of a sample divided by their average diameter). In some instances, diameters and/or lengths are measured by microscopy.

The nanofibers provided herein have any suitable specific surface area (surface area divided by mass (or volume)). In some embodiments, the specific surface area of nanofibers provided herein is at least 0.1 $m^2/g$, at least 1 $m^2/g$, at least 5 $m^2/g$, at least 10 $m^2/g$, at least 50 $m^2/g$, at least 100 $m^2/g$, at least 200 $m^2/g$, at least 500 $m^2/g$, at least 1,000 $m^2/g$, at least 1,500 $m^2/g$, at least 2,000 $m^2/g$, or the like.

In some instances, methods disclosed herein (e.g., including using a high loading of uniformly distributed precursor) reduce the number and size of pores. Porosity is also called "void fraction" and is a measure of the void spaces in a material. In some embodiments, porosity is a fraction of the volume of voids over the total volume and is reported as a percentage between 0% and 100%. In various embodiments, the porosity depends on many factors including loading and distribution of precursor in the fluid stock, calcination conditions, mesoporous processing techniques, and the like. The nanofibers have any suitable porosity. In some embodiments, the porosity is at least 1%, at least 5%, at least 10%, at least 20%, at least 25%, at least 50%, at most 1%, at most 5%, at most 10%, at most 25%, at most 50%, or the like. In some embodiments, the porosity is between about 1% and 50%, between about 5% and 20%, or the like.

Exemplary Structure & Additional Agents

In some embodiments, the electrolyte and/or separator component (e.g., in a lithium air battery) optionally comprises one or more additional agent. In some instances, the additional agent is a lithium salt (e.g., $Li_2CO_3$, $Li_2O$, LiOH), an electrolyte (e.g., a non-aqueous liquid electrolyte), a mediating agent, or a combination thereof.

Figure 14:
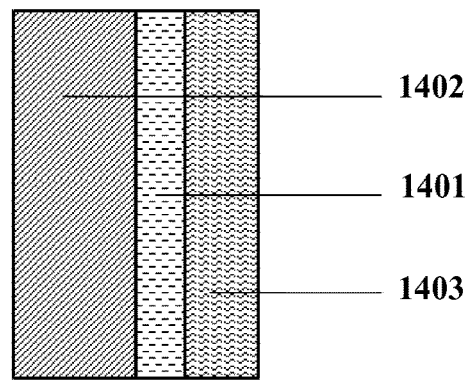
FIG. 14 illustrates an exemplary lithium-air cell configuration comprising a mediating layer.

In certain embodiments, either as a part of the electrolyte and/or separator component or separate therefrom as part of a lithium-air battery, a mediating layer is optionally present (e.g., adjacent to a lithium-air battery anode). In certain embodiments, the mediating layer comprises material suitable for mediating ion (e.g., lithium ion) transport and/or protecting the anode material (e.g., reducing dendritic formation and/or sublimation). In specific embodiments, the mediating layer comprises LiPON, $Li_3N$, $Li_3P$, LiI, LiBr, LiCl, LiF, or a combination thereof. In certain embodiments, the mediating layer is adjacent to (e.g., deposited on—such as by vapor deposition) a lithium air battery anode. In specific embodiments, an electrolyte/separator component nanofiber layer is adjacent to the mediating layer (e.g., deposited on—such as by direct electrospinning onto the mediating layer, or separate manufacture and subsequent placement upon the mediating layer). In more specific embodiments, the electrolyte/separator component nanofiber layer comprises one or more ceramic-containing nanofiber (e.g., nanofibers comprising a continuous (e.g., core) matrix of ceramic). In still more specific embodiments, the ceramic-containing nanofiber is mesoporous. In certain embodiments, the ceramic-containing nanofiber comprises ceramic (e.g., as a continuous core matrix) and a polymer (e.g., as a sheath at least partially surrounding the continuous core matrix material, or as a continuous matrix material in which ceramic is embedded—e.g., in a non-aggregated or highly dispersed manner). In specific embodiments, the polymer is a polymer having high ionic conductivity (e.g., PEO). In certain embodiments, the electrolyte/separator component (e.g., in the electrolyte/separator component nanofiber layer) further comprises an electrolyte (e.g., an aprotic or non-aqueous electrolyte). FIG. 14 illustrates a schematic of a mediating layer (e.g., comprising $Li_3P$ and/or $Li_3N$) in proximity to (e.g., in operable contact) with an anode 1402 (e.g., comprising lithium) and an electrolyte/separator nanofiber component layer 1403 (e.g., comprising mesoporous solid state lithium ion conducting nanofiber—e.g., having a continuous mesoporous ceramic matrix—and a non-aqueous electrolyte). In specific instances, the anode comprises lithium (e.g., mesoporous lithium nanofibers described herein), the mediating layer comprises a material suitable for mediating lithium ion transport and/or protecting the anode (e.g., comprising $Li_3P$ and/or $Li_3N$), and a mesoporous solid-state lithium ion conductor layer (e.g., comprising nanofibers a continuous ceramic matrix and a non-aqueous electrolyte).

In some embodiments, the separator and/or electrolyte component comprises a non-aqueous electrolyte, such as a non-aqueous liquid electrolyte. In specific embodiments, the non-aqueous liquid electrolyte is an electrolyte solution. In certain embodiments, the non-aqueous electrolyte comprises an electrolyte in a non-aqueous solvent. Examples of the electrolyte salt include, but are not limited to, salts such as $LiPF_6$, $LiClO_4$, $LiAsF_6$, $LiBF_4$, $Li(CF_3SO_2)_2N$, $Li(CF_3SO_3)$, and $LiN(C_2F_5SO_2)$. These electrolyte salts may be used alone or in combinations of two or more salts. The concentration of the electrolyte salt is preferably in the range of 0.1 to 2.0 M. Examples of such organic solvents include cyclic carbonates (e.g., ethylene carbonate, propylene carbonate, butylene carbonate, or vinyl carbonate), chain carbonates (e.g., dimethyl carbonate, diethyl carbonate, or methyl ethyl carbonate), cyclic esters (e.g., 7-butyrolactone or γ-valerolactone), cyclic ethers (e.g., tetrahydrofuran or 2-methyltetrahydrofuran), and chain ethers (e.g., ethylene glycol dimethyl ether).

Figure 15:
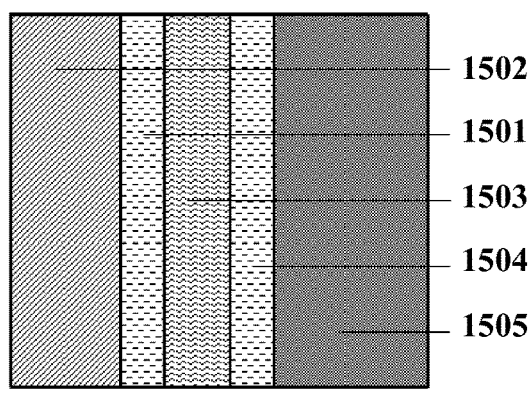
FIG. 15 illustrates an exemplary lithium-air cell configuration comprising multiple separator component layers comprising ceramic and/or ceramic/polymer hybrid nanofibers.

In certain embodiments, the electrolyte and/or separator component comprises an optional second nanofiber component. In specific embodiments, the electrolyte and/or separator component comprises a first nanofiber layer and a second nanofiber layer. In some embodiments, the first nanofiber layer comprises a first nanofiber and is adjacent to (e.g., in operable contact with) a lithium-air battery anode. In certain embodiments, the second nanofiber layer comprises a second nanofiber and is adjacent to the first nanofiber layer and/or the cathode. Further, in some embodiments, a third nanofiber layer is optionally present (e.g., comprising the first nanofiber or a third nanofiber) and is adjacent to (e.g., in operable contact with) the cathode. In some embodiments, the first nanofiber (and, optionally third nanofiber) comprises one or more ceramic-containing nanofiber (e.g., nanofibers comprising a continuous (e.g., core) matrix of ceramic). In still more specific embodiments, the first nanofiber further comprises a polymer. In yet more specific embodiments, the first nanofiber comprises a continuous core matrix of ceramic and a polymer sheath (e.g., a soft and/or ionic conducting polymer, such as polyether (e.g., PEO) or polyamine) at least partially surrounding the core matrix. In other specific embodiments, the first nanofiber comprises a continuous core matrix of polymer, with ceramic or clay nanostructures (such as nanoparticles, e.g., having an average aspect ratio of 1-10) embedded therein (e.g., a soft and/or ionic conducting polymer, such as polyether (e.g., PEO) or polyamine). In some embodiments, the second nanofiber is a ceramic-containing nanofiber (e.g., nanofibers comprising a continuous (e.g., core) matrix of ceramic). In still more specific embodiments, the second nanofiber is a mesoporous ceramic-containing nanofiber (e.g., comprising a mesoporous continuous (e.g., core) matrix of ceramic). In some embodiments, the second nanofiber layer further comprises a liquid electrolyte (e.g., an aprotic or non-aqueous liquid electrolyte). FIG. 15 illustrates a schematic of a first nanofiber layer 1501 (e.g., comprising polymer/ceramic hybrid nanofiber) in proximity to (e.g., in operable contact with) an anode 1502 (e.g., comprising lithium, such as lithium nanofibers), a second nanofiber layer 1503 (e.g., comprising mesoporous lithium ion conducting ceramic nanofibers and a non-aqueous electrolyte) in proximity to (e.g., in operable contact with) the first nanofiber layer 1501 and a third nanofiber layer 1504 (e.g., comprising polymer/ceramic hybrid nanofibers, the same or different than 1501) and a third nanofiber layer 1504 in proximity to (e.g., in operable contact with a cathode 1505 (e.g., comprising metal catalyst, such as nanofiber structures described herein, carbon substrate, oxygen, and optional reaction products). In specific instances, the anode comprising lithium (e.g., mesoporous lithium nanofibers described herein), the first nanofiber layer comprising a nanofiber comprising ceramic and polymer (e.g., a nanofiber comprising a ceramic core matrix and a polymer—e.g., a high ionic conductivity polymer, such as PEO—sheath at least partially surrounding the ceramic core matrix), the second nanofiber layer comprising a mesoporous ceramic nanofiber, the third nanofiber layer being optional and a comprising a nanofiber comprising ceramic and polymer (e.g., a nanofiber comprising a ceramic core matrix and a polymer—e.g., a high ionic conductivity polymer, such as PEO—sheath at least partially surrounding the ceramic core matrix), and the cathode comprising carbon (e.g., optionally comprising any nanostructured metal catalyst and carbon substrate as described herein).

In some embodiments, the electrolyte and/or separator component comprises (i) a polymer blend (e.g., PVA and PS, PVA and PEO, PEO and PPO) or a block copolymer (e.g., PVA-b-PS, PVA-b-PEO, PEO-b-PPO, PEO-b-PPO-b-PEO, or the like) and (ii) a lithium salt. In specific embodiments, the polymer blend or block copolymer comprises one polymer or block, respectively, that is hard (or, relatively harder) and one polymer or block that is soft (or, relatively softer). In certain embodiments, the lithium salt combines or mixes with the soft (or softer) polymer or block, forming an electrolyte and/or separator component with high conductivity. In further embodiments, the hard (or harder) polymer or block forms a mechanical barrier, reducing or inhibiting dendritic growth from a lithium-containing anode (e.g., when the electrolyte and/or separator nanofiber component is positioned in proximity to the anode, such as directly adjacent to, or in contact with, the anode). Any suitable lithium salt (e.g., lithium ion conductivity enhancing salt) is optionally utilized, such as $Li_2CO_3$, $Li_2O$, LiOH, or the like. In some embodiments, the polymer nanofibers are electrospun directly onto the lithium-containing anode. In other embodiments, the polymer nanofibers are electrospun onto a collector and subsequently deposited on the anode. In certain embodiments, the polymer nanofibers are electrospun with the lithium salt (e.g., a fluid stock comprising the polymer(s) and lithium salt are directly electrospun onto the anode). In other embodiments, the polymer nanofibers are electrospun and subsequently combined with a lithium salt.

Figure 16:
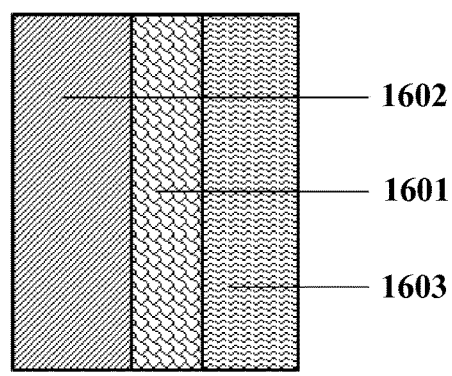
FIG. 16 illustrates an exemplary lithium-air cell configuration comprising an electrolyte/separator component comprising a layer of nanofibers comprising block copolymer.

In some embodiments, the electrolyte and/or separator component further comprises a liquid electrolyte (e.g., a non-aqueous or aprotic electrolyte). FIG. 16 illustrates a schematic of a polymer nanofiber layer 1601 (e.g., comprising block copolymer electrolyte component in optional combination with a lithium salt, such as $Li_2CO_3$, $Li_2O$, and/or LiOH) in proximity to (e.g., in operable contact) with an anode 1602 (e.g., comprising lithium, such as lithium nanofibers described herein) and a liquid electrolyte 1603 (e.g., aprotic and/or non-aqueous electrolyte, such as mixtures described herein) In specific instances, the anode comprises lithium (e.g., mesoporous lithium nanofibers described herein), and the polymer nanofiber layer comprises (i) at least one nanofiber comprising a copolymer or polymer blend as described herein and (ii) a lithium salt.

Manufacturing

In some embodiments, provided herein are processes for manufacturing the electrolyte and/or separator components described herein. In certain embodiments, provided herein are processes for manufacturing nanofiber components thereof.

In certain embodiments, provided herein is a process for manufacturing nanofibers (for use in lithium air batteries, or any other suitable use), or for manufacturing a lithium-air battery electrolyte and/or separator, the process comprising electrospinning a fluid stock to produce a nanofiber, the fluid stock comprising polymer. In more specific embodiments, the fluid stock comprises or is prepared by combining polymer and ceramic precursor, such as any precursor described herein. In other specific embodiments, the fluid stock comprises or is prepared by combining polymer and ceramic or clay nano structures.

In some embodiments, the polymer is a polymer melt or a polymer solution (e.g., in an organic solvent or water). In certain embodiments, the polymer is a block copolymer, such as any copolymer described herein, or a polymer blend, such as any blend described herein. In certain embodiments, the polymer is a block copolymer (e.g., PVA-b-PS, PVA-b-PEO, PEO-b-PPO, PEO-b-PPO-b-PEO, or the like). In some embodiments, the polymer is a polymer blend (e.g., comprising PVA and PS, PVA and PEO, PEO and PPO, or the like). In specific embodiments, the block copolymer or polymer blend comprises at least one hard (or structural) polymer segment (e.g., block) or polymer, respectively, and at least one soft (or ionic conductive) polymer segment (e.g., block), or polymer, respectively. In certain embodiments, the hard or structural polymer or polymer segment (e.g., block) is a polymer with a bulk modulus of greater than $10^7$ Pa at 90° C. In some embodiments, the hard or structural polymer or polymer segment (e.g., block) is polystyrene (PS), polymethacrylate (PMA), polyvinylpyridine (PVP), polyvinylalkane, polyvinylcycloalkane (e.g., polyvinylcyclohexane), a polyimide, a polyamide, a polyalkene (e.g., polypropylene (PP)), or the like. In some embodiments, the soft or ionic conductive polymer or polymer segment (e.g., block) is a polyether (e.g., polyethyelene oxide (PEO), polypropylene oxide (PPO)), a polyamine, or the like. In some embodiments, such electrospinning techniques are gas assisted (e.g., common-axially gas assisted).

In some embodiments, provided herein is a process for manufacturing nanofibers, or for manufacturing a lithium-air battery electrolyte and/or separator, the process comprising electrospinning a fluid stock to produce a nanofiber, the fluid stock comprising clay (e.g., nanoclay), ceramic (e.g., ceramic nanoparticles) or ceramic precursor (e.g., a sol ceramic precursor or a metal precursor). In some embodiments, the fluid stock comprises or is prepared by combining a ceramic precursor (e.g., metal salt) and a polymer. In other embodiments, the fluid stock is a sol-gel precursor stock. In various embodiments, such processes are suitable for preparing nanofibers comprising ceramic nanofibers, or ceramic (or clay)—polymer composite nanofibers (e.g., hybrid nanofibers comprising a continuous core matrix of ceramic and a polymer sheath, or nanofibers comprising a continuous matrix of polymer with ceramic or clay embedded therein).

Ceramics/Clays and Precursors

Any suitable ceramic precursor or precursors are optionally utilized. In some embodiments, the ceramic precursor(s) used are suitable for calcination to any ceramic suitable (e.g., suitable stability, ionic conductivity, etc.) for use as a separator and/or electrolyte component of a battery cell (e.g., a lithium-air battery). In certain embodiments, the ceramics are based on silicon (e.g., silica or silicon carbide), aluminum (e.g., alumina), beryllium (e.g., beryllia), magnesium (e.g., magnesia), zirconium (e.g., zirconia), thorium (e.g., thoria), titanium (e.g., titania), or a combination thereof (e.g., cordierite, forsterite, steatite, zircon, or the like). In some embodiments, non-limiting exemplary ceramics (e.g., in nanoceramic structures) provided herein are selected from the group consisting of silica, alumina, titania, beryllia, silicon carbide, and combinations thereof. In some embodiments, non-limiting exemplary ceramics include metal oxide ceramics, metal carbide ceramics, metal silicate ceramics, metal nitride ceramics, and the like. Similarly, any suitable ceramic nanostructure (e.g., nanoparticle) is optionally utilized. In specific embodiments, the ceramic nanoparticle comprises silica, alumina, beryllia, magnesia, zirconia, thoria, cordierite, forsterite, steatite, zircon, or a combination thereof. Any suitable nanoclay is also optionally utilized. In some embodiments, non-limiting exemplary clays (e.g., in nanoclay structures) provided herein are selected from the group consisting of bentonite, aluminum phyllosilicate, montmorillonite, kaolinite, illite, vermiculite, smectite, chlorite, silicate clay, sesquioxide clays, allophane, imogolite, fluorohectorate, laponite, bentonite, beidellite, hectorite, saponite, nontronite, sauconite, ledikite, magadiite, kenyaite, stevensite, and combinations thereof. In specific embodiments, the clay (e.g., nanoclay) is a hydrophilic clay (e.g., nanoclay), such as bentonite.

In specific embodiments, the ceramic component of or added to the fluid stock is a ceramic precursor. In some embodiments, the precursor is a metal containing compound that is associated with at least one ligand. In certain embodiments, the metal-ligand association is associated via any suitable type of bond or interaction (e.g., an ionic bond, a covalent bond, a coordination complex between ligand and metal, or the like). In some instances a precursor described herein is associated with a polymer instead of, or in addition to, other ligands—such compounds are intended to be considered was metal-ligand associations (whether or not additional ligands are present).

In specific embodiments, the ceramic precursor is a metal-ligand association (complex) (e.g., a coordination complex), each ceramic precursor comprising metal atom(s) (e.g., silicon, aluminum, beryllium, magnesium, zirconium, thorium, titanium, or the like) associated (complexed) with one or more ligand(s) (e.g., 1-10, 2-9, or any suitable number of ligands). In specific embodiments, the precursor described herein comprises at least two different types of ligand (e.g., at least one acetate and at least one halide). In some embodiments, the precursor is a metal carboxylate (e.g., —OCOCH$_3$ or another —OCOR group, wherein R is an alkyl, substituted alkyl, aryl, substituted aryl, or the like). In certain embodiments, the precursor is a metal nitrate. In some embodiments, the precursor is a metal alkoxide (e.g., a methoxide, ethoxide, isopropyl oxide, t-butyl oxide, or the like). In some embodiments, the precursor is a metal halide (e.g., chloride, bromide, or the like). In certain embodiments, the precursor is a diketone (e.g., acetylacetone, hexafluoroacetylacetone, or the like). In other embodiments, any suitable ligand may be utilized in a metal-ligand association (metal precursor) described herein, e.g., ketones, diketones (e.g., a 1,3-diketone, such as ROCCHR'COR group, wherein R is an alkyl, substituted alkyl, aryl, substituted aryl and R' is R or H), carboxylates (e.g., acetate or —OCOR group, wherein each R is independently an alkyl, substituted alkyl, aryl, substituted aryl), halides, nitrates, amines (e.g., NR'$_3$, wherein each R" is independently R or H or two R", taken together form a heterocycle or heteroaryl), and combinations thereof. Further examples include iodide, bromide, sulfide (e.g., —SR), thiocyanate, chloride, nitrate, azide, fluoride, hydroxide, oxalate, water, nitrite (e.g., RN$_3$), isothiocyanate, acetonitrile, pyridine, ammonia, ethylenediamine, 2,2'-bipyridine, 1,10-phenanthroline, nitrite, triphenylphosphate, cyanide, carbon monoxide, or alko-oxide. In some embodiments, the metal precursor is optionally utilized in a hydrate or solvate form.

In specific embodiments, the ceramic precursor is silicon acetate, aluminum acetate, beryllium acetate, magnesium acetate, zirconium acetate, thorium acetate, titanium acetate, silicon acetylacetonate, aluminum acetylacetonate, beryllium acetylacetonate, magnesium acetylacetonate, zirconium acetylacetonate, thorium acetylacetonate, titanium acetylacetonate, silicon halide (e.g., chloride), aluminum halide (e.g., chloride), beryllium halide (e.g., chloride), magnesium halide (e.g., chloride), zirconium halide (e.g., chloride), thorium halide (e.g., chloride), titanium halide (e.g., chloride), perhydropolysilazane (PHPS), or a combination thereof. In specific embodiments, the ceramic precursor is perhydropolysilazane (PHPS). In some embodiments, the ceramic precursor is an agent that is capable of being cured to a ceramic at low temperature (e.g., at 100° C. or less, 50° C. or less, 30° C. or less, room temperature, or the like), such as perhydropolysilazane (PHPS) (e.g., in the presence of water and oxygen—such as in normal air).

In some embodiments, a fluid stock provided herein comprises and/or is prepared by combining at least two different types of ceramic/clay components (e.g., precursors and/or nanostructures).

Polymers

In specific embodiments, the polymer is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Water soluble or swellable polymers are generally at least somewhat hydrophilic. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, a polymer described herein (e.g., in a process, precursor nanofiber, a fluid stock, or the like)

is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like). In certain embodiments, these reactive cites react with the precursors, providing good dispersion of the ceramic precursors, which in turn allows for high loading and provides for a highly continuous ceramic moiety (e.g., a continuous core nanofiber matrix of ceramic) following calcination of the precursor to a ceramic and optional carbonization and removal of organics (including ligands and polymer).

In some embodiments, the polymer is a polymer melt or a polymer solution (e.g., in an organic solvent or water). In certain embodiments, the polymer is a block copolymer, such as any copolymer comprising blocks of any polymers described herein, or a polymer blend, such as a blend of any polymers described herein.

For example, in certain embodiments, the block copolymer comprises a polyvinyl alcohol (PVA) block, a polyethylene oxide (PEO) block, polyvinylpyridine block or any combination thereof. In certain embodiments, block co-polymers provided herein comprise a first block and a second block, the first block being more or less hydrophobic or lipophilic than the second block. In some embodiments, the second block (e.g., the more hydrophobic or lipophilic block) is any suitable polymer block, such as a polyimide block, a polylactic acid (PLA) block, a polypropylene oxide (PPO) block, polystyrene (PS) block, a nylon block, a polyacrylate block (e.g., poly acrylic acid, polyalkylalkacrylate—such as polymethylmethacrylate (PMMA), polyalkylacrylate, polyalkacrylate), polyacrylamide (PAA) block, polyvinylpyrrolidone (PVP) block, polyacrylonitrile (PAN), or any combination thereof. In some embodiments, the block co-polymer comprises a thermally or chemically degradable polymer block (e.g., as a less hydrophobic/lipophilic block), e.g., a polyisoprene (PI) block, a polylactic acid (PLA) block, a polyvinyl alcohol (PVA) block, a polyethylene oxide (PEO) block, a polyvinylpyrrolidone (PVP) block, polyacrylamide (PAA) block or any combination thereof. In certain embodiments, the block co-polymer comprises thermally or chemically stable polymer block, e.g., a polystyrene (PS) block, a poly(methyl methacrylate) (PMMA) block, a polyacrylonitrile (PAN) block, or any combination thereof. In certain embodiments, the block co-polymer comprises a block degradable under chemical or thermal conditions, and a second block that is not degradable under such conditions.

In specific embodiments, a block co-polymer described herein is or comprises PI-b-PEO, PAN-b-PEO, PVA-b-PS, PEO-b-PPO-b-PEO, PPO-b-PEO-b-PPO, PVA-b-PEO, PVA-b-PAN, PVA-b-PPO, PI-b-PS, PEO-b-PS, PI-b-PS, PVA-PMMA, PVA-PAA, PEO-b-PMMA, or a combination thereof. In more specific embodiments, the block co-polymer comprises PI-b-PS, PS-b-PLA, PMMA-b-PLA, PI-b-PEO, PAN-b-PEO, PVA-b-PS, PEO-b-PPO-b-PEO, PPO-b-PEO-b-PPO, or any combination thereof. In certain embodiments, the polymer is PVA-b-PS, PVA-b-PEO, PEO-b-PPO, PEO-b-PPO-b-PEO, or the like. In some embodiments, the polymer is a polymer blend (e.g., comprising PVA and PS, PVA and PEO, PEO and PPO, or the like). In some embodiments, such electrospinning techniques are gas assisted (e.g., common-axially gas assisted).

In some embodiments, use of block copolymers or a polymer blend is utilized to prepare a mesoporous nanofiber (e.g., comprising a mesoporous continuous matrix of ceramic). In some embodiments, after electrospinning a polymer containing nanofiber described herein, the nanofiber is annealed. In some embodiments, the annealing is performed thermally and/or chemically and/or using any other suitable mechanism.

Electrospinning

In some embodiments, a fluid stock is electrospun coaxially with gas (gas assisted electrospinning). In certain embodiments, the fluid stock comprises a ceramic precursor. In specific embodiments, the fluid stock comprises or is prepared by combining (i) a ceramic precursor, a ceramic nanostructure (e.g., nanoparticle), or a nanoclay and (ii) a polymer. Any suitable electrospinning techniques are utilized, such as those described in the cathode section herein.

Any suitable method for electrospinning is used. In some instances, elevated temperature electrospinning is utilized. Exemplary methods for comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process. In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some embodiments, incorporating a gas stream inside a fluid stock produces hollow nanofibers. In some embodiments, the fluid stock is electrospun using any method known to those skilled in the art.

In specific embodiments, the process comprises common-axial (i.e., substantially concentric electrospinning of multiple fluids—also referred to herein as coaxial) electrospinning (electrospinning two or more fluids about a common axis). As described herein, coaxial electrospinning a first fluid stock as described herein (i.e., prepared by combining or comprising (i) precursor or metal/metal oxide nanoparticles and (ii) a polymer) with a second fluid is used to add coatings, make hollow nanofibers (e.g., the center fluid is a removable oil or gas), make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning). In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas. In other embodiments, the second fluid is a second fluid stock having the characteristics as described herein. In further specific embodiments, a third fluid is optionally a gas (e.g., providing gas-assisted electrospinning of a multi-layered nanofiber).

In certain embodiments, a fluid stock comprises a sol fluid stock (e.g., comprising sol-gel precursor, a sol, or a partially formed sol), which is mixed with a polymer (e.g., for preparing hybrid nanofibers comprising both polymer and ceramic—such as wherein both polymer and ceramic comprise make up continuous matrices within the resultant nanofiber—after complete curing of the sol-gel to a ceramic). In some other embodiments, a first fluid stock is electrospun coaxially with a second fluid stock (e.g., for preparing hybrid nanofibers comprising a continuous core matrix of ceramic and a polymer sheath). In some embodiments, the second fluid stock is electrospun around the first fluid stock. Further, in either case electrospinning is optionally gas assisted—e.g., with a gas being blown coaxially with and around the fluid stock or with the first and second fluid stocks and around the second fluid stock. In certain embodiments, the first fluid stock comprises a sol fluid stock (e.g., comprising a sol, or partially formed sol) and the second fluid stock comprises a polymer (e.g., a polymer melt or polymer solution). In one exemplary embodiment, a sol fluid stock is prepared by combining ceramic precursor (e.g., using an inorganic material suitable for forming a sol-gel—a sol ceramic precursor; e.g., tetraethyl ortho-silicate (TEOS), perhydropolysilazane (PHPS), Calcium nitrate (e.g., combined with triethyl phosphate water and ethanol), titanium alkoxide (e.g., isopropanol), etc.) with a solvent (e.g., alcohol, water, isopropanol, acetic acid, or the like, depending on the system), and an optional catalyst. In certain embodiments, after electrospinning the sol is ripened to form a sol-gel (e.g., by allowing the combination to stand, or by heating the combination—which may accelerate the process). In some embodiments, after electrospinning, the sol or sol-gel is cured to form a ceramic. General descriptions of electrospinning sols are set forth in US 2007/0269655, which is incorporated herein for such disclosure. In specific embodiments, the ceramic precursor used is one that is capable of forming a sol gel that cures to a ceramic at a low temperature (e.g., less than 50° C., less than 30° C., at room temperature or less, such as perhydropolysilazane (PHPS)). In some embodiments, use of a low temperature curing agent allows for curing to a ceramic at a temperature low enough to avoid damaging (e.g., carbonizing or removing) the polymer sheath formed by the second fluid stock. In various embodiments, the polymer of the second fluid stock is any polymer described herein. In specific embodiments, the polymer is a soft polymer, comprises a soft polymer block, is ionic conducting, comprises an ionic conducting block, is a polyether (e.g., PEO or PPO), comprises a polyether block, is a polyamine, or comprises a polyamine block.

Fluid Stock

In some embodiments, provided herein are fluid stocks comprising and/or methods comprising electrospinning a fluid stock comprising a polymer. The methods described herein optionally utilize an aqueous fluid stock. In some applications, a water-based process is desirable, for instance if one wants to avoid potential health, environmental, or safety problems associated with organic solvents. As described herein, in some embodiments it is advantageous to electrospin a fluid stock that is homogenous. In some embodiments, the fluid stock is homogenous (e.g., which comprises a water-soluble polymer)

In certain embodiments, a fluid stock provided herein is prepared by combining a ceramic or clay component (e.g., ceramic precursor or ceramic and/or clay nanoparticles or nanostructures) and a polymer in a liquid medium (e.g., in water). In some embodiments, a ceramic component is combined with the polymer in a ceramic component to polymer weight-to-weight ratio of at least 1:2 (e.g., at least 1:1, or at least 1.25:1). In other embodiments, the ratio is at least 1:9, at least 1:8, at least 1:7, at least 1:6, at least 1:5, at least 1:4, at least 1:3, at least 1:2, at least 1:1.75, at least 1:1.5, or at least 1:1.25. In other embodiments there is about equal weights of ceramic component and polymer. In some embodiments, there is more ceramic component than polymer by weight. In some embodiments, the weight ratio of the ceramic component to polymer is at least 1.25:1, at least 1.5:1, at least 1.75:1, at least 2:1, at least 3:1, or at least 4:1. In yet other embodiments, the weight ratio of ceramic component to polymer is about 1:2 to about 5:1, or about 1:1 to about 4:1. In some embodiments, the amount of polymer refers to the polymer component (i.e., excluding the ceramic and any non-polymer ligand) and the ceramic component refers to the metal (of the ceramic component) that is complexed to polymer, along with any non-polymer ligands (as well as any non-polymer-complexed precursor present in the fluid stock). In some instances such an association process may be complete (i.e., all metal precursor and/or polymer reactive sites may be associated), and in other instances, some of the precursor and/or polymer reactive sites may remain unassociated. In some embodiments, all or part of the ceramic component is associated with the polymer and the ceramic component to polymer weight-to-weight ratio is determined by the ratio of the sum of the associated and non-associated precursor to the polymer.

The fluid stock contains any suitable amount of polymer. The weight percent of polymer in the fluid stock is represented as the weight percent of polymer (whether the polymer is associated with ceramic component (e.g., precursor) or not). In some embodiments, the fluid stock comprises at least about 0.5 weight %, at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 12 weight %, at least about 14 weight %, at least about 16 weight %, at least about 18 weight %, at least about 20 weight %, at least about 30 weight %, or at least about 40 weight % polymer. In some embodiments, the fluid stock comprises from about 1 weight % to about 20 weight % polymer. In some embodiments, the fluid stock comprises from about 1 weight % to about 10 weight %, from about 1 weight % to about 5 weight %, from about 5 weight % to about 20 weight %, from about 5 weight % to about 10 weight %, from about 10 weight % to about 15 weight %, or from about 15 weight % to about 20 weight % polymer.

In certain embodiments, polymer concentration in the fluid stock is determined on a monomeric residue concentration. In other words, the concentration of the polymer is determined based on the concentration of polymeric repeat units present in the stock. For example, polymer concentration of polyvinyl alcohol may be measured based on the concentration of ($-CH_2CHOH-$) present in the fluid stock. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In at least 5 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the precursor in the fluid stock is between 5 mM and 5 M, between 200 mM and 1 M, between 100 mM and 700 mM, and the like. In some embodiments, the concentration of ceramic component (e.g., precursor) in the fluid stock to monomeric residue in the fluid stock is at least 1:4. In specific embodiments, the concentration of metal component (e.g., precursor) in the fluid stock to monomeric residue in the fluid stock is at least 1:3. In more specific embodiments, the concentration of ceramic component (e.g., precursor) in the fluid stock to monomeric residue in the fluid stock is at least 1:2. In still more specific embodiments, the concentration of ceramic component (e.g., precursor) in the fluid stock to monomeric residue in the fluid stock is at least 1:1.2. In yet more specific embodiments, the concentration of ceramic component (e.g., precursor) in the fluid stock to monomeric residue in the fluid stock is about 1:1 (e.g., within 5%). In other embodiments, the concentration of ceramic component (e.g., precursor) in the fluid stock to monomeric residue in the fluid stock is at least 1:10, at least 1:8, at least 1:6, at least 1:1.5, at least 1:3.5, at least 1:2.5, or any suitable ratio.

In one aspect, the concentration of ceramic component (e.g., precursor) in the fluid stock is high. The concentration is any suitable concentration. In some embodiments, the concentration of the ceramic component (e.g., precursor) in the fluid stock is about 5 mM, about 10 mM, about 20 mM, about 40 mM, about 60 mM, about 80 mM, about 100 mM, about 150 mM, about 200 mM, about 250 mM, about 300 mM, about 350 mM, about 400 mM, about 500 mM, about 700 mM, about 900 mM, about 1.2 M, about 1.5 M, about 2 M, about 5 M, and the like. In some embodiments, the concentration of the ceramic component (e.g., precursor) in the fluid stock is at least 5 mM, at least 10 mM, a at least 20 mM, at least 40 mM, at least 60 mM, at least 80 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the ceramic component (e.g., precursor) in the fluid stock is between 5 mM and 5 mM, between 20 mM and 1 M, between 100 mM and 700 mM, between 100 mM and 300 mM, and the like.

In some embodiments, a fluid stock is prepared by (i) dissolving or dispersing a ceramic component (e.g., precursor) in a first fluid (e.g., water, or another aqueous medium) to form a first composition; (ii) dissolving or dispersing a polymer in a second fluid (e.g., water, or another aqueous medium) to form a second composition; and (iii) combining at least a portion of the first and second compositions to form the fluid stock.

In some embodiments, the fluid stock and/or precursor nanofiber comprises a high loading of ceramic component. In some embodiments, the polymer is at least 20% loaded with ceramic component (i.e., at least 20% of the reactive sites of the polymer are associated with a ceramic component (e.g., precursor)). In specific embodiments, the polymer is at least 35% loaded with ceramic component. In more specific embodiments, the polymer is at least 50% loaded with ceramic component. In still more specific embodiments, the polymer is at least 75% loaded with ceramic component. In various embodiments, the polymer is at least 20%, at least at least 30%, at least 40%, at least 50%, at least 60%, at least 70%, at least 75%, at least 80%, at least 85%, at least 85%, at least 90%, at least 95%, at least 96%, at least 97%, at least 98%, or at least 99% loaded with ceramic component. In some instances, the polymer is about 50% to 100%, about 70% to 100%, about 90% to 100%, about 50% to about 90%, about 60% to about 80%, or about 20% to about 50% loaded with ceramic component.

Post Electrospinning Treatment

In some embodiments, e.g., where ceramic precursors and polymer are utilized, the process further comprises treatment of the (precursor) nanofiber to calcine the ceramic precursor to ceramic. In some embodiments, this treatment is achieved thermally and/or chemically. In certain embodiments, thermal treatment of the nanofiber also carbonizes and/or removes organic residues (e.g., precursor ligands and/or polymer components of the precursor nanofiber).

In specific embodiments, treatment of a precursor nanofiber described herein comprises carbonizing the polymer to form (e.g., through at least partial conversion of the polymer) a continuous carbon nanofiber matrix. In other embodiments, treatment of a precursor nanofiber described herein comprises treating the nanofiber to remove the polymer (and other organic residues, such as ligands from the metal component if precursors using organic ligands are utilized). In certain embodiments, wherein ceramic precursors are utilized, treatment of the precursor nanofiber serves to calcine the metal precursor to a ceramic.

In specific embodiments, thermal treatment described herein is performed at a temperature of about 400° C. to about 2000° C. (e.g., under inert conditions or under oxidative conditions—such as air). In specific embodiments, thermal treatment is performed at a temperature of about 400° C. to about 1500° C., or about 600° C. to about 1200° C. In specific embodiments, thermal treatment described herein is performed at about 600° C. to about 1000° C. In specific embodiments, thermal treatment of the precursor nanofiber is performed at about 600° C., about 700° C., about 800° C., about 900° C., 1000° C., 1200° C., or the like—e.g., as illustrated in the examples.

In some embodiments, thermal treatment is performed at a constant or variable temperature. In some embodiments, the treatment conditions comprise using a temperature gradient. In some embodiments, the temperature increases from a first temperature (e.g., the temperature of the electrospinning process, optionally room temperature) to a second temperature. In certain embodiments, treatment conditions comprise utilization of a temperature increase during the treatment process. In some instances, the rate of temperature increase is any suitable rate, for example about 1° C./min to about 35° C./min. In some embodiments, the treatment occurs for any suitable amount of time. In specific embodiments, the dwell time at the maximum (second) temperature occurs for 10 minutes to 20 hours, or any other suitable amount of time.

In some embodiments, treatment procedures are performed under inert conditions (e.g., under argon or nitrogen). In some instances, treatment procedures are performed under reducing conditions (e.g., under hydrogen, or a mixture of hydrogen and argon), e.g., if metal carbide ceramics are desired. In some embodiments, treatment procedures are performed under oxidative conditions (e.g., under air or other oxygen containing gases), e.g., if metal oxide ceramics are desired. In some embodiments, if a metal component that is a metal oxide or ceramic is desired, treatment procedures are performed under oxidative conditions. In some embodiments, treatment conditions include gaseous conditions, liquid conditions, or the like. In specific embodiments, inert or oxidizing conditions are utilized to prepare nanofibers having a continuous ceramic component (e.g., a continuous core matrix of ceramic).

In some embodiments, the process further comprises depositing polymer (e.g., any polymer described herein, such as a soft polymer or a polymer comprising a soft polymer block) on the ceramic nanofiber(s), e.g., so as to coat or at least partially coat the ceramic nanofiber(s) with the polymer. In some embodiments, the polymer is a polymer melt or a polymer solution and the polymer is deposited on the ceramic nanofiber, e.g., by spraying the polymer on the ceramic nanofibers, or by submersing the ceramic nanofibers in the liquid polymer. In some embodiments, polymer coated ceramic nanofibers are deposited on a lithium-air anode. In other embodiments, the ceramic nanofibers (e.g., mesoporous ceramic nanofibers) are deposited (e.g., without a polymer coat) on a lithium-air anode.

In certain embodiments, e.g., wherein block copolymers or polymer blends are utilized, the process further comprises annealing the precursor nanofiber, prior to calcination treatment. In some instances, upon preparation of a precursor nanofiber (e.g., spinning of or annealing of the nanofiber), the different blocks of block copolymers or different polymers of polymer blends arrange into ordered structures, such as cubic-type structures, hexagonal-type structures, reverse hexagonal-type structures, lamellar-type structures, helical-type structures, assembled micelle-type structures, gyroid-type structures, spherical structures, cylindrical structures, layered structures, channel structures, bicontinuous structures, or the like. In some embodiments, upon calcination treatment (e.g., thermal and/or chemical treatments described herein—such as to remove organic residues and convert ceramic precursor to ceramic) of ordered nanofibers (e.g., comprising polymer and ceramic precursor—e.g., metal ions, ceramic precursor, precursor-polymer associations, or the like) produces mesoporous nanofibers comprising a mesoporous continuous matrix of ceramic. More detailed descriptions of obtaining mesoporous ceramic-containing and ceramic-matrix nanofibers are described in PCT/US13/26060, entitled "Ordered Porous Nanofibers, Methods, and Applications," which is incorporated herein by reference for such disclosure.

Battery/Battery Component Manufacturing

In some embodiments, nanofibers described herein are collected in a mat, which serves as an electrolyte and/or separator, or a component part thereof. In specific embodiments, the mat is formed by electrospinning nanofibers directly into a nanofiber mat. In some embodiments, the electrospun nanofiber mat is a precursor nanofiber mat that is subsequently treated (e.g., chemically and/or thermally—such as with air for room temperature curing ceramic precursors). In other embodiments, the electrospun nanofiber mat is does not require further treatment. In some embodiments, the nanofiber mat is compressed.

In certain embodiments, nanofibers (precursor nanofibers—e.g., comprising ceramic precursor and polymer—or separator/electrolyte component nanofibers—e.g., comprising ceramic or nanoclay and polymer) are directly electrospun onto another battery component, such as an electrode (e.g., anode or cathode), or a mediating layer (the nanofibers being optionally treated, such as when the nanofibers are precursor nanofibers). In other embodiments, nanofibers (precursor nanofibers—e.g., comprising ceramic precursor and polymer—or separator/electrolyte component nanofibers—e.g., comprising ceramic or nanoclay and polymer) are electrospun onto a collector, optionally treated (e.g., when the electrospun nanofibers are precursor nanofibers), and subsequently deposited onto a battery component, such as an electrode (e.g., anode or cathode), or mediating layer. In specific embodiments, the nanofibers are directly electrospun onto a lithium-air anode. In other embodiments, a mediating layer is deposited directly onto a lithium-air anode and nanofibers are directly electrospun onto the mediating layer. In some embodiments, the nanofibers comprise a ceramic precursor that cures into a ceramic at a temperature of 100° C. or less (e.g., room temperature) in air (e.g., PHPS). In some embodiments, the process comprises preparing (e.g., electrospinning and optionally treating) at least two different types of electrolyte/separator nanofiber components.

In some embodiments, electrolyte/separator component nanofibers are combined with an additional component as described above, such as a lithium salt (e.g., $Li_2CO_3$, $Li_2O$, LiOH), an electrolyte (e.g., a non-aqueous electrolyte), a mediating layer, or the like. In certain embodiments, the combination with additional component is optionally done before or after deposition of the nanofibers onto another battery component, such as an electrode (e.g., cathode or anode).

Anode

In certain embodiments, provided herein is an anode component (e.g., in a lithium air battery) comprising a nanofiber material. In certain embodiments, the nanofiber material, when combined with one or more additional material, functions as the anode.

In some embodiments, provided herein is an anode component (e.g., in a lithium air battery) comprising a nanofiber material, the nanofiber material comprising lithium metal (e.g., discrete domains of lithium or a continuous matrix of lithium). In specific embodiments, the nanofiber material comprises a continuous matrix of lithium material (e.g., high purity zero oxidation state lithium metal, or a combination of lithium and lithium salt (e.g., lithium oxide)). In other embodiments, the nanofiber material comprises discrete domains (e.g., isolated and/or non-aggregated domains, which are optionally obtained via gas-assisted electrospinning of a polymer-containing fluid stock) of lithium material in a continuous matrix material (e.g., a continuous matrix of a polymer material).

Lithium Material

In certain embodiments, the anode component (e.g., in a lithium air battery) comprising a lithium-containing nanofiber material. In more specific embodiments, the nanofibers or nanofiber component comprise a continuous matrix of lithium material (e.g., high purity zero oxidation state lithium metal, or a combination of lithium and lithium salt (e.g., lithium oxide)). In still more specific embodiments, the nanofibers or nanofiber component comprise a continuous core matrix of lithium material. In specific embodiments, the nanofiber(s) comprising a continuous matrix of lithium material are mesoporous.

Any suitable lithium material is optionally utilized. In certain embodiments, the lithium material is lithium metal. In specific embodiments, the lithium metal comprises at least 70 wt % zero oxidation state lithium. In more specific embodiments, the lithium metal comprises at least 75 wt % zero oxidation state lithium. In still more specific embodiments, the lithium metal comprises at least 80 wt % zero oxidation state lithium. In yet more specific embodiments, the lithium metal comprises at least 90 wt % zero oxidation state lithium.

In some embodiments, the anode nanofiber comprises at least 70 wt % zero oxidation state lithium. In more specific embodiments, the anode nanofiber comprises at least 75 wt % zero oxidation state lithium. In still more specific embodiments, the anode nanofiber comprises at least 80 wt % zero oxidation state lithium. In yet more specific embodiments, the anode nanofiber comprises at least 90 wt % zero oxidation state lithium.

In certain embodiments, the anode nanofiber is a mesoporous. In specific embodiments, the anode nanofiber comprises a mesoporous continuous matrix of lithium metal (e.g., comprising at least 70 wt % zero oxidation state lithium). In certain embodiments, anode nanofibers (mesoporous anode nanofibers in particular) function to reduce dendrite growth of lithium (i.e., from the anode). In some embodiments, nanofibers provided herein reduce dendritic growth over use of bulk lithium anode material. In specific embodiments, nanofibers provided herein reduce dendritic growth (e.g., lithium dendritic growth on the anode) by at least 20% (e.g., compared to bulk lithium anode material—such as lithium metal films or sheets) (e.g., in an otherwise identical lithium-air battery configuration). In more specific embodiments, nanofibers provided herein reduce dendritic growth (e.g., lithium dendritic growth on the anode) by at least 50% (e.g., compared to bulk lithium anode material).

In some embodiments, the nanofibers have few defects and/or voids. In some instances voids and defects in the nanofiber include breaks in the nanofiber, regions of nanofiber wherein the diameter is so narrow as to be easily broken (e.g., having a diameter of less than 10% or less than 5% of the average nanofiber diameter), regions of the nanofiber wherein the nanofiber material has anomalous morphologies (e.g., crystalline domains in a substantially amorphous nanofiber—such crystalline domains may increase fracturing and brittleness of the nanofiber), and the like. In some embodiments, there are about 1, about 5, about 10, about 50, about 100, and the like defects per linear mm of nanofiber. In some embodiments, there are at most about 1, at most about 5, at most about 10, at most about 50, at most about 100, and the like defects per linear mm of nanofiber. In other embodiments, the nanofibers have fewer defects and/or voids, wherein the number of defects and/or voids in the nanofiber is in comparison to a nanofiber not produced by the methods of the disclosure (for example with a low loading of precursor).

In various embodiments, provided herein are nanofibers or processes for producing nanofibers having any suitable diameter. In specific embodiments, nanofibers provided herein have a (e.g., average) diameter of less than 1500 nm. In more specific embodiments, nanofibers provided herein have a (e.g., average) diameter of 100 nm to 1000 nm. In some embodiments, nanofibers provided herein have a (e.g., average) diameter of 500 nm or less. In some embodiments, nanofibers provided herein have a (e.g., average) diameter of 400 nm or less. In some embodiments, nanofibers provided herein have a (e.g., average) diameter of 200 nm to 500 nm.

The nanofibers have any suitable length. In some embodiments, nanofibers provided herein have an average length of about 20 µm, about 50 µm, about 100 µm, about 500 µm, about 1,000 µm, about 5,000 µm, about 10,000 µm, about 50,000 µm, about 100,000 µm, about 500,000 µm, or the like. In some embodiments, nanofibers provided herein have an average length of at least about 20 µm, at least about 50 µm, at least about 100 µm, at least about 500 µm, at least about 1,000 µm, at least about 5,000 µm, at least about 10,000 µm, at least about 50,000 µm, at least about 100,000 µm, at least about 500,000 µm, or the like. In other embodiments, the nanofibers are optionally shorter (e.g., a longer nanofiber material is optionally fragmented to facilitate processing of the material, such as when processing to combine with a carbon material to form the cathode).

The nanofibers provided herein have any suitable aspect ratio (nanofiber length divided by diameter). In some embodiments, the nanofibers provided herein have an aspect ratio (e.g., average aspect ratio) of at least 10, at least $10^2$, at least $10^3$, at least $10^4$, at least $10^5$, at least $10^6$, at least $10^7$, or the like. In specific embodiments, the aspect ratio (e.g., average aspect ratio) of nanofibers provided herein is at least 100. In some embodiments, aspect ratio refers to a single nanofiber. In some embodiments, aspect ratio refers to a plurality of nanofibers and is reported as a single average value (i.e., the aspect ratio being the average length of the nanofibers of a sample divided by their average diameter). In some instances, diameters and/or lengths are measured by microscopy.

The nanofibers provided herein have any suitable specific surface area (surface area divided by mass (or volume), or as measured by Brunauer-Emmett-Teller (BET) analysis). In some embodiments, the specific surface area of nanofibers provided herein is at least 0.1 $m^2/g$, at least 1 $m^2/g$, at least 5 $m^2/g$, at least 10 $m^2/g$, at least 50 $m^2/g$, at least 100 $m^2/g$, at least 200 $m^2/g$, at least 500 $m^2/g$, at least 1,000 $m^2/g$, at least 1,500 $m^2/g$, at least 2,000 $m^2/g$, or the like.

In some instances, methods disclosed herein (e.g., including using a high loading of uniformly distributed precursor) reduce the number and size of pores. Porosity is also called "void fraction" and is a measure of the void spaces in a material. In some embodiments, porosity is a fraction of the volume of voids over the total volume and is reported as a percentage between 0% and 100%. In various embodiments, the porosity depends on many factors including loading and distribution of precursor in the fluid stock, calcination conditions, mesoporous processing techniques, and the like. The nanofibers have any suitable porosity. In some embodiments, the porosity is at least 1%, at least 5%, at least 10%, at least 20%, at least 25%, at least 50%, at most 1%, at most 5%, at most 10%, at most 25%, at most 50%, or the like. In some embodiments, the porosity is between about 1% and 50%, between about 5% and 20%, or the like.

Anode Manufacturing

In some embodiments, provided herein are processes for manufacturing the anode or anode components described herein. In certain embodiments, provided herein are processes for manufacturing nanofiber components thereof.

In specific embodiments, provided herein is a process for manufacturing nanofibers, or for manufacturing a lithium-air battery anode, the process comprising electrospinning a fluid stock to produce a nanofiber, the fluid stock comprising or being made by combining polymer and lithium component (e.g. a lithium precursor, such as a lithium salt, such as lithium acetate, lithium chloride, or the like).

Precursors

Any suitable lithium precursor or precursors are optionally utilized. In some embodiments, the lithium precursor(s) used are suitable for calcination to lithium metal (e.g., zero oxidation state lithium metal).

In specific embodiments, the lithium component of or added to the fluid stock is a ceramic precursor. In some embodiments, the precursor is a lithium containing compound that is associated with at least one ligand, such as an anion (e.g., in the case of the precursor being a lithium salt). In certain embodiments, the metal-ligand association is associated via any suitable type of bond or interaction (e.g., an ionic bond, a covalent bond, a coordination complex between ligand and metal, or the like). In some instances a precursor described herein is associated with a polymer instead of, or in addition to, other ligands—such compounds are intended to be considered was metal-ligand associations (whether or not additional ligands are present).

In specific embodiments, the lithium precursor is a lithium salt, each lithium precursor comprising lithium atom(s) (e.g., cations—Li+) associated with one or more ligand(s) (in water or other protic fluid, the lithium precursor optionally disassociates, interacting with whole or partial charges of the water/solvent and/or polymer). In some embodiments, the precursor is a lithium carboxylate (e.g., —OCOCH$_3$ or another —OCOR group, wherein R is an alkyl, substituted alkyl, aryl, substituted aryl, or the like). In certain embodiments, the precursor is a lithium nitrate. In some embodiments, the precursor is a lithium alkoxide (e.g., a methoxide, ethoxide, isopropyl oxide, t-butyl oxide, or the like). In some embodiments, the precursor is a lithium halide (e.g., chloride, bromide, or the like). In certain embodiments, the precursor is a lithium diketone (e.g., acetylacetone, hexafluoroacetylacetone, or the like). In other embodiments, any suitable ligand may be utilized in a lithium salt or association described herein, e.g., ketones, diketones (e.g., a 1,3-diketone, such as ROCCHR'COR group, wherein R is an alkyl, substituted alkyl, aryl, substituted aryl and R' is R or H), carboxylates (e.g., acetate or —OCOR group, wherein each R is independently an alkyl, substituted alkyl, aryl, substituted aryl), halides, nitrates, amines (e.g., NR'$_3$, wherein each R" is independently R or H or two R", taken together form a heterocycle or heteroaryl), and combinations thereof. Further examples include iodide, bromide, sulfide (e.g., —SR), thiocyanate, chloride, nitrate, azide, fluoride, hydroxide, oxalate, water, nitrite (e.g., RN$_3$), isothiocyanate, acetonitrile, pyridine, ammonia, ethylenediamine, 2,2'-bipyridine, 1,10-phenanthroline, nitrite, triphenylphosphate, cyanide, carbon monoxide, or alko-oxide. In some embodiments, the precursor is optionally utilized in a hydrate or solvate form. In specific embodiments, the ceramic precursor is lithium acetate, lithium acetylacetonate, lithium halide (e.g., chloride), or a combination thereof.

Polymers

In specific embodiments, the polymer is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Water soluble or swellable polymers are generally at least somewhat hydrophilic. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, a polymer described herein (e.g., in a process, precursor nanofiber, a fluid stock, or the like) is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like). In certain embodiments, these reactive sites react with the precursors, providing good dispersion of the ceramic precursors, which in turn allows for high loading and provides for a highly continuous ceramic moiety (e.g., a continuous core nanofiber matrix of ceramic) following calcination of the precursor to a ceramic and optional carbonization and removal of organics (including ligands and polymer).

In some embodiments, the polymer is a polymer melt or a polymer solution (e.g., in an organic solvent or water). In certain embodiments, the polymer is a block copolymer, such as any copolymer comprising blocks of any polymers described herein, or a polymer blend, such as a blend of any polymers described herein.

For example, in certain embodiments, the block co-polymer comprises a polyvinyl alcohol (PVA) block, a polyethylene oxide (PEO) block, polyvinylpyridine block or any combination thereof. In certain embodiments, block co-polymers provided herein comprise a first block and a second block, the first block being more or less hydrophobic or lipophilic than the second block. In some embodiments, the second block (e.g., the more hydrophobic or lipophilic block) is any suitable polymer block, such as a polyimide block, a polylactic acid (PLA) block, a polypropylene oxide (PPO) block, polystyrene (PS) block, a nylon block, a polyacrylate block (e.g., poly acrylic acid, polyalkylalkacrylate—such as polymethylmethacrylate (PMMA), polyalkylacrylate, polyalkacrylate), polyacrylamide (PAA) block, polyvinylpyrrolidone (PVP) block, polyacrylonitrile (PAN), or any combination thereof. In some embodiments, the block co-polymer comprises a thermally or chemically degradable polymer block (e.g., as a less hydrophobic/lipophilic block), e.g., a polyisoprene (PI) block, a polylactic acid (PLA) block, a polyvinyl alcohol (PVA) block, a polyethylene oxide (PEO) block, a polyvinylpyrrolidone (PVP) block, polyacrylamide (PAA) block or any combination thereof. In certain embodiments, the block co-polymer comprises thermally or chemically stable polymer block, e.g., a polystyrene (PS) block, a poly(methyl methacrylate) (PMMA) block, a polyacrylonitrile (PAN) block, or any combination thereof. In certain embodiments, the block co-polymer comprises a block degradable under chemical or thermal conditions, and a second block that is not degradable under such conditions.

In specific embodiments, a block co-polymer described herein is or comprises PI-b-PEO, PAN-b-PEO, PVA-b-PS, PEO-b-PPO-b-PEO, PPO-b-PEO-b-PPO, PVA-b-PEO, PVA-b-PAN, PVA-b-PPO, PI-b-PS, PEO-b-PS, PI-b-PS, PVA-PMMA, PVA-PAA, PEO-b-PMMA, or a combination thereof. In more specific embodiments, the block co-polymer comprises PI-b-PS, PS-b-PLA, PMMA-b-PLA, PI-b-PEO, PAN-b-PEO, PVA-b-PS, PEO-b-PPO-b-PEO, PPO-b-PEO-b-PPO, or any combination thereof. In certain embodiments, the polymer is PVA-b-PS, PVA-b-PEO, PEO-b-PPO, PEO-b-PPO-b-PEO, or the like. In some embodiments, the polymer is a polymer blend (e.g., comprising PVA and PS, PVA and PEO, PEO and PPO, or the like). In some embodiments, such electrospinning techniques are gas assisted (e.g., common-axially gas assisted).

In some embodiments, use of block copolymers or a polymer blend is utilized to prepare a mesoporous nanofiber (e.g., comprising a mesoporous continuous matrix of lithium). In some embodiments, after electrospinning a polymer containing nanofiber described herein, the nanofiber is annealed. In some embodiments, the annealing is performed thermally and/or chemically and/or using any other suitable mechanism.

Electrospinning

In some embodiments, a fluid stock is electrospun coaxially with gas (gas assisted electrospinning). In certain embodiments, the fluid stock comprises a lithium precursor. In specific embodiments, the fluid stock comprises or is prepared by combining (i) a lithium precursor, or a lithium nanostructure (e.g., lithium metal containing nanoparticle), and (ii) a polymer. In specific embodiments, the fluid stock is aqueous. Any suitable electrospinning techniques are utilized, such as those described in the cathode section herein.

Any suitable method for electrospinning is used. In some instances, elevated temperature electrospinning is utilized. Exemplary methods comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process. In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some embodiments, incorporating a gas stream inside a fluid stock produces hollow nanofibers. In some embodiments, the fluid stock is electrospun using any method known to those skilled in the art.

In specific embodiments, the process comprises commonaxial (i.e., substantially concentric electrospinning of multiple fluids—also referred to herein as coaxial) electrospinning (electrospinning two or more fluids about a common axis). As described herein, coaxial electrospinning a first fluid stock as described herein (i.e., prepared by combining or comprising (i) metal precursor and (ii) a polymer) with a second fluid is used to add coatings, make hollow nanofibers (e.g., the center fluid is a removable oil or gas), make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning). In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas.

Fluid Stock

In some embodiments, provided herein are fluid stocks comprising and/or methods comprising electrospinning a fluid stock comprising a polymer. The methods described herein optionally utilize an aqueous fluid stock. In some applications, a water-based process is desirable, for instance if one wants to avoid potential health, environmental, or safety problems associated with organic solvents. As described herein, in some embodiments it is advantageous to electrospin a fluid stock that is homogenous. In some embodiments, the fluid stock is homogenous (e.g., which comprises a water-soluble polymer)

In certain embodiments, a fluid stock provided herein is prepared by combining a lithium component (e.g., lithium precursor or lithium containing (e.g., lithium metal, lithium oxide, or the like) nanoparticles or nanostructures) and a polymer in a liquid medium (e.g., in water). In some embodiments, a lithium component is combined with the polymer in a lithium component to polymer weight-to-weight ratio of at least 1:2 (e.g., at least 1:1, or at least 1.25:1). In other embodiments, the ratio is at least 1:9, at least 1:8, at least 1:7, at least 1:6, at least 1:5, at least 1:4, at least 1:3, at least 1:2, at least 1:1.75, at least 1:1.5, or at least 1:1.25. In other embodiments there is about equal weights of lithium component and polymer. In some embodiments, there is more lithium component than polymer by weight. In some embodiments, the weight ratio of the lithium component to polymer is at least 1.25:1, at least 1.5:1, at least 1.75:1, at least 2:1, at least 3:1, or at least 4:1. In yet other embodiments, the weight ratio of lithium component to polymer is about 1:2 to about 5:1, or about 1:1 to about 4:1. In some embodiments, the amount of polymer refers to the polymer component (i.e., excluding the lithium and any non-polymer ligand) and the lithium component refers to the lithium that is associated with polymer, along with any non-polymer ligands (as well as any non-polymer-complexed precursor present in the fluid stock). In some instances such an association process may be complete (i.e., all polymer reactive sites may be associated), and in other instances, some of the precursor and/or polymer reactive sites may remain unassociated. In some embodiments, all or part of the ceramic component is associated with the polymer and the ceramic component to polymer weight-to-weight ratio is determined by the ratio of the sum of the associated and non-associated precursor to the polymer.

The fluid stock contains any suitable amount of polymer. The weight percent of polymer in the fluid stock is represented as the weight percent of polymer (whether the polymer is associated with ceramic component (e.g., precursor) or not). In some embodiments, the fluid stock comprises at least about 0.5 weight %, at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 12 weight %, at least about 14 weight %, at least about 16 weight %, at least about 18 weight %, at least about 20 weight %, at least about 30 weight %, or at least about 40 weight % polymer. In some embodiments, the fluid stock comprises from about 1 weight % to about 20 weight % polymer. In some embodiments, the fluid stock comprises from about 1 weight % to about 10 weight %, from about 1 weight % to about 5 weight %, from about 5 weight % to about 20 weight %, from about 5 weight % to about 10 weight %, from about 10 weight % to about 15 weight %, or from about 15 weight % to about 20 weight % polymer.

In certain embodiments, polymer concentration in the fluid stock is determined on a monomeric residue concentration. In other words, the concentration of the polymer is determined based on the concentration of polymeric repeat units present in the stock. For example, polymer concentration of polyvinyl alcohol may be measured based on the concentration of ($-CH_2CHOH-$) present in the fluid stock. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In at least 5 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the precursor in the fluid stock is between 5 mM and 5 M, between 200 mM and 1 M, between 100 mM and 700 mM, and the like. In some embodiments, the concentration of lithium component (e.g., precursor) in the fluid stock to monomeric residue in the fluid stock is at least 1:4. In specific embodiments, the concentration of lithium component (e.g., precursor) in the fluid stock to monomeric residue in the fluid stock is at least 1:3. In more specific embodiments, the concentration of lithium component (e.g., precursor) in the fluid stock to monomeric residue in the fluid stock is at least 1:2. In still more specific embodiments, the concentration of lithium component (e.g., precursor) in the fluid stock to monomeric residue in the fluid stock is at least 1:1.2. In yet more specific embodiments, the concentration of lithium component (e.g., precursor) in the fluid stock to monomeric residue in the fluid stock is about 1:1 (e.g., within 5%). In other embodiments, the concentration of lithium component (e.g., precursor) in the fluid stock to monomeric residue in the fluid stock is at least 1:10, at least 1:8, at least 1:6, at least 1:1.5, at least 1:3.5, at least 1:2.5, or any suitable ratio.

In one aspect, the concentration of lithium component (e.g., precursor) in the fluid stock is high. The concentration is any suitable concentration. In some embodiments, the concentration of the lithium component (e.g., precursor) in the fluid stock is about 5 mM, about 10 mM, about 20 mM, about 40 mM, about 60 mM, about 80 mM, about 100 mM, about 150 mM, about 200 mM, about 250 mM, about 300 mM, about 350 mM, about 400 mM, about 500 mM, about 700 mM, about 900 mM, about 1.2 M, about 1.5 M, about 2 M, about 5 M, and the like. In some embodiments, the concentration of the lithium component (e.g., precursor) in the fluid stock is at least 5 mM, at least 10 mM, a at least 20 mM, at least 40 mM, at least 60 mM, at least 80 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the lithium component (e.g., precursor) in the fluid stock is between 5 mM and 5 mM, between 20 mM and 1 M, between 100 mM and 700 mM, between 100 mM and 300 mM, and the like.

In some embodiments, a fluid stock is prepared by (i) dissolving or dispersing a lithium component (e.g., precursor) in a first fluid (e.g., water, or another aqueous medium) to form a first composition; (ii) dissolving or dispersing a polymer in a second fluid (e.g., water, or another aqueous medium) to form a second composition; and (iii) combining at least a portion of the first and second compositions to form the fluid stock.

Post Electrospinning Treatment

In some embodiments, e.g., where lithium precursor and polymer are utilized, the process further comprises treatment of the (precursor) nanofiber to calcine the lithium component (e.g., lithium precursor) to lithium metal. In some embodiments, this treatment is achieved thermally and/or chemically. In certain embodiments, thermal treatment of the nanofiber also carbonizes and/or removes organic residues (e.g., precursor ligands and/or polymer components of the precursor nanofiber).

In specific embodiments, treatment of a precursor nanofiber described herein comprises carbonizing the polymer to form (e.g., through at least partial conversion of the polymer) a continuous carbon nanofiber matrix. In other embodiments, treatment of a precursor nanofiber described herein comprises treating the nanofiber to remove the polymer (and other organic residues, such as ligands from the metal component if precursors using organic ligands are utilized). In certain embodiments, wherein lithium precursors are utilized, treatment of the precursor nanofiber serves to calcine the lithium component (e.g., as lithium precursor—including original lithium precursor utilized, or lithium (Li+) associated with polymer, solvent, etc.) to lithium metal.

In specific embodiments, thermal treatment described herein is performed at a temperature of about 400° C. to about 2000° C. (e.g., under inert conditions or under oxidative conditions—such as air). In specific embodiments, thermal treatment is performed at a temperature of about 400° C. to about 1500° C., or about 600° C. to about 1200° C. In specific embodiments, thermal treatment described herein is performed at about 600° C. to about 1000° C. In specific embodiments, thermal treatment of the precursor nanofiber is performed at about 600° C., about 700° C., about 800° C., about 900° C., 1000° C., 1200° C., or the like.

In some embodiments, thermal treatment is performed at a constant or variable temperature. In some embodiments, the treatment conditions comprise using a temperature gradient. In some embodiments, the temperature increases from a first temperature (e.g., the temperature of the electrospinning process, optionally room temperature) to a second temperature. In certain embodiments, treatment conditions comprise utilization of a temperature increase during the treatment process. In some instances, the rate of temperature increase is any suitable rate, for example about 1° C./min to about 35° C./min. In some embodiments, the treatment occurs for any suitable amount of time. In specific embodiments, the dwell time at the maximum (second) temperature occurs for 10 minutes to 20 hours, or any other suitable amount of time.

In some embodiments, treatment procedures are performed under inert conditions (e.g., under argon or nitrogen). In some instances, treatment procedures are performed under reducing conditions (e.g., under hydrogen, or a mixture of hydrogen and argon). In some embodiments, treatment procedures are performed under oxidative conditions (e.g., under air or other oxygen containing gases)—in such cases the process further comprises an optional treatment under reducing conditions (e.g., under hydrogen, or a mixture of hydrogen and argon).

In certain embodiments, e.g., wherein block copolymers or polymer blends are utilized, the process further comprises annealing the precursor nanofiber, prior to calcination treatment. In some instances, upon preparation of a precursor nanofiber (e.g., spinning of or annealing of the nanofiber), the different blocks of block copolymers or different polymers of polymer blends arrange into ordered structures, such as cubic-type structures, hexagonal-type structures, reverse hexagonal-type structures, lamellar-type structures, helical-type structures, assembled micelle-type structures, gyroid-type structures, spherical structures, cylindrical structures, layered structures, channel structures, bicontinuous structures, or the like. In some embodiments, upon calcination treatment (e.g., thermal and/or chemical treatments described herein—such as to remove organic residues and convert lithium precursor/ions/etc. to lithium metal) of ordered nanofibers (e.g., comprising polymer and lithium—e.g., lithium ions, lithium precursor, lithium-polymer associations, or the like) produces mesoporous nanofibers comprising a mesoporous continuous matrix of lithium metal. More detailed descriptions of obtaining mesoporous metal-containing and metal-matrix nanofibers are described in PCT/US13/26060, entitled "Ordered Porous Nanofibers, Methods, and Applications," which is incorporated herein by reference for such disclosure.

EXAMPLES

Example 1

Preparing a Fluid Stock of Zinc Acetate and PVA

Two (2) grams of zinc acetate, the metal precursor, is dissolved in 20 ml of 1 molar acetic acid solution. The solution are stirred for 2 hours to create a solution of nickel acetate.

In a second solution, 1 gram of 99.7% hydrolyzed polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

The nickel acetate solution is then combined with the PVA solution to create a fluid stock. In order to distribute the precursor substantially evenly in the fluid stock, the precursor solution is added gradually to the polymer solution while being continuously vigorously stirred for 2 hours. The mass ratio of precursor to polymer for the fluid feed (based on initial nickel acetate mass) is 2:1.

Example 2

Electrospinning a Fluid Stock of Zinc Acetate and PVA (Precursor Nanofiber for Cathode Catalyst)

The fluid stock of Example 1 is electrospun by a gas-assisted technique. The overall process and apparatus is depicted by example in FIGS. 7 and 8. The fluid stock is loaded into a syringe pump connected to a spinneret with an inner nozzle diameter (fluid stock) of $4.13 \times 10^{-4}$ m and an outer (air) diameter of $1.194 \times 10^{-3}$ m. The distance between the nozzle and the collection plate is kept at about 15 cm and the fluid stock is spun at a rate of 0.1 ml/min. A charge of +15 kV is maintained at the collector. The air velocity at the nozzle is 100 m/s. The temperature of the air and fluid stock at the nozzle is 300 K.

Example 3

Zinc Acetate and PVA-b-PS Fluid Stock and Nanofiber (Precursor Nanofiber for Cathode Catalyst)

Following the procedure of Example 1, a fluid stock of zinc acetate and PVA-b-PS are prepared with ratios of precursor:polymer of 1:1, 2:1, and 3:1. These fluid stocks are electrospun by the procedure of Example 2.

Example 4

Cobalt Acetate and PVA Fluid Stock and Nanofiber (Precursor Nanofiber for Cathode Catalyst)

Following the procedure of Example 1, a fluid stock of cobalt acetate and PVA are prepared with ratios of precursor:polymer of 2:1. These fluid stocks are electrospun by the procedure of Example 2.

Example 5

Cobalt Acetate and PVA-b-PS Fluid Stock and Nanofiber (Precursor Nanofiber for Cathode Catalyst)

Following the procedure of Example 1, a fluid stock of cobalt acetate and PVA-b-PS are prepared with ratios of precursor:polymer of 2:1. These fluid stocks are electrospun by the procedure of Example 2.

Example 6

Nickel Acetate and PVA Fluid Stock and Nanofiber (Precursor Nanofiber for Cathode Catalyst)

Following the procedure of Example 1, a fluid stock of nickel acetate and PVA are prepared with ratios of precursor:polymer of 2:1. These fluid stocks are electrospun by the procedure of Example 2.

Example 7

Nickel Acetate and PVA-b-PS Fluid Stock and Nanofiber (Precursor Nanofiber for Cathode Catalyst)

Following the procedure of Example 1, a fluid stock of nickel acetate and PVA-b-PS are prepared with ratios of precursor:polymer of 2:1. These fluid stocks are electrospun by the procedure of Example 2.

Example 8

Manganese Acetate and PVA Fluid Stock and Nanofiber (Precursor Nanofiber for Cathode Catalyst)

Following the procedure of Example 1, a fluid stock of manganese acetate and PVA are prepared with ratios of precursor:polymer of 2:1. These fluid stocks are electrospun by the procedure of Example 2.

Example 9

Manganese Acetate and PVA-b-PS Fluid Stock and Nanofiber (Precursor Nanofiber for Cathode Catalyst)

Following the procedure of Example 1, a fluid stock of manganese acetate and PVA-b-PS are prepared with ratios of precursor:polymer of 2:1. These fluid stocks are electrospun by the procedure of Example 2.

Example 10

Lithium Acetate and PVA Fluid Stock and Nanofiber (Precursor Nanofiber for Anode)

Following the procedure of Example 1, a fluid stock of silver acetate and PVA are prepared with ratios of precursor:polymer of 2:1. These fluid stocks are electrospun by the procedure of Example 2.

Example 11

Lithium Acetate and PVA-b-PS Fluid Stock and Nanofiber (Precursor Nanofiber for Mesoporous Anode)

Following the procedure of Example 1, a fluid stock of silver acetate and PVA-b-PS are prepared with ratios of precursor:polymer of 2:1. These fluid stocks are electrospun by the procedure of Example 2.

Example 12

PHPS and PEO Fluid Stock and Nanofiber (Precursor Nanofiber for Separator/Electrolyte)

Following the procedure of Example 1, a fluid stock of PHPS and PEO are prepared with ratios of precursor:polymer of 2:1. These fluid stocks are electrospun by the procedure of Example 2.

Example 13

Fluid Feeds and Nanofibers

Following the procedure of Example 1, fluid stocks are prepared according to Table 1 in the identified precursor-to-polymer load ratio (based on initial precursor mass combined with the polymer). These fluid stocks are also electrospun according to the procedure of Example 2.

TABLE 2

| reagent | polymer | load ratio | |
|---|---|---|---|
| zinc nitrate | PVE | 1:1 | metal catalyst precursor NF |
| cobalt nitrate | PEO | 2:1 | metal catalyst precursor NF |
| platinum acetylacetonate | PVA | 3:1 | metal catalyst precursor NF |
| gold chloride | PVO | 2:1 | metal catalyst precursor NF |
| lithium chloride | PEO | 1:1 | anode precursor NF |
| lithium chloride | PVA | 1.5:1 | anode precursor NF |
| lithium acetate | PVA-b-PEO | 3:1 | mesoporous anode precursor NF |
| silicon acetate | polyvinyl pyridine | 1:1 | separator/electrolyte precursor NF |
| silicon nitrate | PVA-PS | 3.5:1 | mesoporous separator/electrolyte precursor NF |
| titanium acetate | PVA | 2:1 | separator/electrolyte precursor NF |
| zirconium nitrate | polyvinyl pyridine | 1:1 | separator/electrolyte precursor NF |
| cobalt chloride | polyacrylic acid | 1.5:1 | metal catalyst precursor NF |
| aluminum nitrate zirconium acetate | PVE | 2:1 (70/30) | separator/electrolyte precursor NF |

Example 14

Zinc Oxide Nanofibers (Metal Catalyst for Cathode)

To produce zinc oxide nanofibers, the electrospun precursor nanofibers of Examples 2-3 are heated at a rate of 1-35° C. to a temperature of 400-1500° C. (e.g., under air) and held there for 10 min to 20 hours.

For example, FIG. 1 illustrates SEM images and XRD patterns for zinc oxide nanofibers prepared by electrospinning PVA and zinc precursor, followed by thermal treatment (calcination) at 600° C. (panel A), 800° C. (panel B), and 1000° C. (panel C). FIG. 17 illustrates Raman spectra of Zinc Oxide nanofibers calcinated at various temperatures. As can be seen, variation in the Raman spectra are observed depending on thermal treatment conditions utilized.

Example 15

Cobalt Oxide Nanofibers (Metal Catalyst for Cathode)

To produce cobalt oxide nanofibers, the electrospun precursor nanofibers of Examples 4-5 are heated at a rate of 1-35° C. to a temperature of 400-1500° C. (e.g., under air) and held there for 10 min to 20 hours.

For example, FIG. 2 illustrates SEM images and XRD patterns for zinc oxide nanofibers prepared by electrospinning PVA and zinc precursor, followed by thermal treatment (calcination) at 700° C. (panel A), 1000° C. (panel B), and 1200° C. (panel C). FIG. 24 illustrates Raman spectra of Cobalt Oxide nanofibers calcined from a polymer-cobalt precursor at various temperatures. As can be seen, variation in the Raman spectra are observed depending on thermal treatment conditions utilized.

Example 16

Other Metal Oxide Nanofibers (Metal Catalyst for Cathode)

To produce metal oxide nanofibers, the electrospun precursor nanofibers of Examples 6-9 and 13 are heated at a rate of 1-35° C. to a temperature of 400-1500° C. (e.g., under air) and held there for 10 min to 20 hours.

Example 17

Li-Air Cell Results

A comparison of Li-air discharge/charge cycles for various metal oxide nanofibers (e.g., zinc oxide, cobalt oxide, manganese oxide, and nickel oxide of Examples 14-16) as metal catalysts in a lithium-air battery cell cathode are described in FIG. 4. The cathode component of the lithium-air cell was prepared with metal oxide nanofibers and carbon black powder (super C65) and the initial capacity of such cells was measured. For example, zinc oxide fibers treated under 900° C. demonstrated an initial discharge capacity of about 7700 mA h/gcarbon, and cobalt oxide treated under 1000° C. demonstrated an initial discharge capacity of about 6500 mA h/gcarbon.

FIG. 9 (panel A) illustrates Li-air discharge/charge cycles for zinc oxide materials prepared using different thermal treatments and different precursor:polymer loading parameters, and combined with carbon black (20 wt. % nanofiber loading). Also, illustrated are the results for carbon black without the zinc oxide materials. Zinc oxide prepared using a fluid stock having a precursor:polymer ratio of 3:1, the sample under 800° C. treatment exhibits slightly higher discharge capacity than the one under 600° C. treatment, while for 1:1 ratio, the sample under 900° C. treatment exhibits the highest discharge capacity (~7700 mA h/$g_{carbon}$) than the others.

FIG. 9 (panel B) illustrates Li-air discharge/charge cycles for cobalt oxide materials prepared using different thermal treatments and different precursor:polymer loading parameters, and combined with carbon black (20 wt. % nanofiber loading). Also, illustrated are the results for carbon black without the cobalt oxide materials. Precursor nanofibers were treated under various temperatures: 700° C. (c), 1000° C. (b) and 1200° C. (a). The sample treated under 1000° C. exhibits the highest discharge capacity (~6500 mA h/gcarbon) and the one treated under 700° C. shows the lowest discharge capacity among all three samples. The discharge and charge plateaus for all three samples are quite similar which are around 2.5 V and 4.7 V.

Li-air cell results were also obtained for zinc oxide nanofibers combined with graphene nanoribbons (GNRs). The identical PVP/ZnO fiber sample with graphene nanoribbons (GNRs) and carbon black (super C65) as substrates (20% fiber loading), as shown in FIG. 5. Initial discharge capacities were obtained for both (GNRs: 6600 mA h/gcarbon; Super C65: 4300 mA h/g carbon). The nanofiber/GNR cathode show a discharge plateau at ~2.55 V and a charge plateau at ~4.30 V, while the nanofiber/carbon black cathode display a discharge plateau of ~2.50 V and a charge plateau at ~4.70 V.

FIG. 3 illustrates initial capacities for various carbon substrate materials, including graphite, carbon black (Super P and Super C65), carbon nanotubes, and various graphene nanoribbon materials. Among all the carbon substrates, multi-walled carbon nanotubes (CNTs) not only reached the highest discharge capacity (~4800 mA h/gcarbon), but also maintained the highest discharge potential plateau (~2.6 V) and lowest charge potential plateau (~4.3 V), the best overpotential, in other words. Meanwhile, a variety of graphene nanoribbons shows quite different discharge capacity (best: ~4000 mA h/gcarbon; lowest: ~2200 mA h/g carbon), however, most GNRs exhibited the similar overpotential.

FIG. 12A illustrates the specific capacity of Super C (a), Super C with ZnO nanofiber (b), and Super C with mesoporous ZnO nanofiber (c). FIG. 12B illustrates a TEM image of mesoporous zinc oxide nanofiber (BET area of 110 m²/g) used in the example. Mesoporous structure (and high surface area) gives rise to a three fold increase in the capacity.

Example 18

Nanostructured Carbon in Nanofiber Morphology

Using manufacturing processes similar to those above, nanofibers are prepared using CNT and PVA providing CNTs in a nanofiber morphology. FIG. 11 illustrates the specific capacity of CNT Li-air cathode and CNT/PVA nanofiber Li-air cathode. The fiber morphology in the cathode gives rise to a two-fold increase in the capacity compared to similar CNTs that have not been prepared in a nanofiber morphology.

Example 19

Metal-Carbon Composites (for Cathode)

Metal-carbon composites were prepared starting from the mixture metal precursor (e.g.: platinum (II) acetylacetonate and gold (III) chloride trihydrate) with carbon substrates in isopropanol, then following by the ultrasonication for 1-2 min. The slurry was dried in oven under 80° C. for 2 hr before transferred into a ceramic boat undergoing calcinations under Ar 95%/$H_2$ 5% atmosphere, 220° C. for 12 hr.

For example, FIG. 10 illustrates the curve of initial charge/discharge capacities of Li-air cells having various metal-carbon composite cathodes, Pt/CNTs (a), Au/CNTs (b) and Pt+Au/CNTs (c). The highest discharge capacities were achieved by Pt/CNTs (~5500 mA h/gcarbon) and Au+Pt/CNTs (~4600 mA h/gcarbon). These two samples demonstrated best overpotential (discharge: ~2.7 V; charge: ~4.0 V) as well. Au/CNTs demonstrated a high discharge capacity (~5600 mA h/gcarbon), with a discharge plateau at ~2.4 V and a charge plateau at ~4.3 V).

FIG. 18 illustrates a TEM image of the Pt/CNT samples, and FIG. 19 illustrates XRD patterns for the Pt/CNT samples. FIG. 20 illustrates lithium air charge/discharge results for an exemplary cathode comprising both (1) zinc oxide nanofibers (e.g., from according to Example 14), and (2) Pt/CNT (e.g., as the carbon substrate).

Similar processes are utilized to prepare catalyst on GNR samples. FIG. 22 illustrates a TEM image of Pt/GNR samples, and FIG. 23 illustrates lithium air charge/discharge cycles for the Pt/GNR sample (b) compared to GNR alone (a). For the Pt/GNR sample, the initial discharge capacity reached about 5,600 mAh/$g_{carbon}$, which was about a 10% improvement over GNR alone.

Example 20

Nanostructured Composites

Fluid stocks are prepared utilizing processes similar to those described in Examples 1 and 2.

Platinum acetate and PAN are combined in DMF and electro spun and thermally carbonized (PAN) and calcined (metal precursor). Resultant nanostructures exhibit, without binder, a capacity of about 1000 mAh/$g_{carbon}$.

Platinum acetate, GNR, and PAN are combined in DMF and electro spun and thermally carbonized (PAN) and calcined (metal precursor). The initial discharge capacity (without binder) is enhanced to about 3700 mAh/$g_{carbon}$, with an improved charge plateau.

Similar procedures were utilized for platinum/GNR, cobalt oxide/GNR, cobalt oxide/platinum/GNR, zinc oxide/GNR, and zinc oxide/platinum/GNR combinations.

FIG. 21 illustrates exemplary capacities of lithium air battery cathodes comprising nanostructured composites comprising metal catalyst (e.g., platinum, gold, zinc oxide, cobalt oxide, or a combination thereof) and carbon nanostructures embedded in a carbon matrix (e.g., carbonized polymer, such as PAN).

Example 21

Cathode Fabrication

Cathodes were prepared by mixing the catalyst ink which is with a Nafion (DE2020, ion-power)/carbon weight ratio of 0.5/1 in isopropanol. The ink for cathodes was coated on Celgard (2500) separator. For the lithium-air battery assembly operated in argon-filled glovebox, the lithium foil was first put at the bottom current collector made of stainless steel, then followed by two layers of separators, the cathode and current collector mesh at the top. Each layer was added 15 µL electrolyte (tetraethylene glycol dimethyl ether (tetraglyme) electrolyte containing in 1M $LiCF_3SO_3$). After sealed in the glove box, the cell was purged with tetraglyme-saturated oxygen for 10 min.

Example 22

Ceramic/Polymer Hybrid Separators

Using manufacturing processes similar to those in Examples 1 and 2, nanofibers for use in lithium air battery separators are prepared. PAN nanofibers are prepared as well as nanofibers comprising ceramic inclusions (4.5 wt. % and 9.0 wt. %) embedded within a PAN matrix.

FIG. 13 illustrates the capacity of Li-air battery with various separator systems. The top panel illustrates the capacity results using a CNT based cathode. The bottom panel illustrates the capacity results using a Pt/GNR (prepared by combining GNR with platinum precursor and calcinating the combination) based cathode. As can be seen, ceramic/polymer hybrid nanofiber based separators exhibit enhanced capacity for both cathode systems compared to commercially available separator systems (Celgard 2500-25 micron microporous monolayer membrane of polypropylene (PP)).

We claim:

1. A process for producing a battery separator, the process comprising:
   electrospinning a fluid stock to produce one or more nanofiber, the fluid stock comprising a polymer component and a ceramic precursor component, the ceramic precursor component comprising a low temperature curing ceramic precursor capable of curing to ceramic at a temperature of 50° C. or less, the electrospinning being conducted in the presence of a blowing gas;
   a. collecting and/or assembling a nanofiber mat comprising the one or more nanofiber;
   b. curing the ceramic precursor component at a temperature low enough to avoid carbonizing or removing the polymer; and
   c. compressing the nanofiber mat,
   the battery separator comprising a compressed nanofiber mat comprising one or more hybrid nanofiber(s), the one or more hybrid nanofiber(s) comprising the polymer and a continuous ceramic component,
   wherein the fluid stock comprises about 5 wt. % to about 20 wt. % of the polymer, and the polymer component comprises a polystyrene (PS), polymethacrylate (PMA), polyvinylpyridine (PVP), polyvinylalkane, polyvinylcyclialkane, a polyimide, a polyamide, a polyalkene, polypropylene (PP), or a combination thereof.

2. The process of claim 1, wherein the low temperature curing ceramic precursor is capable of curing to ceramic at a temperature of less than 30° C.

3. The process of claim 1, wherein the low temperature curing ceramic precursor is or comprises perhydropolysilazane (PHPS).

4. The process of claim 1, wherein the ceramic precursor is a sol-gel forming ceramic precursor.

5. The process of claim 1, wherein the fluid stock comprises polymer and ceramic precursor in a ceramic precursor to polymer weight-to-weight ratio of at least 1:9.

6. The process of claim 1, wherein the fluid stock comprises about 5 wt. % to about 20 wt. % polymer.

7. The process of claim 1, wherein the polymer component comprises a block copolymer or a polymer blend.

8. The process of claim 1, wherein the polymer component comprises a block copolymer, the block copolymer comprising a polystyrene (PS) segment, polymethacrylate (PMA) segment, polyvinylpyridine (PVP) segment, polyvinylalkane, polyvinylcycloalkane segment, a polyimide segment, a polyamide segment, a polyalkene segment, polypropylene (PP) segment, or a combination thereof.

9. The process of claim 1, wherein the polymer component comprises a copolymer comprising a polyether segment, a polypropylene oxide segment, a polyamine segment, or a combination thereof.

10. The process of claim 8, wherein the polymer component comprises a polyether, a polypropylene oxide, a polyamine, or a combination thereof.

11. The process of claim 1, wherein the fluid stock is electrospun along and/or around a similar axis with a blowing gas.

12. The process of claim 1, wherein the hybrid nanofiber(s) comprise a continuous core component comprising ceramic and a continuous sheath component comprising polymer.

13. The process of claim 1, wherein the hybrid nanofiber(s) further comprise a continuous polymer component.

\* \* \* \* \*

UNITED STATES PATENT AND TRADEMARK OFFICE
CERTIFICATE OF CORRECTION

PATENT NO. : 10,847,810 B2
APPLICATION NO. : 15/031370
DATED : November 24, 2020
INVENTOR(S) : Yong Lak Joo and Jun Yin Page 1 of 1

It is certified that error appears in the above-identified patent and that said Letters Patent is hereby corrected as shown below:

In the Claims

Column 58, Line 7, in Claim 1, please delete the word "polyvinylcyclialkane" and replace it with the word --polyvinylcycloalkane--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*